US012651582B2

(12) United States Patent (10) Patent No.: US 12,651,582 B2
Kimura et al. (45) Date of Patent: *Jun. 9, 2026

(54) MOVING OBJECT

(71) Applicant: SEMICONDUCTOR ENERGY LABORATORY CO., LTD., Atsugi (JP)

(72) Inventors: Hajime Kimura, Atsugi (JP); Yoshiaki Oikawa, Atsugi (JP); Kentaro Hayashi, Atsugi (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/952,564

(22) Filed: Nov. 19, 2024

(65) Prior Publication Data

US 2025/0078783 A1 Mar. 6, 2025

Related U.S. Application Data

(63) Continuation of application No. 18/285,959, filed as application No. PCT/IB2022/053348 on Apr. 11, 2022, now Pat. No. 12,159,606.

(30) Foreign Application Priority Data

Apr. 22, 2021 (JP) ................................. 2021-072504

(51) Int. Cl.
*G09G 5/10* (2006.01)
*B60K 35/234* (2024.01)
*G06V 20/59* (2022.01)
(52) U.S. Cl.
CPC ............. *G09G 5/10* (2013.01); *B60K 35/234* (2024.01); *G06V 20/597* (2022.01); *B60K 2360/21* (2024.01)

(58) Field of Classification Search
CPC ... G09G 5/10; G09G 5/00; G09G 5/02; B60K 35/234; B60K 2360/21; B60K 35/00;
(Continued)

(56) References Cited

U.S. PATENT DOCUMENTS 9,927,609 B2 3/2018 Cammenga et al.
10,589,660 B2 3/2020 Kimura et al.
(Continued)

FOREIGN PATENT DOCUMENTS

EP 1933277 A 6/2008
EP 2775339 A 9/2014
(Continued)

OTHER PUBLICATIONS

International Search Report (Application No. PCT/IB2022/053348) Dated Jun. 28, 2022.
(Continued)

*Primary Examiner* — Premal R Patel
(74) *Attorney, Agent, or Firm* — NIXON PEABODY LLP; Jeffrey L. Costellia

(57) ABSTRACT

A moving object including a display apparatus capable of performing highly visible display is provided. The moving object includes a display unit, an imaging unit, an arithmetic unit, and a control unit. The display unit has a function of displaying a display image. The imaging unit has a function of obtaining a first captured image including the display image and an external view overlapping with the display image. The arithmetic unit has a function of comparing a color of the display image and a color of the external view and correcting the color of the display image on the basis of a comparison result. The control unit has a function of controlling running of the moving object on the basis of the first captured image.

7 Claims, 24 Drawing Sheets

(58) Field of Classification Search
CPC ...... B60K 35/23; B60K 35/28; G06V 20/597;
B60R 11/04; H04N 7/18; B60Q 1/143;
B60Y 2400/92
See application file for complete search history.

(56) References Cited

U.S. PATENT DOCUMENTS

| | | | |
|---|---|---|---|
| 10,948,716 | B2 | 3/2021 | Higuchi et al. |
| 2009/0231146 | A1 | 9/2009 | Fujita |
| 2014/0253579 | A1 | 9/2014 | Babaguchi |
| 2017/0004805 | A1 | 1/2017 | Irzyk |
| 2018/0373027 | A1 | 12/2018 | Higuchi et al. |
| 2019/0346713 | A1* | 11/2019 | Miyake .................. B60K 35/60 |
| 2019/0384060 | A1 | 12/2019 | Naruse |
| 2020/0090375 | A1 | 3/2020 | Mori et al. |
| 2020/0150432 | A1* | 5/2020 | Makino .................. B60K 35/10 |
| 2020/0221057 | A1 | 7/2020 | Shimoda et al. |
| 2021/0174767 | A1 | 6/2021 | Edgren et al. |
| 2021/0300183 | A1 | 9/2021 | Kondo et al. |

FOREIGN PATENT DOCUMENTS

| | | | |
|---|---|---|---|
| EP | 3415357 | A | 12/2018 |
| JP | 07-069125 | A | 3/1995 |
| JP | 2004-110546 | A | 4/2004 |
| JP | 2011-230520 | A | 11/2011 |
| JP | 2014-172406 | A | 9/2014 |
| JP | 2016-049912 | A | 4/2016 |
| JP | 2017-039364 | A | 2/2017 |
| JP | 2017-068761 | A | 4/2017 |
| JP | 2021-036324 | A | 3/2021 |
| WO | WO-2007/029455 | | 3/2007 |
| WO | WO-2017/138292 | | 8/2017 |
| WO | WO-2017/145015 | | 8/2017 |

OTHER PUBLICATIONS

Written Opinion (Application No. PCT/IB2022/053348) Dated Jun. 28, 2022.

* cited by examiner

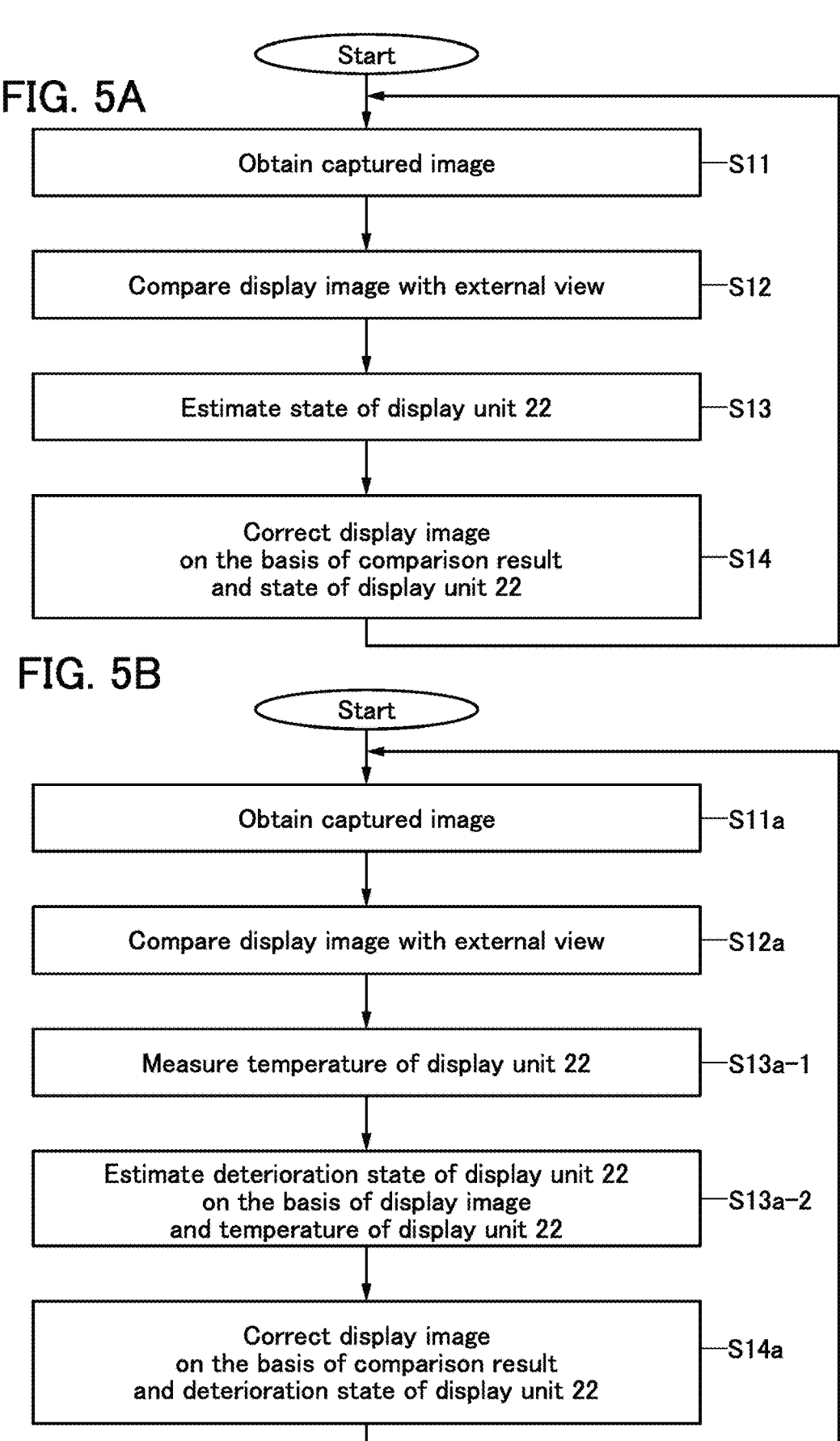

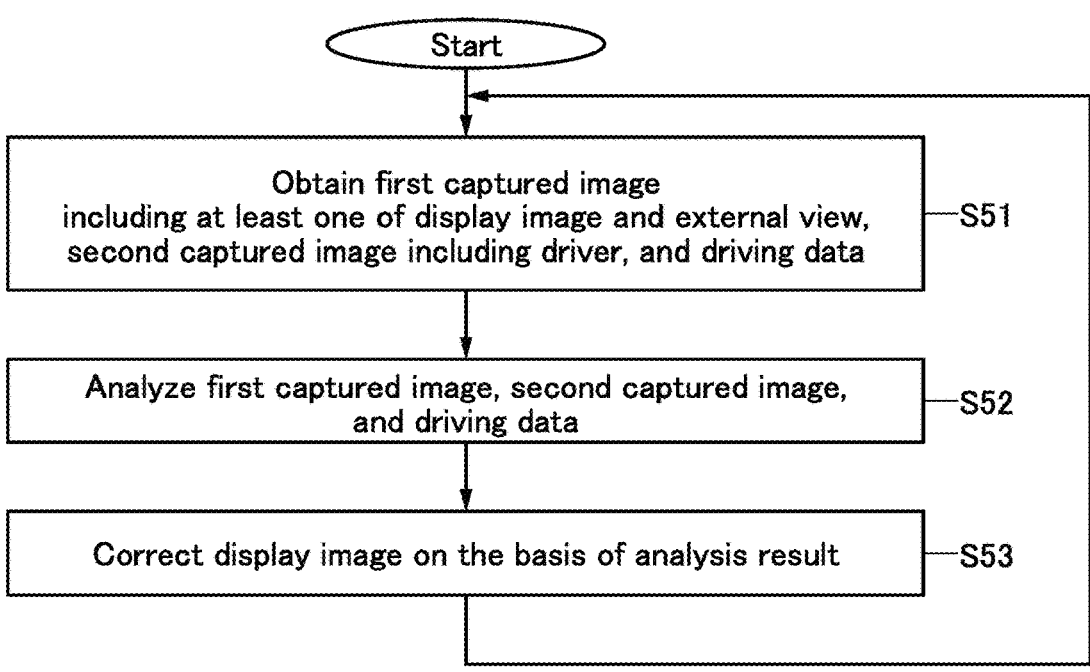

Start

Obtain first captured image
including at least one of display image and external view,
second captured image including driver, and driving data — S51

Analyze first captured image, second captured image,
and driving data — S52

Correct display image on the basis of analysis result — S53

FIG. 9B

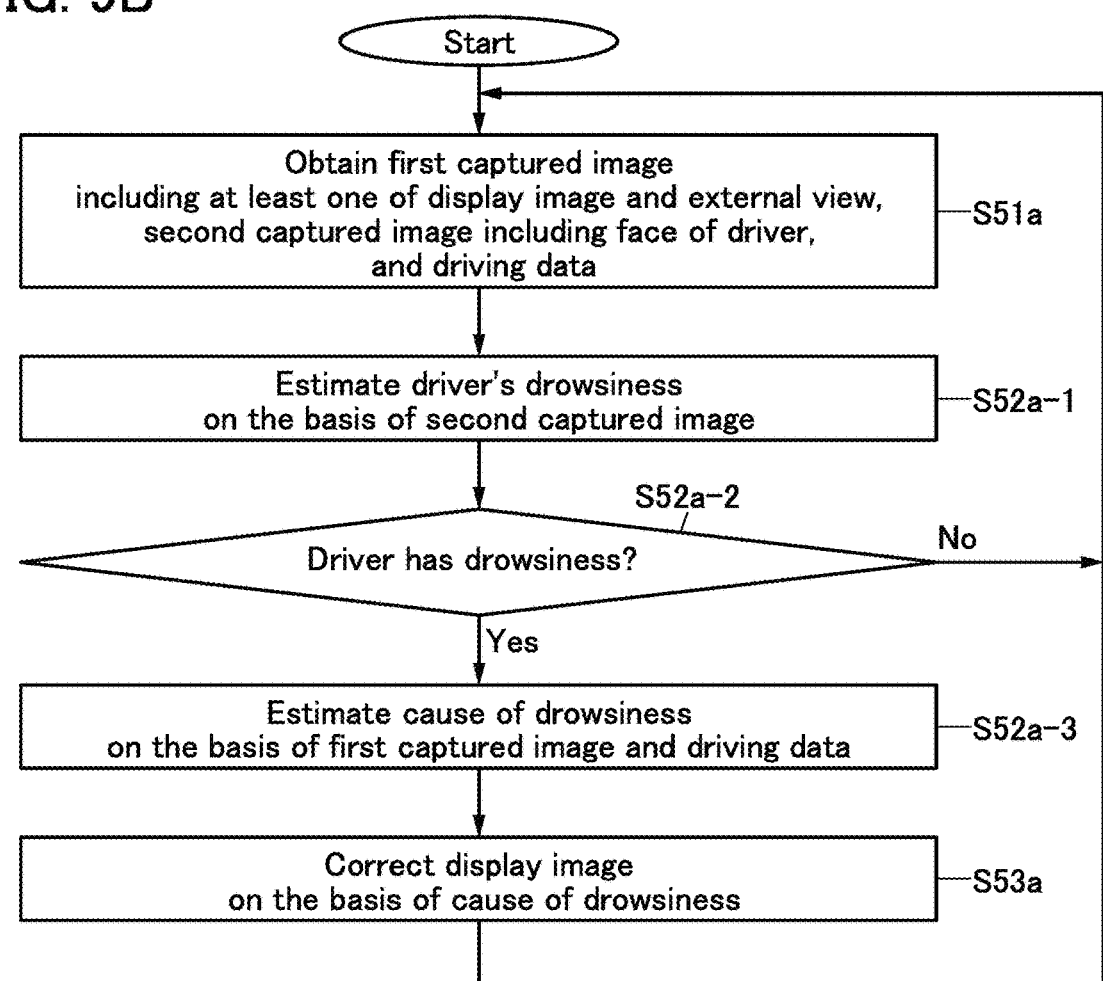

Start

Obtain first captured image
including at least one of display image and external view,
second captured image including face of driver,
and driving data — S51a Estimate driver's drowsiness
on the basis of second captured image — S52a-1

S52a-2

Driver has drowsiness? — No

Yes

Estimate cause of drowsiness
on the basis of first captured image and driving data — S52a-3

Correct display image
on the basis of cause of drowsiness — S53a

FIG. 12A
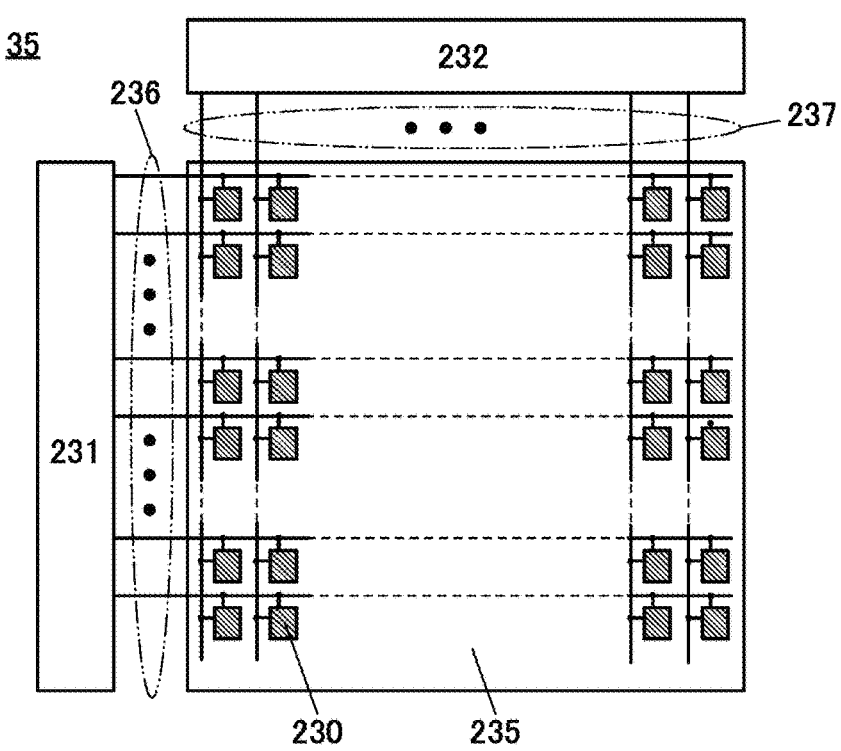
FIG. 12B1   FIG. 12B2   FIG. 12B3   FIG. 12B4
FIG. 12B5   FIG. 12B6   FIG. 12B7   FIG. 12B8
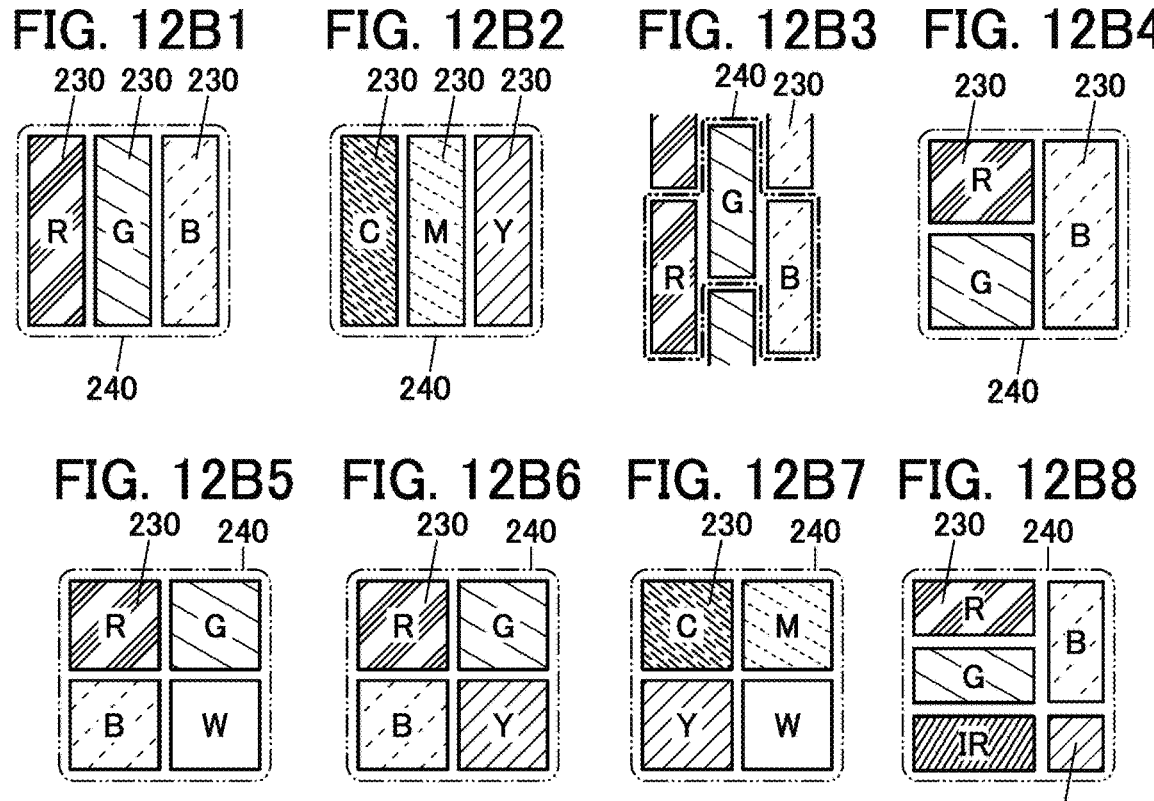

FIG. 13A
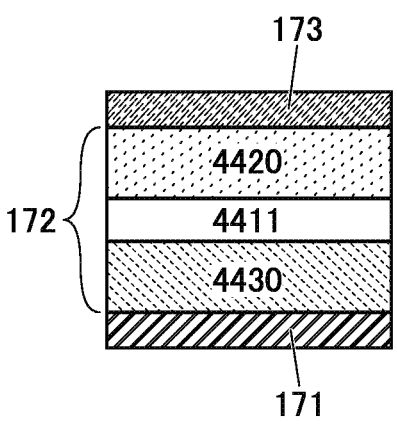
FIG. 13B
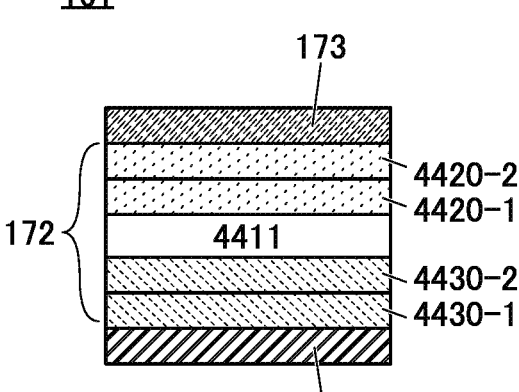
FIG. 13C
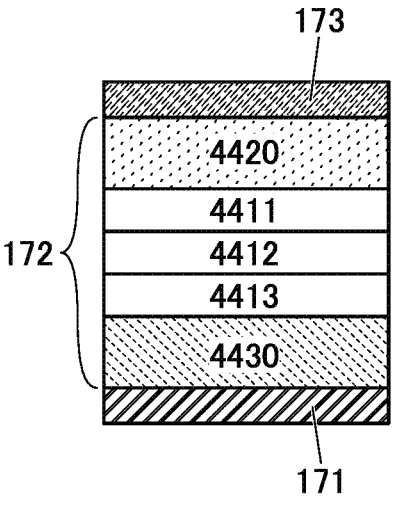
FIG. 13D

FIG. 15A
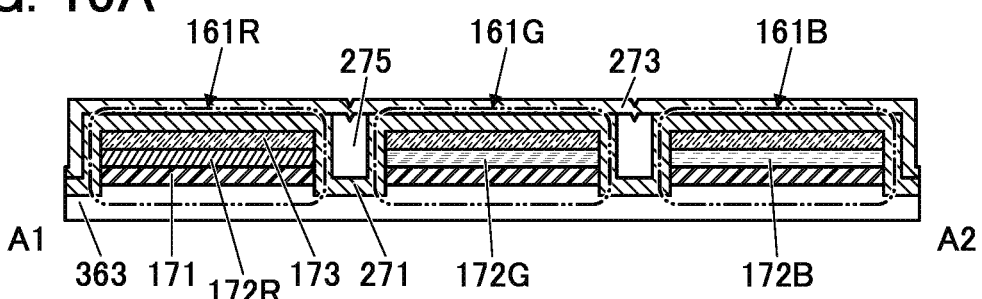
FIG. 15B
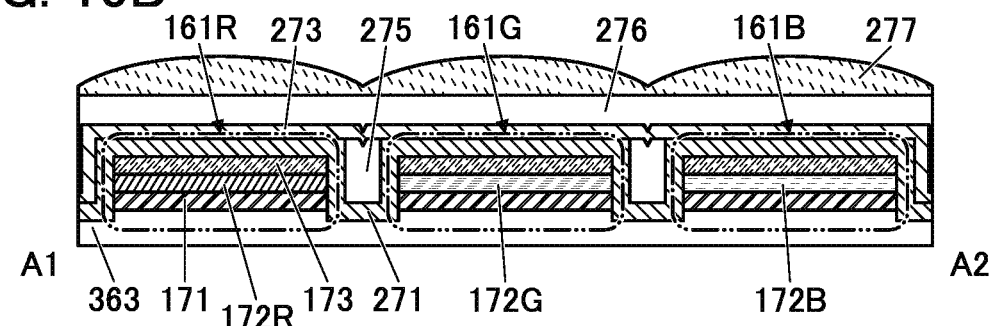
FIG. 15C
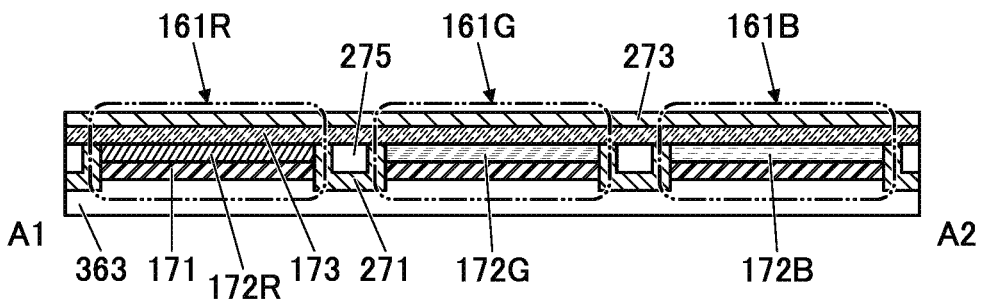
FIG. 15D

FIG. 21A
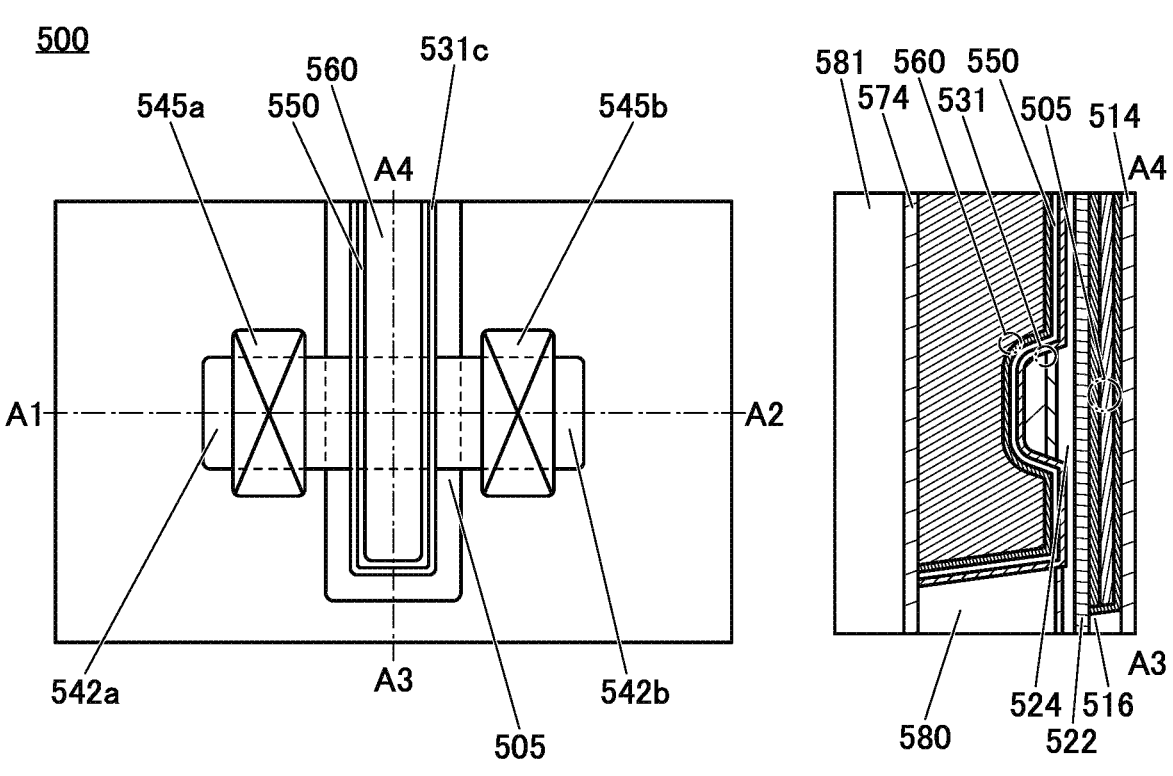
FIG. 21C
FIG. 21B
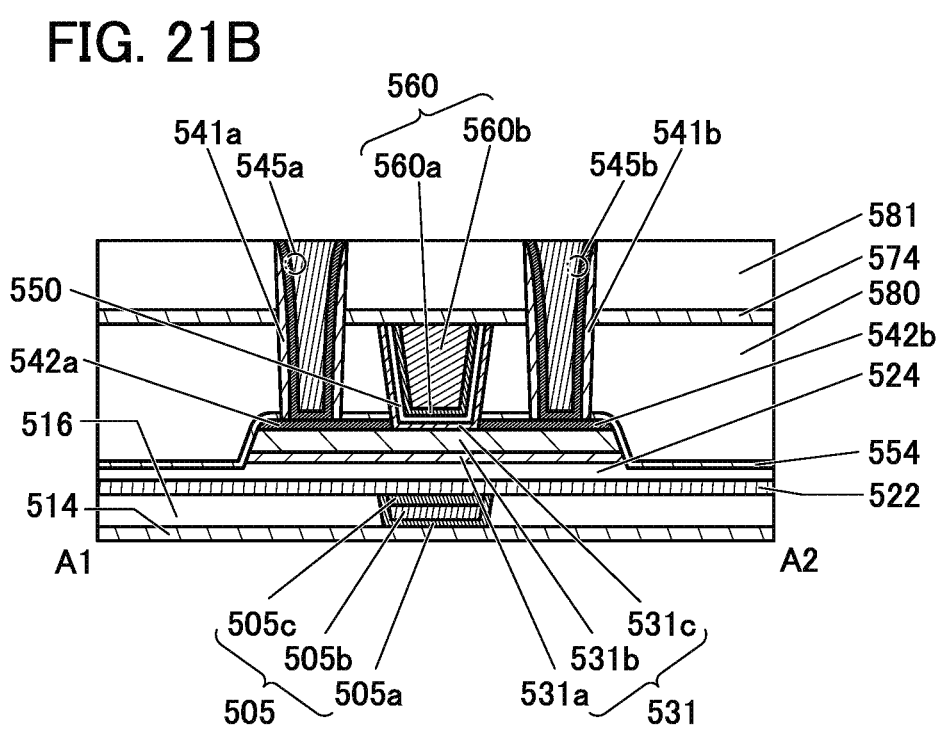

FIG. 22A
Intermediate state
New crystalline phase
| Amorphous | Crystalline | Crystal |
|---|---|---|
| ▪completely amorphous | ▪CAAC<br>▪nc<br>▪CAC<br><br>excluding single crystal and poly crystal | ▪single crystal<br>▪poly crystal |
FIG. 22B
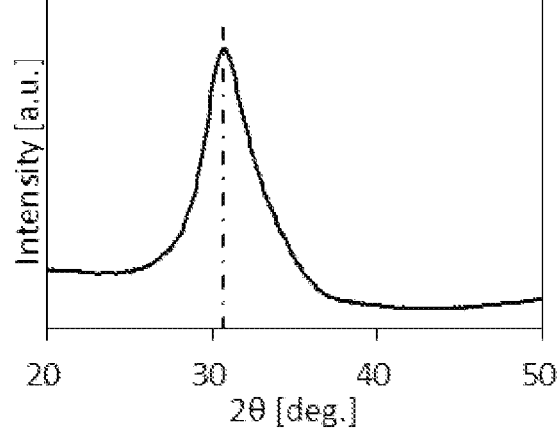
FIG. 22C
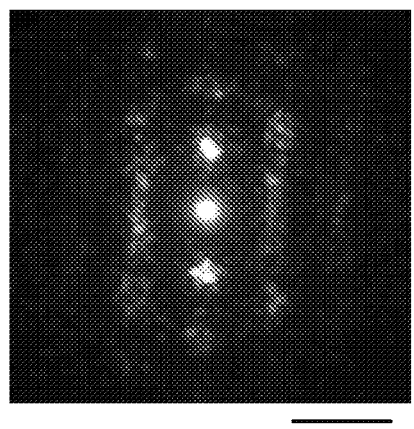
5nm⁻¹

601

611

602

611

603

611

604

611

605

611

MOVING OBJECT

TECHNICAL FIELD

One embodiment of the present invention relates to a moving object.

Note that one embodiment of the present invention is not limited to the above technical field. The technical field of the invention disclosed in this specification and the like relates to an object, a method, or a manufacturing method. Alternatively, one embodiment of the present invention relates to a process, a machine, manufacture, or a composition of matter. Thus, more specifically, examples of the technical field of one embodiment of the present invention disclosed in this specification and the like include a semiconductor device, a display apparatus, a light-emitting device, a power storage device, an imaging device, a memory device, a driving method thereof, and a manufacturing method thereof.

BACKGROUND ART

An in-vehicle display, which is a display apparatus mounted on a moving object such as a motor vehicle, has been developed. For example, Patent Document 1 discloses a head-up display that is a kind of in-vehicle display. In a head-up display, an image is displayed to overlap with an external view seen from a window such as a windshield. That is, an augmented reality (AR) display can be performed using the head-up display.

REFERENCE

Patent Document

[Patent Document 1] Japanese Published Patent Application No. 2021-36324

SUMMARY OF THE INVENTION

Problems to be Solved by the Invention

In an in-vehicle display performing an AR display, such as a head-up display, a display image is hard to be recognized because of an external view in some cases. For example, when a color of the display image and a color of the external view of a region overlapping with the display image are similar to each other, the visibility of the display image decreases compared to the case where the colors are far different from each other in some cases.

An object of one embodiment of the present invention is to provide a moving object including a display apparatus capable of performing a highly visible display. Another object of one embodiment of the present invention is to provide a moving object in which a display image and an external view are highly visible. Another object of one embodiment of the present invention is to provide a moving object including a display apparatus capable of performing a display on the basis of condition of a driver. Another object of one embodiment of the present invention is to provide a moving object including a display apparatus capable of performing a display for relieving driver's drowsiness. Another object of one embodiment of the present invention is to provide a moving object which can perform control in accordance with circumstances of the outside. Another object of one embodiment of the present invention is to provide a moving object which can prevent occurrence of an accident. Another object of one embodiment of the present invention is to provide a multifunctional and inexpensive moving object. Another object of one embodiment of the present invention is to provide a highly convenient moving object. Another object of one embodiment of the present invention is to provide a novel moving object. Another object of one embodiment of the present invention is to provide a driving method or control method of the above-described moving object. Another object of one embodiment of the present invention is to provide a display apparatus included in the above-described moving object or a driving method thereof.

Note that the objects of one embodiment of the present invention are not limited to the objects listed above. The objects listed above do not preclude the existence of other objects. Note that the other objects are objects that are not described in this section and will be described below. The objects that are not described in this section are derived from the description of the specification, the drawings, and the like and can be extracted as appropriate from the description by those skilled in the art. Note that one embodiment of the present invention is to solve at least one of the objects listed above and/or the other objects.

Means for Solving the Problems

One embodiment of the present invention is a moving object including a display unit, an imaging unit, an arithmetic unit, and a control unit; the display unit has a function of displaying a display image; the imaging unit has a function of obtaining a first captured image including the display image and an external view overlapping with the display image; the arithmetic unit has a function of comparing a color of the display image and a color of the external view on the basis of the first captured image and correcting the color of the display image on the basis of a comparison result; and the control unit has a function of controlling running of the moving object on the basis of the first captured image.

In the above embodiment, the arithmetic unit may have a function of making the color of the display image into a color complementary to the color of the external view.

In the above embodiment, the imaging unit may have a function of obtaining a second captured image including a driver of the moving object, estimating condition of the driver on the basis of the second captured image, and correcting the display image on the basis of an estimation result.

In the above embodiment, the second captured image may include a face of the driver.

In the above embodiment, the condition of the driver may be drowsiness of the driver.

In the above embodiment, the moving object may include an in-vehicle light; the arithmetic unit may have a function of obtaining external illuminance on the basis of the first captured image; and the control unit may have a function of controlling luminance of the in-vehicle light on the basis of the external illuminance.

One embodiment of the present invention is a moving object including a display unit, an imaging unit, a driving data obtaining unit, and an arithmetic unit; the display unit has a function of displaying a display image; the imaging unit has a function of obtaining a first captured image including the display image and an external view overlapping with the display image and a second captured image including a driver of the moving object; the driving data obtaining unit has a function of obtaining driving data; the arithmetic unit has a function of estimating condition of the driver on the basis of the second captured image; the arithmetic unit has a function of estimating a cause of the condition of the driver on the basis of the first captured image and the driving data; and the arithmetic unit has a function of correcting the display image on the basis of the cause.

In the above embodiment, the driving data may include at least a change in running speed of the moving object over time.

In the above embodiment, the condition of the driver may be drowsiness of the driver.

In the above embodiment, the second captured image may include a face of the driver.

In the above embodiment, the arithmetic unit may have a function of detecting an object included in the first captured image, and the arithmetic unit may have a function of correcting the display image on the basis of the object and the driving data.

In the above embodiment, the driving data may include at least one of operation frequency of a gas pedal and operation frequency of a brake; the arithmetic unit may have a function of changing transmittance of the display image when the operation frequency of the gas pedal or the operation frequency of the brake is equal to or more than a predetermined value.

In the above embodiment, the arithmetic unit may have a function of changing the transmittance of the display image when a predetermined number of people or more are detected as the objects.

In the above embodiment, the moving object may include a control unit, and the control unit has a function of controlling running of the moving object on the basis of the first captured image.

Effect of the Invention

One embodiment of the present invention can provide a moving object including a display apparatus capable of performing a highly visible display. Furthermore, one embodiment of the present invention can provide a moving object in which a display image and an external view are highly visible. Furthermore, one embodiment of the present invention can provide a moving object including a display apparatus capable of performing a display on the basis of condition of the driver. Furthermore, one embodiment of the present invention can provide a moving object including a display apparatus capable of performing a display relieving driver's drowsiness. Furthermore, one embodiment of the present invention can provide a moving object which can perform control in accordance with circumstances of the outside. Furthermore, one embodiment of the present invention can provide a moving object which can prevent occurrence of an accident. Furthermore, one embodiment of the present invention can provide a multifunctional and inexpensive moving object. Furthermore, one embodiment of the present invention can provide a highly convenient moving object. Furthermore, one embodiment of the present invention can provide a novel moving object. Furthermore, one embodiment of the present invention can provide a driving method or control method of the above-described moving object. Furthermore, one embodiment of the present invention can provide a display apparatus included in the above-described moving object or a driving method thereof.

Note that the effects of one embodiment of the present invention are not limited to the effects listed above. The effects listed above do not preclude the existence of other effects. Note that the other effects are effects that are not described in this section and will be described below. The effects that are not described in this section are derived from the description of the specification, the drawings, and the like and can be extracted as appropriate from the description by those skilled in the art. Note that one embodiment of the present invention has at least one of the effects listed above and/or the other effects. Accordingly, depending on the case, one embodiment of the present invention does not have the effects listed above in some cases.

BRIEF DESCRIPTION OF THE DRAWINGS

FIG. 5A and FIG. 5B are flow charts showing examples of a driving method of the moving object.

FIG. 9A and FIG. 9B are flow charts showing examples of a driving method of the moving object.

FIG. 12A is a block diagram illustrating a structure example of a display apparatus. FIG. 12B1 to FIG. 12B8 are top views illustrating configuration examples of a pixel.

FIG. 13A to FIG. 13D are cross-sectional views illustrating structure examples of a light-emitting element.

FIG. 15A to FIG. 15D are cross-sectional views illustrating structure examples of the display apparatus.

FIG. 21A is a top view illustrating a structure example of a transistor. FIG. 21B and FIG. 21C are cross-sectional views illustrating the structure example of the transistor.

FIG. 22A is a diagram showing classification of crystal structures of IGZO. FIG. 22B is a diagram showing an XRD spectrum of a CAAC-IGZO film. FIG. 22C is a diagram showing a nanobeam electron diffraction pattern of the CAAC-IGZO film.

MODE FOR CARRYING OUT THE INVENTION

Figure 1A:
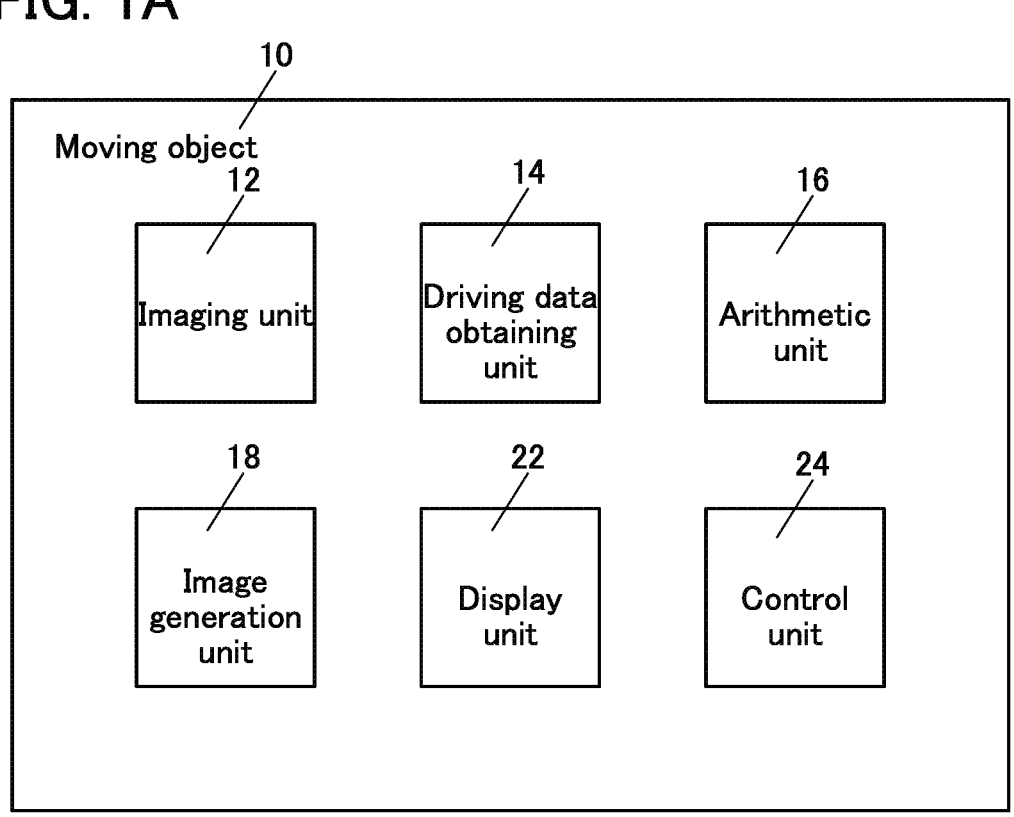
FIG. 1A is a block diagram illustrating a structure example of a moving object.

Hereinafter, embodiments are described with reference to the drawings. Note that the embodiments can be implemented in many different modes, and it is readily understood by those skilled in the art that modes and details thereof can be changed in various ways without departing from the spirit and scope thereof. Thus, the present invention should not be interpreted as being limited to the following description of the embodiments.

Note that in structures of the invention described below, the same portions or portions having similar functions are denoted by the same reference numerals in different drawings, and the description thereof is not repeated. Furthermore, the same hatch pattern is used for the portions having similar functions, and the portions are not especially denoted by reference numerals in some cases.

In each drawing described in this specification, the size, the layer thickness, or the region of each component is exaggerated for clarity in some cases. Therefore, they are not limited to the illustrated scale.

In this specification and the like, the ordinal numbers such as "first" and "second" are used in order to avoid confusion among components and do not limit the number.

In this specification and the like, the term "film" and the term "layer" can be interchanged with each other depending on the case or depending on circumstances. For example, in some cases, the term "conductive layer" or the term "insulating layer" can be interchanged with the term "conductive film" or the term "insulating film", respectively.

In this specification and the like, "parallel" indicates a state where two straight lines are placed at an angle greater than or equal to −10° and less than or equal to 10°. Accordingly, the case where the angle is greater than or equal to −5° and less than or equal to 5° is also included. Furthermore, "substantially parallel" indicates a state where two straight lines are placed at an angle greater than or equal to −30° and less than or equal to 30°. Moreover, "perpendicular" indicates a state where two straight lines are placed at an angle greater than or equal to 80° and less than or equal to 100°. Accordingly, the case where the angle is greater than or equal to 85° and less than or equal to 95° is also included. Moreover, "substantially perpendicular" indicates a state where two straight lines are placed at an angle greater than or equal to 60° and less than or equal to 120°.

Note that in this specification and the like, an EL layer means a layer containing at least a light-emitting substance (also referred to as a light-emitting layer) or a stack including the light-emitting layer provided between a pair of electrodes of a light-emitting element.

In this specification and the like, a display panel that is one embodiment of a display apparatus has a function of displaying (outputting), for example, an image on (to) a display surface. Therefore, the display panel is one embodiment of an output device.

In this specification and the like, a structure in which a connector such as an FPC (Flexible Printed Circuit) or a TCP (Tape Carrier Package) is attached to a substrate of a display panel, or a structure in which an IC is mounted on a substrate by a COG (Chip On Glass) method or the like is referred to as a display panel module or a display module, or simply referred to as a display panel or the like in some cases.

Embodiment 1

In this embodiment, a moving object of one embodiment of the present invention is described with reference to diagrams, for example.

One embodiment of the present invention relates to a moving object including a display apparatus. The display apparatus can be, for example, a head-up display or a transparent display and can display an image in such a manner that the image overlaps with an external view seen from a window unit such as a windshield. The moving object of one embodiment of the present invention first obtains a captured image including a display image that is an image displayed by the display apparatus and an external view overlapping with the display image. Next, the display image and the external view are compared with each other on the basis of the captured image. Then, the image is corrected based on a comparison result. Thus, the visibility of the display image can be increased. For example, when a color of the display image is complementary to a color of the external view of a region overlapping with the display image, the visibility of a display image can be increased.

When the display image is corrected based on the captured image including the display image and the external view overlapping with the display image, the display image can be appropriately corrected even if, for example, the display apparatus deteriorates. For example, in the case where the display apparatus includes a light-emitting element (also referred to as a light-emitting device) such as an organic EL element as a display element (also referred to as a display device) and corrects the display image on the basis of the amount of current flowing through the light-emitting element and the external view, the display image cannot be appropriately corrected when the light-emitting element deteriorates. This is because, before and after deterioration of the light-emitting element, although the amount of current flowing through the light-emitting element is the same, luminance of light emitted from the light-emitting element differs from each other in some cases, for example. In contrast, in the case where the display image is corrected based on the captured image including the display image, the display image can be corrected in consideration of a change in emission luminance due to deterioration of the light-emitting element, for example. Accordingly, the display image can be appropriately corrected even if the display apparatus deteriorates.

In addition, running of the moving object of one embodiment of the present invention can be controlled based on the above captured image. Thus, the moving object of one embodiment of the present invention can perform autonomous driving, for example. By making a captured image for correction of the display image and a captured image for running control of the moving object the same image, the imaging device used for correction of the display image can be the same as the imaging device used for running control of the moving object. Thus, the number of components provided in the moving object can be reduced as compared with the case where the imaging device used for correction of the display image is different from the imaging device used for running control of the moving object. Accordingly, the moving object of one embodiment of the present invention can be a multifunctional and inexpensive moving object.

Furthermore, the imaging device included in the moving object of one embodiment of the present invention can take an image of a moving object's driver, for example. Thus, the moving object of one embodiment of the present invention can estimate condition of the moving object's driver or the like; for example, the moving object can estimate drowsiness of the moving object's driver. Accordingly, the moving object of one embodiment of the present invention can correct the display image on the basis of the condition of the driver; for example, the moving object can correct the display image to relieve the driver's drowsiness. Here, the imaging device that takes the image of the moving object's driver can be the same as the imaging device used for correction of the display image and for running control of the moving object, for example. For example, when the imaging device is an omnidirectional camera, the imaging device for taking the image of the driver of the moving object of one embodiment of the present invention can be the same as the imaging device used for correction of the display image and for running control of the moving object.

<Structure Example of Moving Object>

FIG. 1A is a block diagram illustrating a structure example of a moving object 10 which is the moving object of one embodiment of the present invention. The moving object 10 corresponds to, for example, a vehicle; specifically, a motor vehicle, a bus, a train, and the like can be given. Unless otherwise specified below, the moving object is explained as being a motor vehicle.

The moving object 10 includes an imaging unit 12, a driving data obtaining unit 14, an arithmetic unit 16, an image generation unit 18, a display unit 22, and a control unit 24. Note that the structure example illustrated in FIG. 1A can be referred to as a structure example of a system for a moving object included in the moving object 10.

The imaging unit 12 has a function of performing imaging to obtain a captured image. The imaging unit 12 can have a structure in which pixels each having a light-receiving element (also referred to as a light-receiving device) are arranged in a matrix, and can perform imaging using the light-receiving element, for example.

The driving data obtaining unit 14 has a function of obtaining data showing a driving state of the moving object 10. For example, the driving data can show a change in running speed of the moving object 10 over time. Furthermore, the driving data can show operation frequency of a gas pedal and operation frequency of a brake. In addition, the driving data may show a running time, a running distance, the rotation amount of a steering wheel, engine rotation speed, or the like of the moving object 10. The driving data obtaining unit 14 can include, for example, a tachograph such as a digital tachograph.

The arithmetic unit 16 has a function of performing arithmetic operation necessary for achieving a function of the moving object 10. The arithmetic unit 16 has a function of performing arithmetic operation on the basis of a captured image, for example. Furthermore, the arithmetic unit 16 has a function of performing arithmetic operation on the basis of the driving data, for example. The arithmetic unit 16 can include a CPU (Central Processing Unit), for example.

The arithmetic unit 16 may have a function of performing arithmetic operation by machine learning. In that case, the arithmetic unit 16 preferably has a function of performing arithmetic operation with a neural network. For example, the arithmetic unit 16 preferably has a function of performing arithmetic operation with one or more of a feedforward neural network (FFNN), a convolutional neural network (CNN), a recurrent neural network (RNN), and a long/short-term memory (LSTM) unit.

When the arithmetic unit 16 has a function of performing arithmetic operation by machine learning, the arithmetic unit 16 preferably includes a GPU (Graphics Processing Unit). When the arithmetic unit 16 includes a GPU, the arithmetic unit 16 can perform parallel arithmetic operation at high speed; thus, the arithmetic unit 16 can perform matrix operation (product-sum operation) necessary for machine learning, for example.

The image generation unit 18 has a function of generating image data. For example, the image generation unit 18 has a function of generating image data on the basis of arithmetic operation results obtained by the arithmetic unit 16.

The display unit 22 has a function of displaying an image corresponding to image data generated by the image generation unit 18. In this specification and the like, for example, an image displayed on the display unit 22 is referred to as a display image.

The display unit 22 can have a structure in which pixels each including a display element are arranged in a matrix. As the display element, a light-emitting element can be used; specifically, an organic EL element can be used, for example. As the light-emitting element, for example, an inorganic EL element, a quantum dot, a light-emitting diode (LED), or the like may be used. In the case where an LED is used as the light-emitting element, a micro LED is particularly preferable because a high-quality image can be displayed on the display unit 22. Note that a liquid crystal element (also referred to as a liquid crystal device) or a digital micromirror device (DMD) may be used as the display element. A laser display may be used as the display unit 22.

The control unit 24 has a function of controlling driving of the moving object 10. For example, the control unit 24 has a function of accelerating and decelerating (braking) the moving object 10. Furthermore, the control unit 24 has a function of controlling a running direction of the moving object 10, that is, performing steering of the moving object 10. The control unit 24 can control driving of the moving object 10 on the basis of the arithmetic operation results obtained by the arithmetic unit 16.

The moving object 10 includes the imaging unit 12, the arithmetic unit 16, and the control unit 24, so that the moving object 10 can have a function of performing autonomous driving. For example, the arithmetic unit 16 performs arithmetic processing such as object recognition on the basis of the captured image obtained by the imaging unit 12 and the control unit 24 controls driving of the moving object 10 on the basis of the arithmetic operation results, whereby the moving object 10 can perform autonomous driving.

Note that FIG. 1A illustrates a structure in which the moving object 10 includes the imaging unit 12, the driving data obtaining unit 14, the arithmetic unit 16, the image generation unit 18, the display unit 22, and the control unit 24 as an example; however, one embodiment of the present invention is not limited thereto. For example, in addition to the above components, a sensor unit may be included. As the above sensor unit, a sensor (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays) may be included, for example. Note that as the above sensor, a distance image sensor such as a LIDAR (Light Detection and Ranging) or a sensor using a ToF (Time of Flight) method can be suitably used, for example.

Figure 1B:
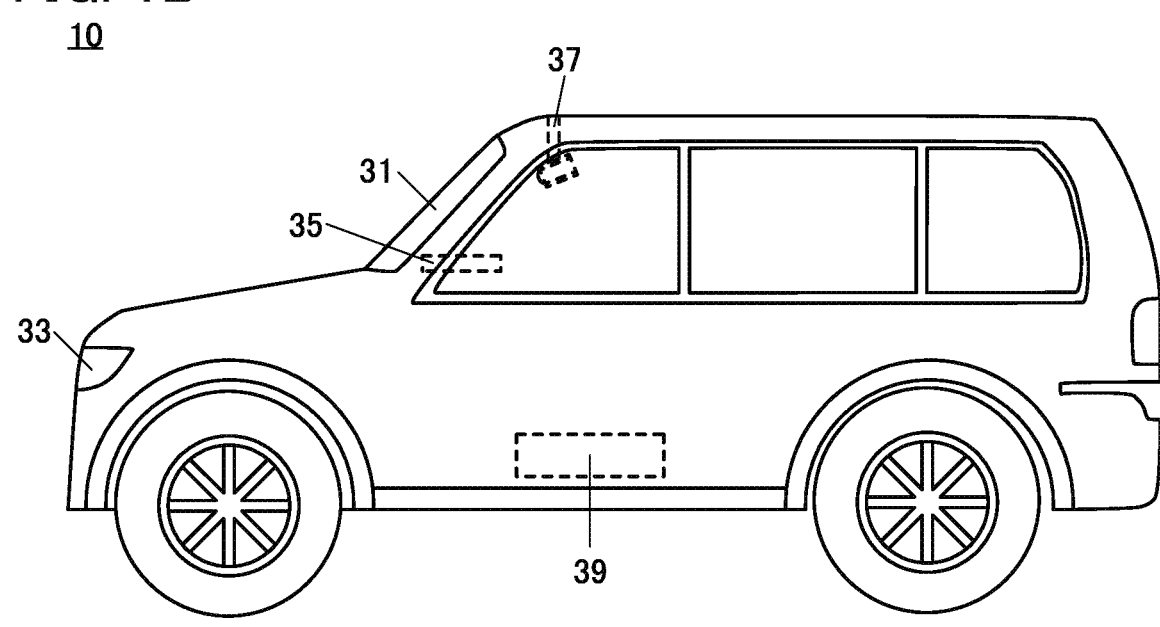
FIG. 1B is a schematic diagram illustrating a structure example of the moving object.

FIG. 1B is a schematic diagram illustrating a structure example of the moving object 10, and an example of the appearance of the moving object 10 including the system for a moving object illustrated in FIG. 1A, for example. The moving object 10 includes a window unit 31, a lighting unit 33, a display apparatus 35, an imaging device 37, and a semiconductor device 39.

The window unit 31 can be a windshield, for example. Furthermore, for example, a side window or a rear window can be the window unit 31. A person who is in the moving object 10, such as a driver of the moving object 10, can see an external view from the window unit 31.

The lighting unit 33 can be a head light, for example. Furthermore, the lighting unit 33 can be a cornering light, a fog light, a back light, or a back fog light, for example. By turning on the lighting unit 33, sufficient external illuminance can be ensured even under conditions in which external illuminance is low, such as during the nighttime or in the inside of a tunnel, for example. The lighting unit 33 can be referred to as an in-vehicle light.

The display apparatus 35 includes, for example, the display unit 22 illustrated in FIG. 1A. Note that the display apparatus 35 may include, for example, the image generation unit 18 illustrated in FIG. 1A.

The display image which is an image displayed by the display apparatus 35 can be displayed to overlap with an external view seen from the window unit 31. Accordingly, as compared with the case where an image is displayed not to overlap with an external view, for example, gaze movement of a driver of the moving object 10 can be reduced, so that a load on the driver of the moving object 10 can be reduced.

The imaging device 37 includes the imaging unit 12 illustrated in FIG. 1A, for example. An image of an external view can be taken through the window unit 31 by the imaging device 37, for example. Here, in the case where the display apparatus 35 displays an image in such a manner that the display image overlaps with the external view seen from the window unit 31, the imaging device 37 can obtain a captured image including the display image and the external view. Note that the captured image obtained by the imaging device 37 does not necessarily include one of the display image and the external view.

Note that the position of the imaging device 37 is not limited to the position illustrated in FIG. 1B, and the imaging device 37 may be provided on the back side of a room mirror included in the moving object 10, for example. The imaging device 37 may be placed on the outside of the moving object 10, for example, on a head light, on a license plate, or in the vicinity thereof. The imaging device 37 may be provided on a steering wheel.

The imaging device 37 may have a function of obtaining not only a captured image including an external view but also a captured image including a driver of the moving object 10. Here, the imaging device 37 included in the moving object 10 is preferably an imaging device which can take images in all directions, such as an omnidirectional camera, because one imaging device 37 can obtain both of the captured image including the external view and the captured image including the driver of the imaging object 10.

The semiconductor device 39 includes the driving data obtaining unit 14, the arithmetic unit 16, the image generation unit 18, and the control unit 24 illustrated in FIG. 1A, for example. Note that in the case where the display apparatus 35 includes the image generation unit 18, a structure without the image generation unit 18 can be used for the semiconductor device 39. The semiconductor device 39 can include a CPU, for example. The semiconductor device 39 can include a GPU, for example.

Figure 2A:
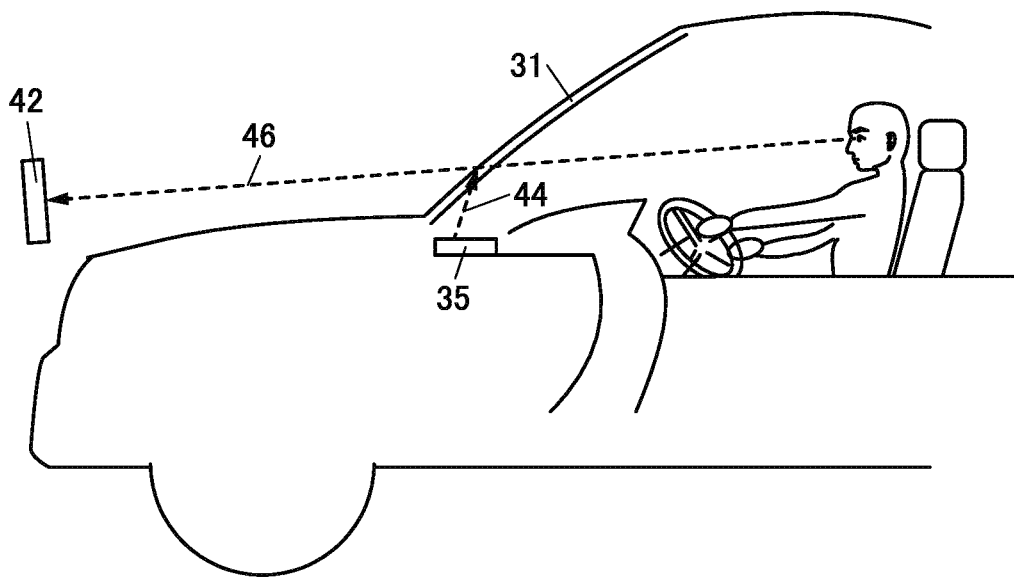
FIG. 2A and FIG. 2B are schematic diagrams illustrating an example of a display apparatus included in a moving object.
Figure 2B:
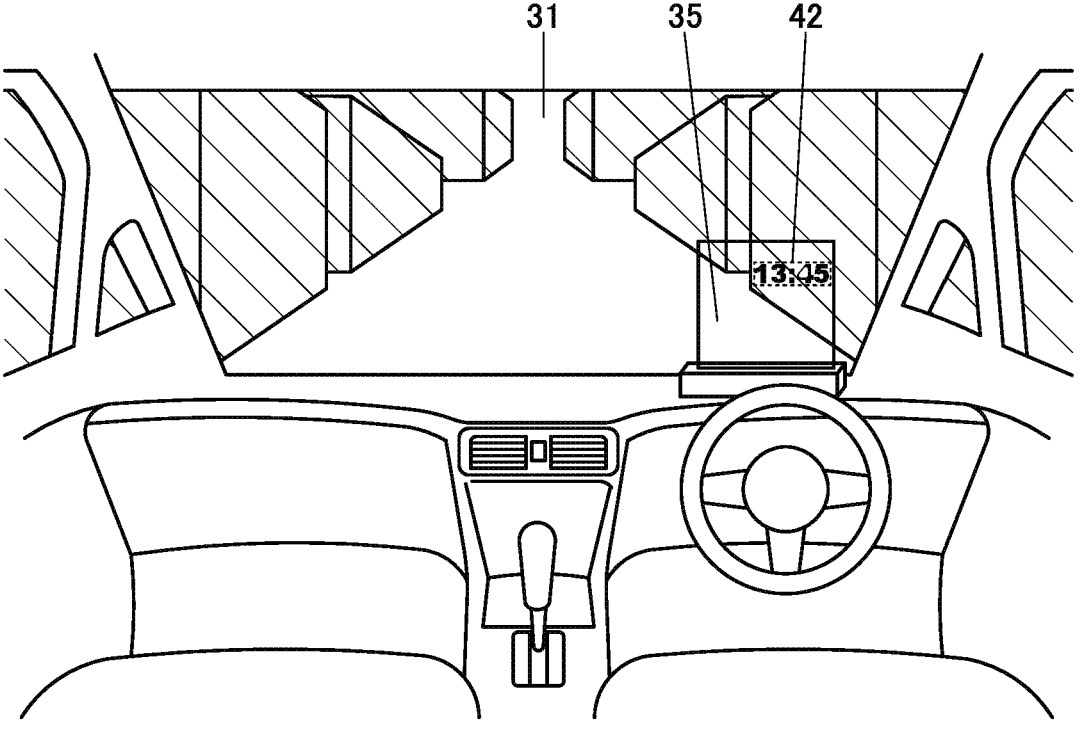

FIG. 2A and FIG. 2B are schematic diagrams illustrating examples of the display apparatus 35. The display apparatus 35 illustrated in FIG. 2A is a head-up display and projects an image on the window unit 31 as indicated by an arrow 44. Thus, a display image 42 is displayed as a virtual image, and a person in the moving object 10 can see the display image 42 as indicated by an arrow 46.

The display apparatus 35 illustrated in FIG. 2A may have a function of displaying an image displayed by a display apparatus included in an electronic device such as a smartphone or a tablet, for example. For example, an image displayed by an electronic device such as a smartphone or a tablet may be reflected by the display apparatus 35 and projected on the window unit 31. Image data for representing the image displayed by the electronic device such as a smartphone or a tablet may be input to the display apparatus 35 and an image corresponding to the image data may be displayed on the display apparatus 35. Thus, the display apparatus 35 can change the display image 42 in synchronization with an electronic device.

The display apparatus 35 illustrated in FIG. 2B is a transparent display and a person in the moving object 10 can see an external view even through the display apparatus 35. Thus, the display apparatus 35 can display the display image 42 in such a manner that the display image overlaps with the external view seen from the window unit 31.

In the case where the display apparatus 35 is a transparent display, the display apparatus 35 can be attached to the window unit 31. When the display apparatus 35 is attached to the window unit 31, the display apparatus 35 preferably has flexibility because even in the case where the window unit 31 has a curved portion, the display apparatus 35 can be attached along with the curved portion.

Example-1 of Driving Method of Moving Object

Figure 3A:
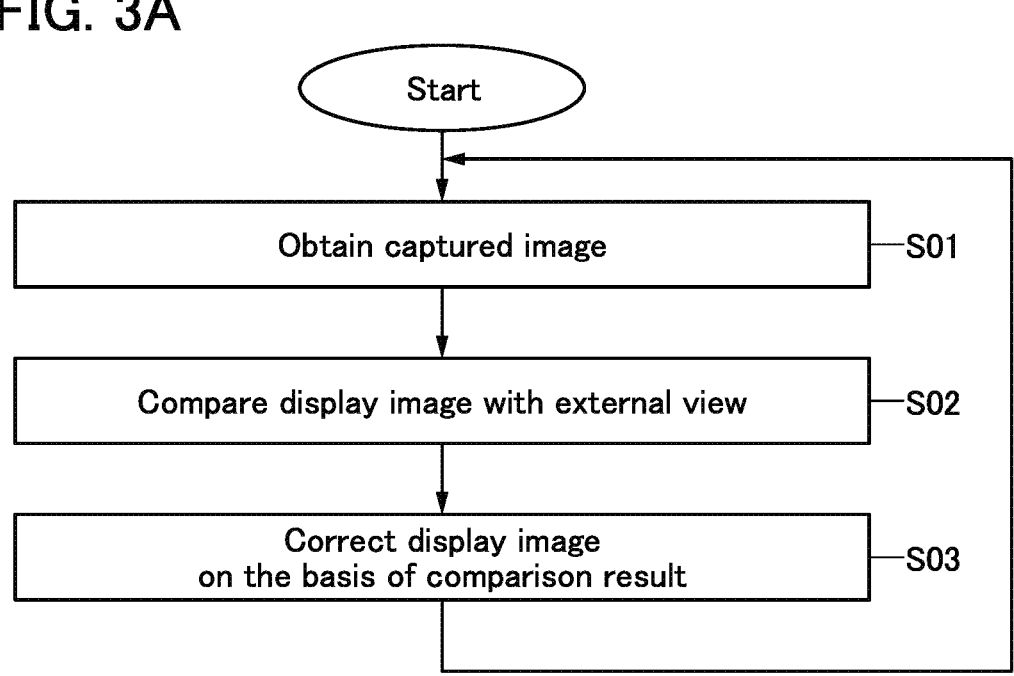
FIG. 3A and FIG. 3B are flow charts showing examples of a driving method of a moving object.

FIG. 3A is a flow chart showing an example of a driving method of the moving object 10 illustrated in FIG. 1A and FIG. 1B. The moving object 10 can correct a display image by the method shown in FIG. 3A.

First, the imaging unit 12 obtains a captured image including a display image and an external view overlapping with the display image (Step S01). Note that the captured image does not necessarily include one of the display image and the external view. Next, the arithmetic unit 16 compares the display image with the external view on the basis of the captured image (Step S02). Note that when the display image is not included in the captured image, the arithmetic unit 16 can compare image data generated by the image generation unit 18 with the captured image, for example.

After that, the arithmetic unit 16 corrects the display image on the basis of a comparison result (Step S03). For example, the display image is corrected so that visibility of the display image is increased. The display image can be corrected through, for example, correction of image data generated by the image generation unit 18 performed by the arithmetic unit 16. Note that the display image may be corrected in consideration of a location, a season, weather, time, or the like. After Step S03, the process returns to Step S01, for example. Alternatively, the operation shown in FIG. 3A is terminated.

Figure 3B:
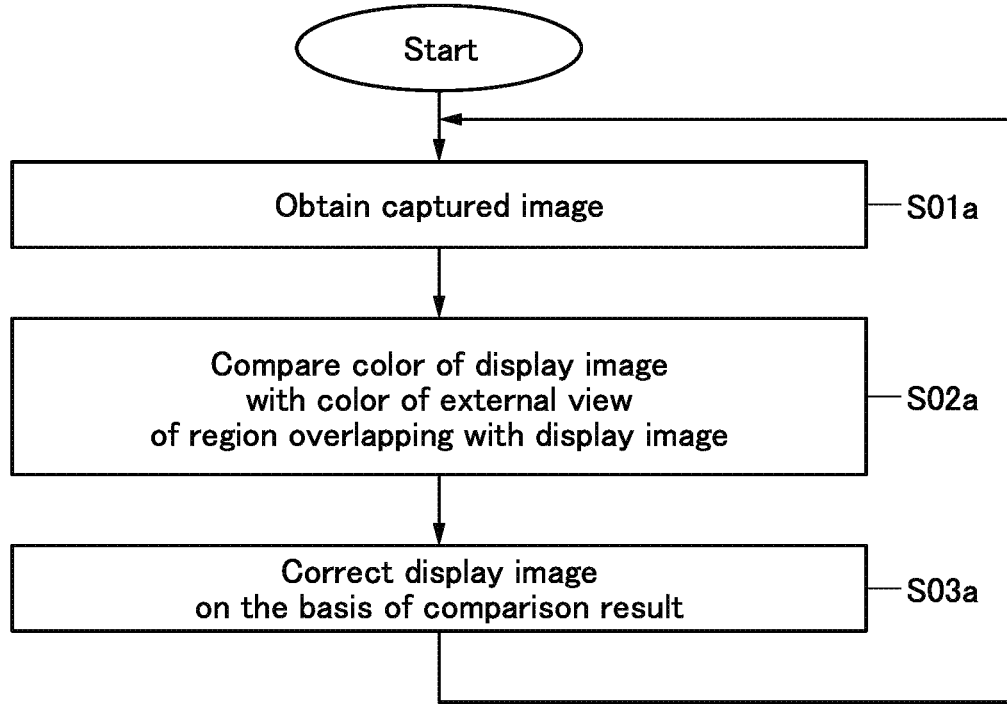

FIG. 3B is a flow chart showing a more specific method of the driving method illustrated in FIG. 3A. First, the imaging unit 12 obtains a captured image including a display image displayed on the window unit 31 by the display unit 22 and an external view overlapping with the display image (Step S01a). As described above, the captured image does not necessarily include one of the display image and the external view. Next, the arithmetic unit 16 compares a color of the display image with a color of the external view of a region overlapping with the display image (Step S02a). As described above, when the display image is not included in the captured image, the arithmetic unit 16 can compare image data generated by the image generation unit 18 with the captured image, for example. Then, based on a comparison result, the arithmetic unit 16 corrects the color of the display image (Step S03a). After Step S03a, the process returns to Step S01a, for example. Alternatively, the operation shown in FIG. 3B is terminated.

For example, when the color of the display image and the color of the external view of a region overlapping with the display image are similar to each other, the visibility of the display image decreases compared to the case where the colors are far different from each other in some cases. Thus, for example, the color of the display image is corrected to a color far different from the color of the external view of a region overlapping with the display image. For example, the color of a display image is made to be a complementary color to the color of the external view of a region overlapping with the display image. For example, when the color of the external view of a region overlapping with the display image is red, the color of the display image is made to be cyan. When the color of the external view of a region overlapping with the display image is green, the color of the display image is made to be magenta. When the color of the external view of a region overlapping with the display image is blue, the color of the display image is made to be yellow. Thus, the visibility of the display image can be increased.

The color of a display image can be corrected by changing at least one of a hue, a brightness, and a saturation, for example. In the case where image data for representing a full-color display image includes data for representing a red image, data for representing a green image, and data for representing a blue image, the color of the display image can be corrected by exchanging the data for each other.

Note that correction of a display image is not limited to correction of the color. For example, the arithmetic unit 16 may correct the luminance of a display image. Furthermore, the arithmetic unit 16 may correct the contrast of a display image. For example, the arithmetic unit 16 can correct the luminance of a display image in accordance with external illuminance obtained based on a captured image. For example, the luminance of a display image is increased when external illuminance is high and the luminance of the display image is lowered when external illuminance is low; thus, the visibility of the display image can be increased. Furthermore, in the case where the luminance of a specific region of an external view included in a captured image is high because of, for example, direct sunlight, a display image is corrected such that the luminance of a region overlapping with the specific region is higher than the luminance of the other regions, whereby the visibility of the display image can be increased.

Furthermore, the arithmetic unit 16 may change the display position of a display image. The arithmetic unit 16 may enlarge or reduce a character or a diagram included in a display image. The arithmetic unit 16 may change the font of a character included in a display image or may additionally edge the character.

Figure 4A:
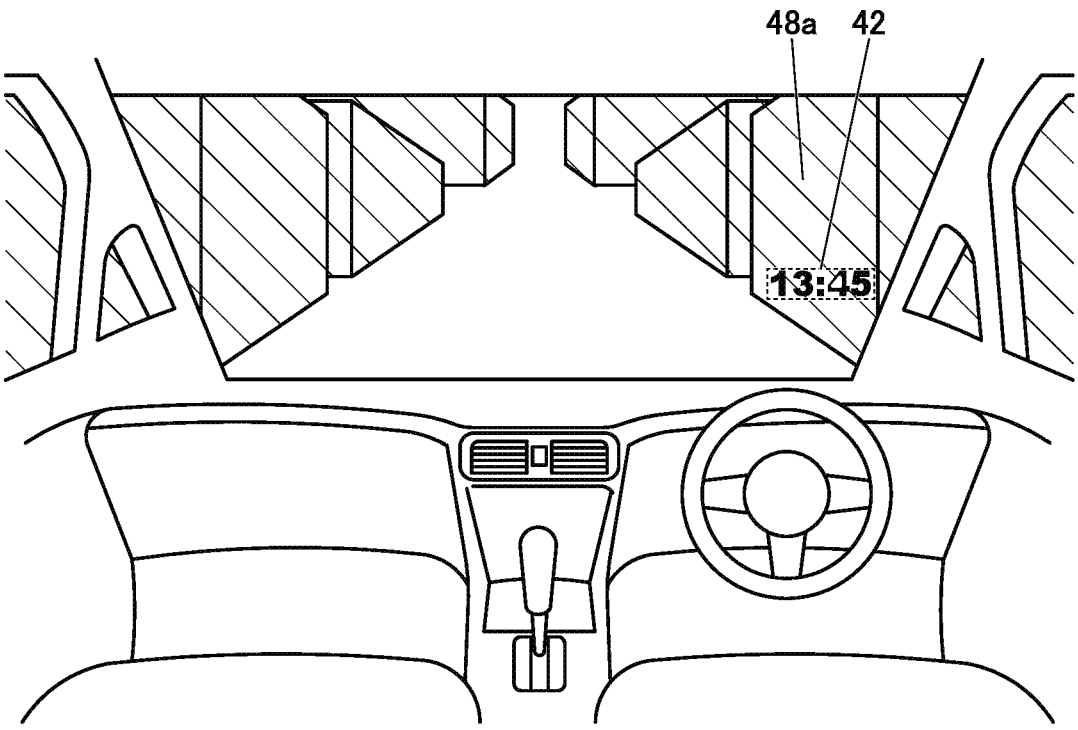
FIG. 4A and FIG. 4B are schematic diagrams illustrating examples of correction of a display image.
Figure 4B:
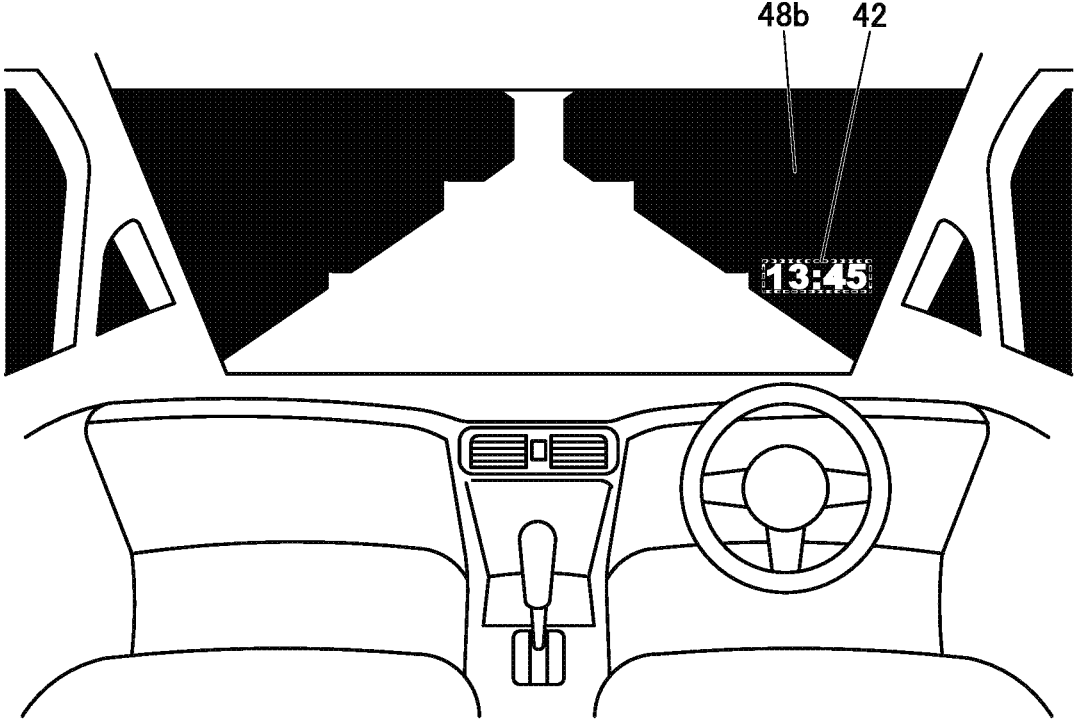

FIG. 4A and FIG. 4B are schematic views illustrating examples of correction of a display image. In the example illustrated in FIG. 4A, the display image 42 is black, and in the example illustrated in FIG. 4B, the display image 42 is white. Here, for example, when the display image 42 is white in the example illustrated in FIG. 4A, the display image 42 assimilates with a building 48a; thus, the visibility of the display image 42 is decreased. For example, when the display image 42 is black in the example illustrated in FIG. 4B, the display image 42 assimilates with a building 48b; thus, the visibility of the display image 42 is decreased. In this case, the display image 42 is made to be black in the example illustrated in FIG. 4A and the display image is made to be white in the example illustrated in FIG. 4B; whereby the visibility of the display image 42 can be increased.

Correction of a display image may be performed by machine learning. For example, correction of a display image may be performed using a neural network. For example, a feature value of a captured image is extracted using a CNN and a display image is corrected based on the feature value so as to increase the visibility.

As described above, running of the moving object 10 can be controlled using a captured image; thus, the moving object 10 can perform autonomous driving, for example. Here, by making a captured image for correction of a display image and a captured image for running control of the moving object 10 the same image, the imaging device used for correction of a display image can be the same as the imaging device used for running control of the moving object. Thus, the number of components provided in the moving object 10 can be reduced as compared with the case where the imaging device used for correction of the display image is different from the imaging device used for running control of the moving object. Accordingly, the moving object 10 can be a multifunctional and inexpensive moving object.

Example-2 of Driving Method of Moving Object

FIG. 5A is a flow chart showing an example of the driving method of the moving object 10 illustrated in FIG. 1A and FIG. 1B that is different from the method shown in FIG. 3A, for example. In the method shown in FIG. 5A, a display image can be corrected in consideration of the state of the display unit 22.

First, the imaging unit 12 obtains a captured image including a display image and an external view overlapping with the display image (Step S11). Next, the arithmetic unit 16 compares the display image with the external view on the basis of the captured image (Step S12). As in the case where the moving object 10 is driven by the method shown in FIG. 3A, for example, the captured image does not necessarily include the display image; in that case, the arithmetic unit 16 can compare image data generated by the image generation unit 18 with the captured image, for example.

Then, the arithmetic unit 16 estimates the state of the display unit 22. For example, the deterioration state or burn-in state of the display unit 22 is estimated (Step S13). After that, the arithmetic unit 16 corrects the display image on the basis of the state of the display unit 22 and a comparison result of the display image and the external view (Step S14). For example, the arithmetic unit 16 corrects the display image so as to prevent a malfunction such as a failure to display the display image caused by the state of the display unit 22 as well as to increase the visibility of the display image. After Step S14, the process returns to Step S11, for example. Alternatively, the operation shown in FIG. 5A is terminated.

FIG. 5B is a flow chart showing a more specific method of the driving method shown in FIG. 5A. First, the imaging unit 12 obtains a captured image including a display image and an external view overlapping with the display image (Step S11a). Next, the arithmetic unit 16 compares the display image with the external view of a region overlapping with the display image on the basis of the captured image (Step S12a). After that, the temperature of the display unit 22 is measured (Step S13a-1). For example, a temperature sensor such as an infrared sensor is provided in the imaging unit 12, and the temperature of the display unit 22 is measured with the temperature sensor. Note that the temperature sensor preferably measures not only the temperature of the display unit 22 but also the temperature of the inside of the moving object 10, for example.

Then, the arithmetic unit 16 estimates the deterioration state of the display unit 22 on the basis of the display image included in the captured image and the temperature of the display unit 22 (Step S13a-2). For example, the arithmetic unit 16 can estimate the deterioration state of the display unit 22 on the basis of the luminance of the display image included in the captured image and the temperature of the display unit 22. For example, in the case where the temperature of the display unit 22 is high with respect to the luminance of the display image, current flowing through the light-emitting element provided in the display unit 22 is likely to be converted into heat; thus, it can be estimated that the display unit 22 deteriorates. Here, when the temperature of the inside of the moving object 10 is measured in Step S13a-1, for example, the deterioration state of the display unit 22 can be estimated on the basis of the temperature. For example, in the case where the temperature of the inside of the moving object 10 is high, even when the temperature of the display unit 22 is high, it can be estimated that the display unit 22 does not deteriorate. The deterioration state of the display unit 22 may be estimated considering the external view included in the captured image. For example, in the case where the display unit 22 is irradiated with direct sunlight, even when the temperature of the display unit 22 is high, it can be estimated that the display unit 22 does not deteriorate.

After that, the arithmetic unit 16 corrects the display image on the basis of the deterioration state of the display unit 22 and the result of comparison between the display image and the external view (Step S14a). After Step S14a, the process returns to Step S11a, for example. Alternatively, the operation shown in FIG. 5B is terminated.

In Step S14a, for example, the arithmetic unit 16 corrects the display image so as to prevent the deterioration of the display unit 22 as well as to increase the visibility of the display image same as the examples shown in FIG. 3A, FIG. 3B, and the like. For example, the luminance of the display image can be decreased within the range where the visibility is not decreased. For example, in a region with luminance equal to or more than a predetermined value, the luminance may be reduced. Furthermore, the display image can be corrected considering a hue, a brightness, and a saturation of the display image. For example, when brightness of a color in which a hue and a saturation are low, such as an achromatic color, e.g. white is decreased, significant reduction in visibility as well as deterioration of the display unit 22 can be prevented.

In the case where deterioration of the display unit 22 is detected, the display unit 22 can display a message notifying the deterioration of the display unit 22 on the display unit 22, for example. For example, when the engine of the moving object 10 is started, the display unit 22 can display a message notifying the deterioration of the display unit 22 on the display unit 22. Thus, a failure to display an image on the display unit 22 during running of the moving object 10 or the like can be prevented, for example.

In this manner, by correcting a display image on the basis of a captured image including a display image and an external view, the display image can be corrected appropriately even when the display unit 22 deteriorates. For example, in the case where the display unit 22 includes a light-emitting element and corrects a display image on the basis of the amount of current flowing through the light-emitting element and an external view, the display image cannot be appropriately corrected when the light-emitting element deteriorates in some cases. This is because, before and after deterioration of the light-emitting element, although the amount of current flowing through the light emitting element is the same, luminance of light emitted from the light-emitting element are different from each other in some cases, for example. In contrast, in the case where the display image is corrected based on a captured image including the display image, the display image can be corrected in consideration of a change in emission luminance caused by deterioration of the light-emitting element, for example. Accordingly, the display image can be appropriately corrected even if the display unit 22 deteriorates.

Note that in Step S13a-2 shown in FIG. 5B, the arithmetic unit 16 may estimate the burn-in state of the display unit 22. For example, the arithmetic unit 16 can estimate the burn-in state of the display unit 22 on the basis of a period during which an image is displayed on the display unit 22 and a change in a display image over time. When burn-in is detected on the display unit 22, the arithmetic unit 16 can correct a hue of the display image to make the burn-in less noticeable, for example.

Example-3 of Driving Method of Moving Object

Figures 6A, 6B:
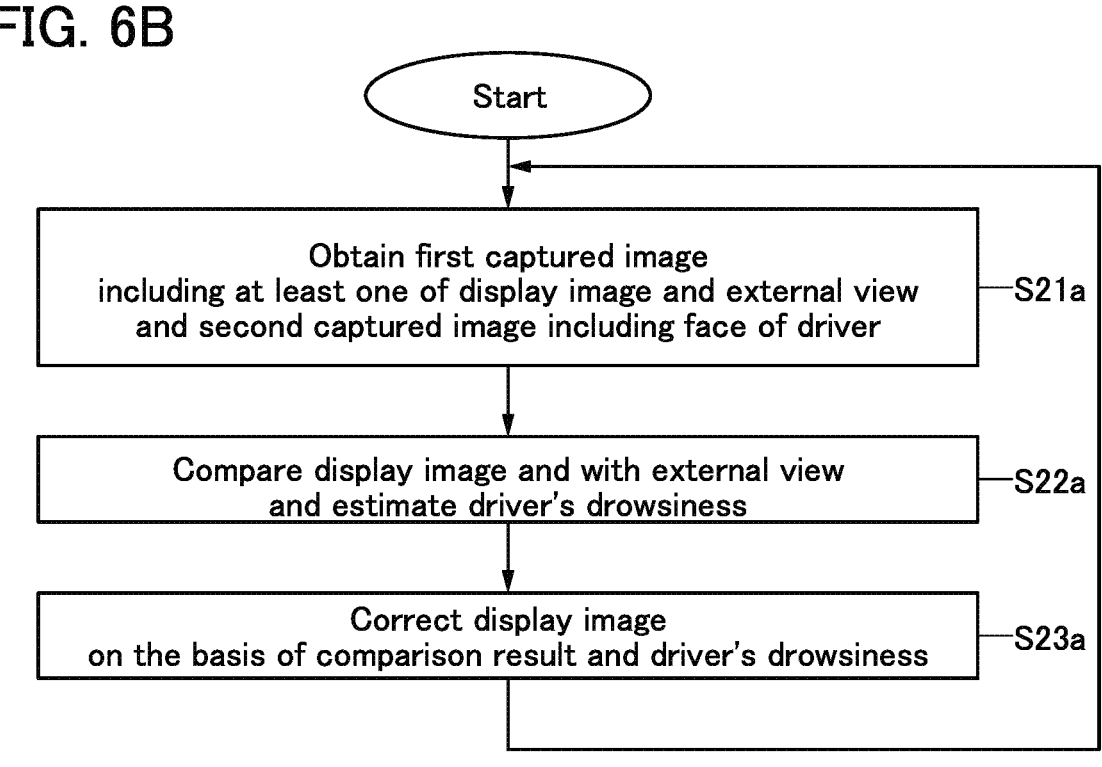
FIG. 6A and FIG. 6B are flow charts showing examples of a driving method of the moving object.

FIG. 6A is a flow chart showing an example of a driving method of the moving object 10 illustrated in FIG. 1A and FIG. 1B that is different from the methods shown in FIG. 3A, FIG. 5A, and the like, for example. In the method shown in FIG. 6A, a display image can be corrected on the basis of the state of the inside of the moving object 10, for example, condition of a driver of the moving object 10.

First, the imaging unit 12 obtains a first captured image including a display image and an external view overlapping with the display image. In addition, the imaging unit 12 obtains a second captured image including a driver (Step S21). Note that the first captured image does not necessarily include one of the display image and the external view.

Here, the imaging device 37 included in the moving object 10 is preferably an imaging device which can take images in all directions such as an omnidirectional camera because one imaging device can obtain the first captured image and the second captured image. Note that when the imaging device 37 is an imaging device which can take images in all directions, images of the side, the rear, and the like of the moving object 10 can be taken in addition to the image of the front thereof. Thus, even when the moving object 10 includes a display apparatus projecting an image on a side window or a rear window in addition to a display apparatus projecting an image on a windshield, the imaging device 37 can take an image of the display images projected by the display apparatuses. The control unit 24 can control driving of the moving object 10 on the basis of situations of the side and the rear of the moving object 10 in addition to a situation of the front thereof, for example.

Then, the arithmetic unit 16 compares the display image with the external view on the basis of the first captured image. In addition, the arithmetic unit 16 estimates the condition of the driver of the moving object 10 on the basis of the second captured image (Step S22). Note that in the case where the display image is not included in the first captured image, the arithmetic unit 16 can compare image data generated by the image generation unit 18 with the captured image, for example.

The arithmetic unit 16 corrects the display image on the basis of the result of comparison between the display image and the external view and the estimation result of the condition of the driver (Step S23). For example, the display image is corrected so as to prevent occurrence of an accident due to the condition of the driver as well as to increase the visibility of the display image. After Step S23, the process returns to Step S21, for example. Alternatively, the operation shown in FIG. 6A is terminated.

FIG. 6B is a flow chart showing a more specific method of the driving method shown in FIG. 6A. First, the imaging unit 12 obtains a first captured image including a display image and an external view overlapping with the display image. In addition, the imaging unit 12 obtains a second captured image including the face of a driver (Step S21a). As described above, the first captured image does not necessarily include one of the display image and the external view.

Then, the arithmetic unit 16 compares the display image with the external view on the basis of the first captured image. In addition, the arithmetic unit 16 estimates drowsiness of the driver of the moving object 10 on the basis of the second captured image (Step S22a). As described above, in the case where the display image is not included in the first captured image, the arithmetic unit 16 can compare image data generated by the image generation unit 18 with the captured image, for example.

After that, the arithmetic unit 16 corrects the display image on the basis of the result of comparison between the display image and the external view and the estimation result of driver's drowsiness (Step S23a). For example, the display image is corrected so as to relieve the driver's drowsiness as well as to increase the visibility of the display image. After Step S23a, the process returns to Step S21a, for example. Alternatively, the operation shown in FIG. 6B is terminated.

The correction of the display image can be performed, for example, when it is estimated that the driver of the moving object 10 has drowsiness, in a way of increasing the luminance of the display image, increasing the contrast of the display image, changing the color of the display image into a color such as a red-based color, or enlarging the display image. Furthermore, for example, treatment such as blinking the display image, changing the display position of the display image, or displaying a message recommending taking a break as the display image may be performed. Furthermore, for example, the moving object 10 can perform the operation such as generating a warning sound, vibrating the seat which the driver sits or the seat belt which the driver wears, or emitting gas which has a smell relieving the drowsiness. Furthermore, in the case where it is estimated that the driver's drowsiness is excessive, the control unit 24 may stop the moving object 10. For example, the control unit 24 may blink a hazard lamp of the moving object 10 and stop the moving object 10 so as not to come into contact with another moving object. Here, in the case where the control unit 24 stops the moving object 10, the moving object 10 is preferably moved to, for example, a side of the road so as not to block the traffic of other moving objects.

Figure 7A:
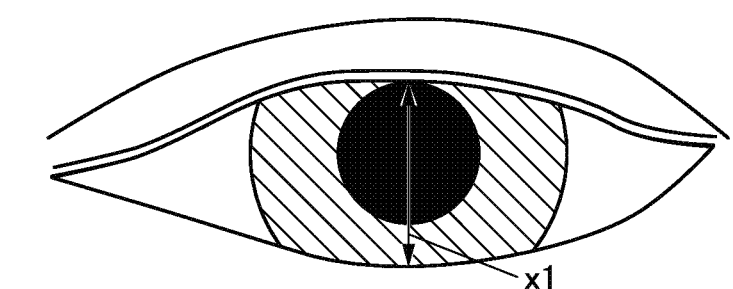
FIG. 7A and FIG. 7B are schematic views illustrating an example of a drowsiness estimation method.
Figure 7B:
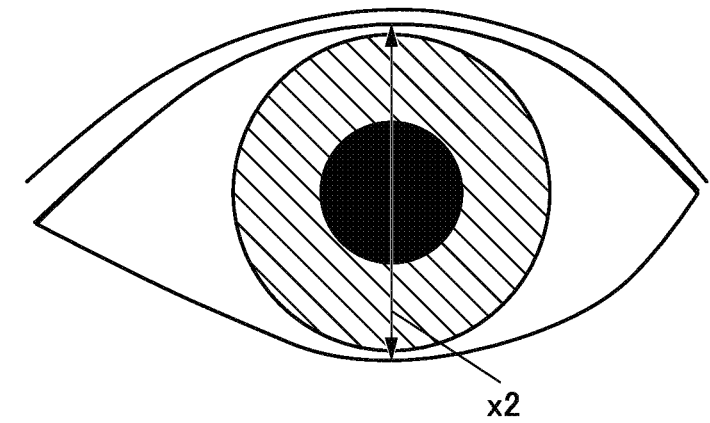

FIG. 7A and FIG. 7B are schematic views illustrating examples of a drowsiness estimation method. Drowsiness can be estimated from the state of an eye, for example.

FIG. 7A is a schematic view illustrating an example of the state of an eye of a person who has drowsiness, and FIG. 7B is a schematic view illustrating an example of the state of an eye of a person who does not have drowsiness. As illustrated in FIG. 7A and FIG. 7B, in the case where a person has drowsiness, the degree of eyelid opening is sometimes low as compared to the case where a person does not have drowsiness. For example, a distance x1 between the upper eyelid and the lower eyelid illustrated in FIG. 7A is shorter than a distance x2 between the upper eyelid and the lower eyelid illustrated in FIG. 7B. The degree of eyelid opening can be calculated based on the distance between the upper eyelid and the lower eyelid. For example, the value obtained by division of the distance between the upper eyelid and the lower eyelid at a measurement time by the maximum distance between the upper eyelid and the lower eyelid can be the degree of eyelid opening. By determining that such a value is the degree of eyelid opening, the arithmetic unit 16 can estimate whether a person has drowsiness with high accuracy even if the distance x1 and the distance x2 vary from person to person.

In addition, in the case where a person has drowsiness, eye closure time in a blink is sometimes longer and a change in a pupil diameter overtime (a pupil diameter fluctuation) is sometimes larger as compared to the case where a person does not have drowsiness. The arithmetic unit 16 can estimate driver's drowsiness using the second captured image including the face of the driver of the moving object 10 on the basis of the above indicators. For example, driver's drowsiness can be estimated using a plurality of the second captured images obtained at regular intervals by the imaging unit 12.

Note that drowsiness can be estimated based on the occurrence of yawns, wobbling of the head, or the like. Furthermore, drowsiness can be estimated based on driving data. For example, the arithmetic unit 16 may detect the rate of erratic driving, the amount of steering, or the like of the moving object 10 on the basis of driving data and estimate drowsiness of the driver of the moving object 10.

Here, the arithmetic unit 16 can estimate driver's drowsiness by machine learning; for example, driver's drowsiness can be estimated using a neural network. For example, driver's drowsiness can be estimated using a neural network such as an RNN or an LSTM which can process time-series data.

Note that the condition of a driver of the moving object 10 which can be detected by the arithmetic unit 16 is not limited to drowsiness; the arithmetic unit 16 may have a function of estimating fatigue, feeling, sickness, or the like of a driver of the moving object 10, for example. In that case, for example, when the arithmetic unit 16 estimates that the driver shows accumulation of fatigue, surge of emotions, symptoms of sickness, or the like, the display unit 22 displays a message recommending taking a break as the display image.

Example-4 of Driving Method of Moving Object

Figure 8:
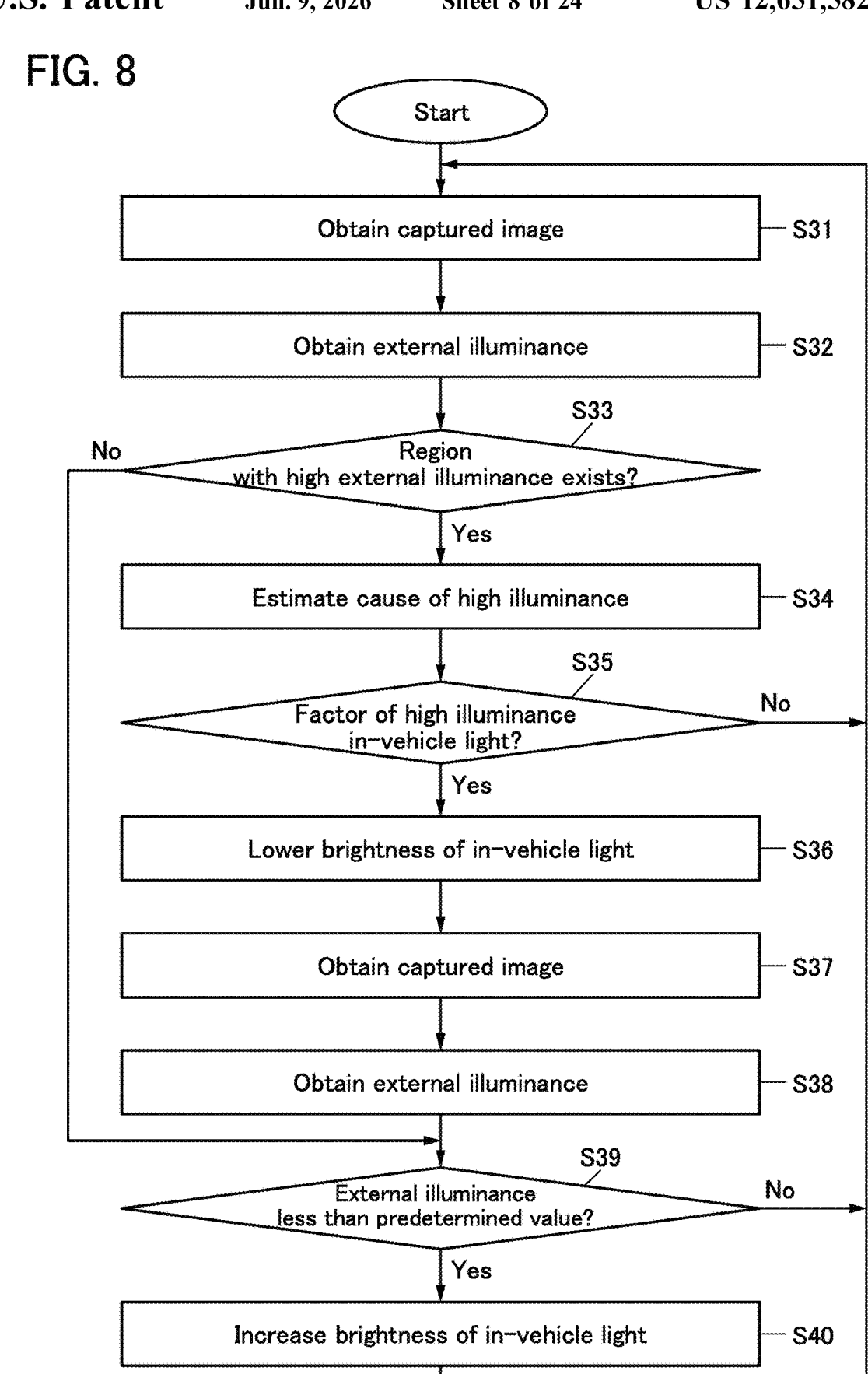
FIG. 8 is a flow chart showing an example of a driving method of a moving object.

FIG. 8 is a flow chart showing an example of a driving method of the moving object 10 illustrated in FIG. 1A and FIG. 1B that is different from the methods shown in FIG. 3A, FIG. 5A, FIG. 6A, and the like, for example. In the method shown in FIG. 8, the luminance of the lighting unit 33 is adjusted based on a captured image.

First, the imaging unit 12 obtains a captured image including a display image and an external view overlapping with the display image (Step S31). Note that the captured image does not necessarily include one of the display image and the external view.

Then, the arithmetic unit 16 obtains external illuminance on the basis of the captured image (Step S32). In the case where a region with high illuminance exists in the external view included in the captured image, the arithmetic unit 16 estimates the cause of the high external illuminance (Step S33 and Step S34). When high luminance of the lighting unit 33 is the cause of the existence of the region with high external illuminance, the control unit 24 lowers the luminance of the lighting unit 33. When the lighting unit 33 is not the cause of the existence of the high-external illuminance region, the process returns to Step S31 (Step S35 and Step S36).

Here, in Step S34, in the case where illuminance is low in many regions of the external view included in the captured image because, for example, the moving object is driven during the nighttime or in the inside a tunnel, but illuminance is high in some regions and the illuminance corresponds to the illuminance of the lighting unit 33, the arithmetic unit 16 can estimate that the cause of the high illuminance is light emitted from the lighting unit 33, for example. The arithmetic unit 16 may perform object recognition on the basis of the captured image, and estimate the cause of the existence of a region with high illuminance in accordance with the object recognition, for example. For example, when a street lamp or another moving object is included in a captured image and the window unit 31 is irradiated with light emitted therefrom, the arithmetic unit 16 can estimate that the cause of the high illuminance is not the light emitted from the lighting unit 33.

Note that the estimation of the cause of high external illuminance may be performed by machine learning; for example, the estimation may be performed using a neural network. For example, the cause of high external illuminance can be estimated using a CNN.

By lowering the luminance of the lighting unit 33 in Step S36, the visibility of a display image can be increased in the case where the visibility of the display image is lowered because of the light emitted from the lighting unit 33, for example. Furthermore, by estimating the cause of high external illuminance in Step S34, the lighting unit 33 can be inhibited from being operated during the daytime, for example. In the case where a region with high external illuminance exists because of light emitted from an object other than the lighting unit 33 even during the nighttime, the lighting unit 33 can be inhibited from being operated, for example.

Next, as in Step S31, the imaging unit 12 obtains a captured image including a display image and an external view overlapping with the display image (Step S37). Then, as in Step S32, the arithmetic unit 16 obtains external illuminance on the basis of the captured image (Step S38). When the external illuminance is less than a predetermined value, the luminance of the lighting unit 33 is increased and the process returns to Step S31. When the external illuminance is more than or equal to the predetermined value, the luminance of the lighting unit 33 is not changed and the process returns to Step S31 (Step S39 and Step S40). In Step S39, it is determined whether the average value of the luminance in the whole captured image is less than or more than or equal to the predetermined value, for example. Note that in the case where it is determined that a region with high external illuminance does not exist in Step S33, Step S34 to Step S38 can be omitted and Step S39 can be performed. After Step S40, the process returns to Step S31. Alternatively, the operation shown in FIG. 8 is terminated.

By performing Step S37 to Step S40, failure in ensuring sufficient external illuminance because of the decrease in the luminance of the lighting unit 33 can be inhibited. As described above, when the moving object 10 is driven in the method shown in FIG. 8, the visibility of both of the display image and the external view can be increased. Note that in the case where the lighting unit 33 is a head light, for example, the light emitted from the lighting unit 33 in Step 36 may be a low beam and the light emitted from the lighting unit 33 in Step S40 may be a high beam. Here, in the case where the light emitted from the lighting unit 33 is a high beam, the external view is preferably taken into consideration. For example, in the case where the captured image includes a moving object other than the moving object 10, the light emitted from the lighting unit 33 is preferably not a high beam.

Note that in the case where the imaging unit 12 has a function of obtaining the captured image including the face of the driver of the moving object 10, for example, the arithmetic unit 16 may estimate the condition of the driver of the moving object 10 using the captured image and adjust the luminance of the lighting unit 33 according to the estimation result. For example, in Step S34, when it is estimated that a region with high external illuminance exists because the luminance of the lighting unit 33 is high and the driver of the moving object 10 is estimated to be dazzled from the behavior such as squinting his/her eyes, the luminance of the lighting unit 33 can be decreased in Step S36. Furthermore, in Step S39, when the external illuminance is determined to be less than the predetermined value and it is estimated that the visibility of the external view is not ensured sufficiently from the movement of the driver of the moving object 10 such as bending forward, the luminance of the lighting unit 33 can be increased in Step S40, for example. As described above, the luminance of the lighting unit 33 can be adjusted in accordance with the condition of the driver of the moving object 10, for example; thus, the convenience of the moving object 10 can be enhanced.

The arithmetic unit 16 may correct a display image. For example, a display image can be corrected by the same method as the method shown in FIG. 3A or FIG. 3B. Furthermore, in the case where the imaging unit 12 has a function of obtaining a captured image including a driver of the moving object 10, the display image can be corrected by the same method as the method shown in FIG. 6A or FIG. 6B, for example.

Example-5 of Driving Method of Moving Object

FIG. 9A is a flow chart showing an example of a driving method of the moving object 10 illustrated in FIG. 1A and FIG. 1B that is different from the method shown in FIG. 3A, FIG. 5A, FIG. 6A, FIG. 8, and the like, for example. In the method shown in FIG. 9A, a display image can be corrected based on driving data.

First, the imaging unit 12 obtains a first captured image including a display image and an external view overlapping with the display image. In addition, the imaging unit 12 obtains a second captured image including a driver (Step S51). Note that the first captured image does not necessarily include one of the display image and the external view.

As in the case where the moving object 10 is driven by the method shown in FIG. 6A, for example, the imaging device 37 included in the moving object 10 is preferably an imaging device which can take images in all directions such as an omnidirectional camera because one imaging device 37 can obtain both of the first captured image and the second captured image.

Then, the arithmetic unit 16 analyzes the first captured image, the second captured image, and the driving data (Step S52). After that, the arithmetic unit 16 corrects the display image on the basis of the analysis result (Step S53). After Step S53, the process returns to Step S51, for example. Alternatively, the operation shown in FIG. 9A is terminated.

FIG. 9B is a flow chart showing a more specific method of the driving method shown in FIG. 9A. First, the imaging unit 12 obtains a first captured image including a display image and an external view overlapping with the display image. Furthermore, the imaging unit 12 obtains a second captured image including the face of a driver. In addition, the driving data obtaining unit 14 obtains driving data (Step S51a). As described above, the first captured image does not necessarily include one of the display image and the external view.

Then, the arithmetic unit 16 estimates drowsiness of the driver of the moving object 10 on the basis of the second captured image (Step S52a-1). For the estimation of drowsiness, the methods shown in FIG. 7A and FIG. 7B can be used.

In the case where the driver is estimated not to have drowsiness, for example, the parameter indicating driver's drowsiness is less than a predetermined value, the process returns to Step S51a. In contrast, in the case where the driver is estimated to have drowsiness, for example, the parameter indicating driver's drowsiness is more than or equal to the predetermined value, the arithmetic unit 16 estimates the cause of the drowsiness on the basis of the first captured image and the driving data (Step S52a-2 and Step S52a-3).

After that, the arithmetic unit 16 corrects the display image so as to relieve the drowsiness on the basis of the cause of the drowsiness (Step S53a). After Step S53a, the process returns to Step S51a, for example. Alternatively, the operation shown in FIG. 9B is terminated.

In Step S53a, for example, it is found from the driving data that a change in running speed of the moving object 10 over time is small and the rotation amount of a steering wheel is small. In addition, it is found from the first captured image that a change in an external view over time is small and the contrast of an external view is low. In this case, the cause of the drowsiness of the driver of the moving object 10 can be estimated to be a monotonous and less stimulating external view. Accordingly, the arithmetic unit 16 can relieve the driver's drowsiness by continuously changing the display position, the color, or the size of the display image or increasing the contrast of the display image. When the cause of the drowsiness of the driver of the moving object 10 can be estimated to be low external illuminance, the arithmetic unit 16 can relieve the driver's drowsiness by increasing the luminance of the display image. Note that the estimation of the cause of the drowsiness of the driver of the moving object 10 may be performed by machine learning; for example, the estimation may be performed using a neural network.

Example-6 of Driving Method of Moving Object

Figure 10A:
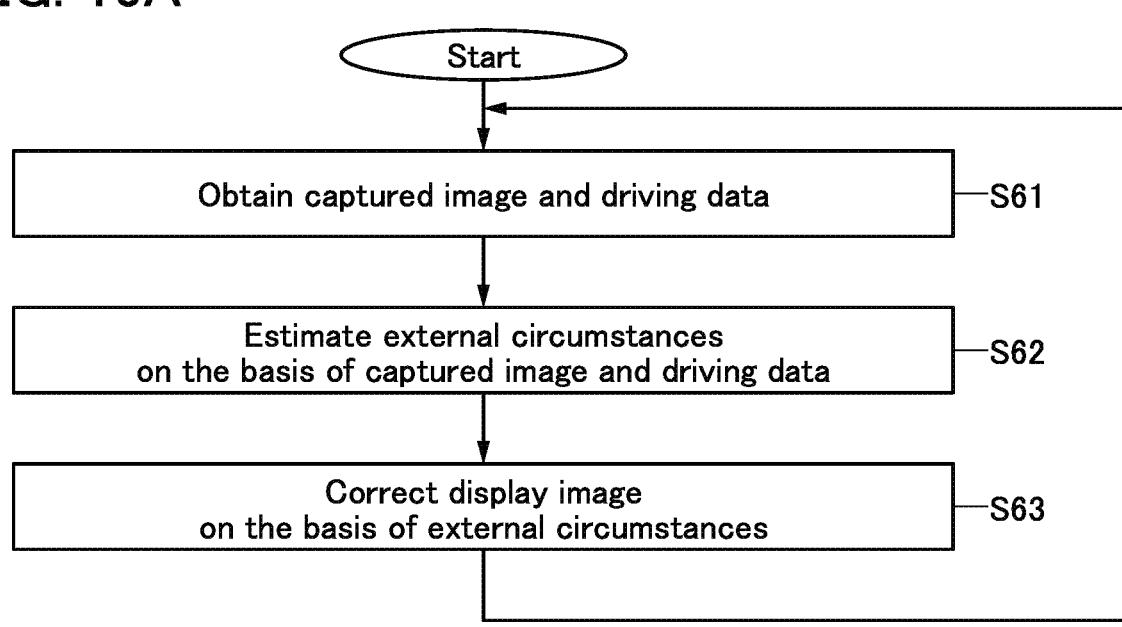
FIG. 10A and FIG. 10B are flow charts showing examples of a driving method of the moving object.

FIG. 10A is a flow chart showing an example of a driving method of the moving object 10 illustrated in FIG. 1A and FIG. 1B that is different from the methods shown in FIG. 3A, FIG. 5A, FIG. 6A, FIG. 8, FIG. 9A and the like, for example.

First, the imaging unit 12 obtains a captured image including a display image and an external view overlapping with the display image. Furthermore, the driving data obtaining unit 14 obtains driving data (Step S61). Note that the captured image does not necessarily include one of the display image and the external view.

Next, the arithmetic unit 16 estimates external circumstances on the basis of the captured image and the driving data (Step S62). After that, the arithmetic unit 16 corrects the display image on the basis of the external circumstances (Step S63). After Step S63, the process returns to S61, for example. Alternatively, the operation shown in FIG. 10A is terminated.

Figure 10B:
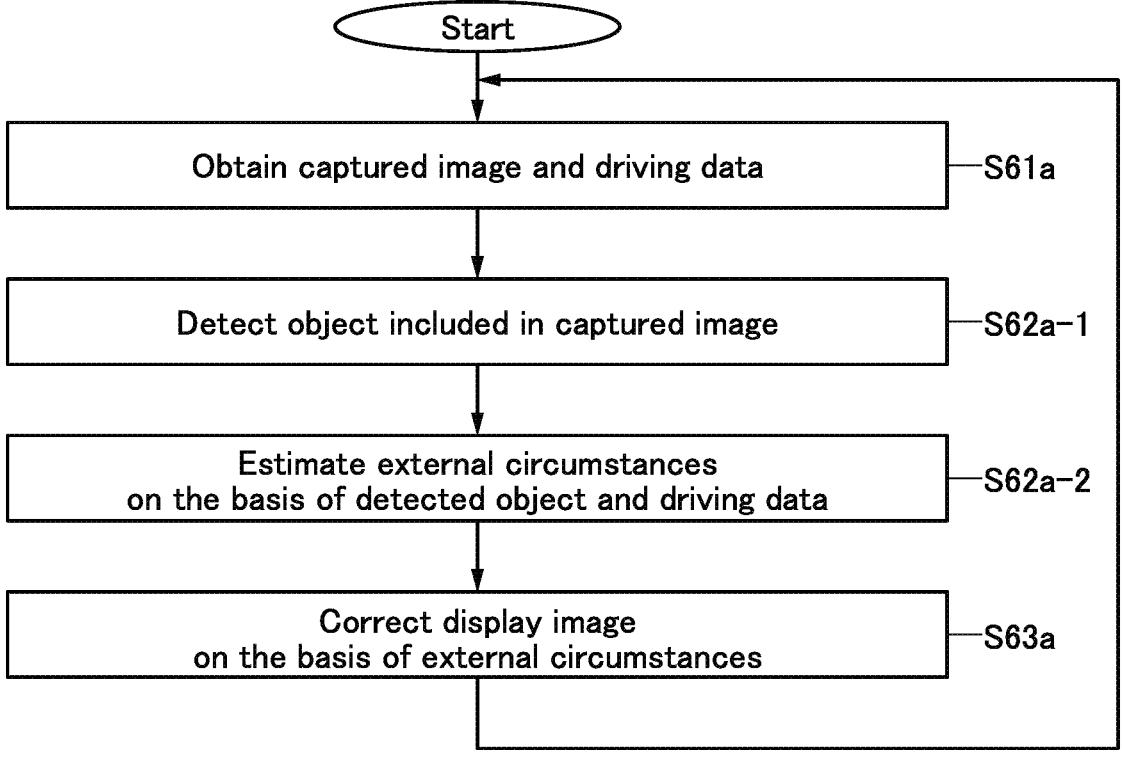

FIG. 10B is a flow chart showing a more specific method of the driving method shown in FIG. 10A. First, the imaging unit 12 obtains a captured image including a display image and an external view overlapping with the display image. In addition, the driving data obtaining unit 14 obtains driving data (Step S61a). As described above, the captured image does not necessarily include one of the display image and the external view.

Then, the arithmetic unit 16 detects an object included in the captured image (Step S62a-1). The object can be detected by, for example, pattern matching. The object detection can be performed using a neural network, specifically, a CNN or the like.

Then, the arithmetic unit 16 estimates external circumstances on the basis of the above detected object and the driving data (Step S62a-2). After that, the arithmetic unit 16 corrects the display image on the basis of the estimation result of the external circumstances (Step S63a). For example, a display image is corrected so as to prevent occurrence of an accident. After Step S63a, the process returns to Step S61a, for example. Alternatively, the operation shown in FIG. 10B is terminated.

Figure 11A:
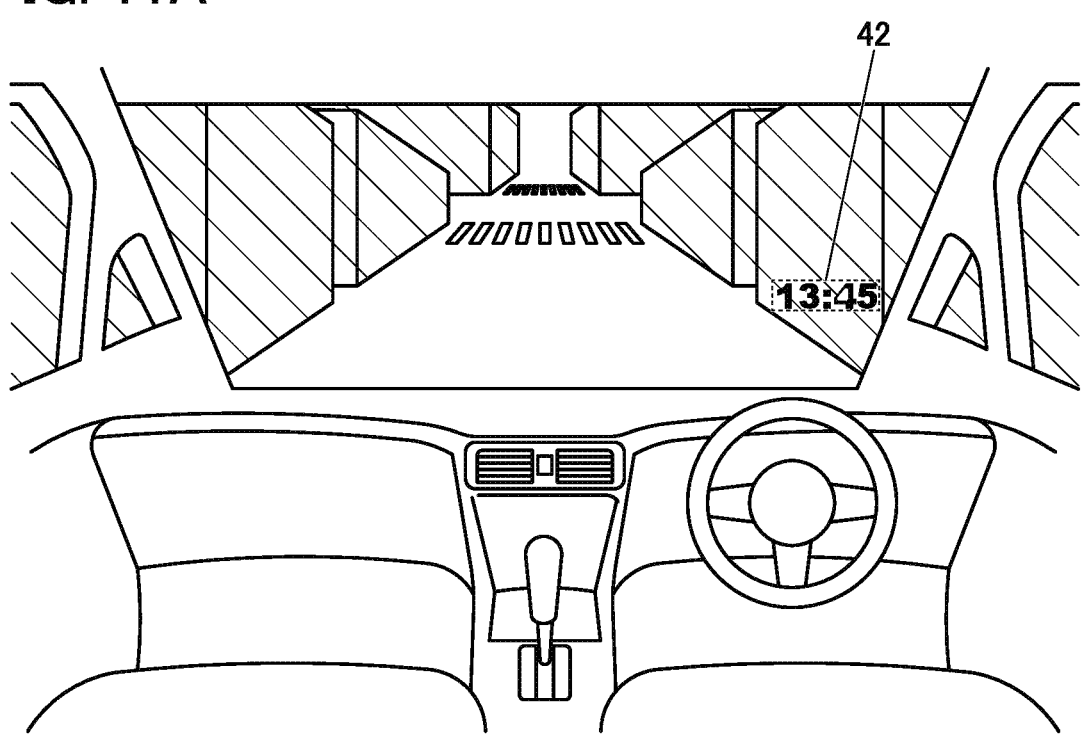
FIG. 11A and FIG. 11B are schematic views illustrating examples of correction of a display image.
Figure 11B:
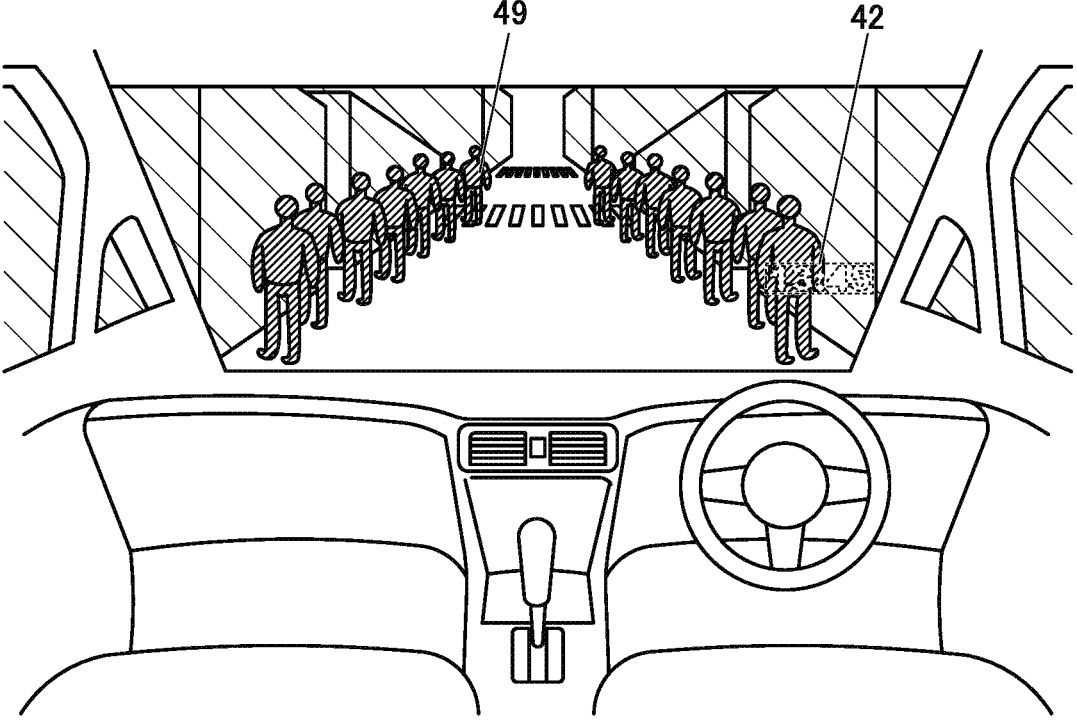

FIG. 11A and FIG. 11B are schematic views each illustrating an example of correction of a display image. In the example illustrated in FIG. 11A, an object such as a person or a moving object is not detected in Step S62a-1. In this case, even when a driver of the moving object 10 pays his attention to the display image 42, the possibility of occurrence of a serious accident such as an accident with injury is low. Thus, the display unit 22 can display the display image 42 so as to make the display image 42 noticeable.

On the other hand, in the example shown in FIG. 10B, a lot of people 49 are detected in Step S62a-1. Furthermore, the driving data shows that operation frequency of a gas pedal of the moving object 10 and operation frequency of a brake thereof are high. In this case, it is estimated that the driver of the moving object 10 pays much attention in order to avoid contact with a person 49. When the display image 42 is displayed to be noticeable under such circumstances, the driver's attention may be payed to the display image 42 and the display image 42 may obstruct driver's field of vision. Accordingly, a serious accident such as a collision between the moving object 10 and a person 49 may be caused.

Thus, occurrence of an accident can be prevented by making the display image 42 unnoticeable. For example, occurrence of an accident can be prevented by, for example, increasing the transmittance of the display image 42, decreasing the luminance of the display image 42, decreasing the saturation or the brightness of the display image 42, changing the color of the display image 42 into a color that is similar to the color of the background, reducing the display image 42, changing the content of the display image 42 into a content attracting no attention of the driver, not displaying the display image 42, or the like. In other words, the moving object 10 can have any one or more selected from a function of changing the transmittance of a display image, a function of changing the luminance of a display image, a function of changing the saturation or the value of a display image, and the like.

Note that when the visibility of the display image 42 is decreased too much, the driver of the moving object 10 may pay his attention to the display image 42 on the contrary; accordingly, the arithmetic unit 16 preferably corrects the display image 42 in consideration of that case. For example, the imaging unit 12 may obtain a captured image including the driver of the moving object 10, and then the arithmetic unit 16 may estimate condition of the driver such as fatigue and correct the display image 42 on the basis of the estimation result of the condition of the driver. For example, by estimating a change in driver's fatigue over time, the display image 42 may be corrected so as to reduce the driver's fatigue as much as possible and make the driver keep paying necessary attention.

In the above manner, in the case where operation frequency of a gas pedal of the moving object 10 or operation frequency of a brake thereof is higher than or equal to a predetermined value and a predetermined number of people or more are detected, the arithmetic unit 16 can correct the display image 42 so as to increase the transmittance of the display image 42. Note that estimation of external circumstances may be performed by machine learning; for example, the estimation may be performed using a neural network.

For the estimation of external circumstances, one of driving data and the detection result of the object included in a captured image is not necessarily used. For example, in the case where operation frequency of a gas pedal of the moving object 10 or operation frequency of a brake thereof is higher than or equal to a predetermined value, the display image 42 may be corrected without considering the detection result of the object included in a captured image. In the case where a predetermined number of people or more are detected, the display image 42 may be corrected without considering driving data. For example, in the case where a predetermined number of people or more are detected in front of the moving object 10, the display image 42 may be corrected without considering driving data.

At least part of the structure examples, the drawings corresponding thereto, and the like described in this embodiment as examples can be combined with the other structure examples, the other drawings, and the like as appropriate. For example, the moving object of one embodiment of the present invention can correct a display image and adjust the luminance of an in-vehicle light.

At least part of this embodiment can be implemented in combination with the other embodiments described in this specification as appropriate.

Embodiment 2

In this embodiment, a structure example of the display apparatus 35 described in Embodiment 1 will be described in detail. FIG. 12A is a block diagram illustrating the display apparatus 35. The display apparatus 35 includes a display region 235, the first driver circuit unit 231, and a second driver circuit unit 232. The display region 235 includes a plurality of pixels 230 arranged in a matrix. The pixel 230 includes a display element, and the display element can be a light-emitting element such as an organic EL element.

A circuit included in the first driver circuit unit 231 functions as, for example, a scan line driver circuit. A circuit included in the second driver circuit unit 232 functions as, for example, a signal line driver circuit. Note that some sort of circuit may be provided at a position facing the first driver circuit unit 231 with the display region 235 positioned therebetween. Some sort of circuit may be provided at a position facing the second driver circuit unit 232 with the display region 235 positioned therebetween. Note that circuits included in the first driver circuit unit 231 and the second driver circuit unit 232 are collectively referred to as a "peripheral driver circuit" in some cases.

Any of various circuits such as a shift register, a level shifter, an inverter, a latch, an analog switch, and a logic circuit can be used as the peripheral driver circuit. In the peripheral driver circuit, a transistor, a capacitor, and the like can be used.

For example, a transistor including a metal oxide in a channel formation region (hereinafter referred to as an OS transistor) may be used as a transistor included in the pixel 230 and a transistor including silicon in a channel formation region (hereinafter referred to as a Si transistor) may be used as a transistor included in the peripheral driver circuit. The off-state current of the OS transistor is low, so that power consumption can be reduced. Since the Si transistor has higher operation speed than the OS transistor, the Si transistor is preferably used in the peripheral driver circuit. Note that in some display apparatuses, an OS transistor may be used as each of a transistor included in the pixel 230, a peripheral circuit, and a transistor included in the peripheral driver circuit. In some display apparatus, a Si transistor may be used as each of a transistor included in the pixel 230, a peripheral circuit, and a transistor included in the peripheral driver circuit. Furthermore, in some display apparatus, a Si transistor may be used as a transistor included in the pixel 230 and an OS transistor may be used as a transistor included in the peripheral driver circuit.

Both a Si transistor and an OS transistor may be used as the transistors included in the pixel 230. Both a Si transistor and an OS transistor may be used as the transistors included in the peripheral driver circuit.

Examples of a material used in the Si transistor include single crystal silicon, polycrystalline silicon, and amorphous silicon. In particular, a transistor containing low-temperature polysilicon (LTPS) in its semiconductor layer (hereinafter also referred to as an LTPS transistor) can be used. The LTPS transistor has high field-effect mobility and favorable frequency characteristics.

With the use of a Si transistor such as the LTPS transistor, a circuit required to be driven at a high frequency (e.g., a source driver circuit) can be formed on the same substrate as the display unit. Thus, external circuits mounted on the display apparatus can be simplified, and costs of parts and mounting costs can be reduced.

The OS transistor has far higher field-effect mobility than a transistor containing amorphous silicon. In addition, the OS transistor has an extremely low leakage current between a source and a drain in an off state (hereinafter, also referred to as off-state current), and charge accumulated in a capacitor that is connected in series to the transistor can be held for a long period. Furthermore, power consumption of the display apparatus can be reduced with the OS transistor.

The off-state current value per micrometer of channel width of the OS transistor at room temperature can be lower than or equal to 1 aA ($1 \times 10^{-18}$ A), lower than or equal to 1 zA ($1\times10^{-21}$ A), or lower than or equal to 1 yA ($1\times10^{-24}$ A). Note that the off-state current value per micrometer of channel width of a Si transistor at room temperature is higher than or equal to 1 fA ($1\times10^{-15}$ A) and lower than or equal to 1 pA ($1\times10^{-12}$ A). In other words, the off-state current of an OS transistor is lower than that of a Si transistor by approximately ten orders of magnitude.

To increase the emission luminance of the light-emitting element included in the pixel circuit, the amount of current fed through the light-emitting element needs to be increased. For this, it is necessary to increase the source-drain voltage of a driving transistor included in the pixel circuit. Since an OS transistor has a higher withstand voltage between the source and the drain than a Si transistor, a high voltage can be applied between the source and the drain of the OS transistor. Accordingly, when an OS transistor is used as the driving transistor included in the pixel circuit, the amount of current flowing through the light-emitting element can be increased, so that the emission brightness of the light-emitting element can be increased.

When transistors operate in a saturation region, a change in source-drain current with respect to a change in gate-source voltage can be smaller in an OS transistor than in a Si transistor. Accordingly, when an OS transistor is used as the driving transistor in the pixel circuit, the amount of current flowing between the source and the drain can be set minutely by a change in gate-source voltage; hence, the amount of current flowing through the light-emitting element can be controlled. Accordingly, the gray level in the pixel circuit can be increased.

Regarding saturation characteristics of current flowing when the transistor operates in a saturation region, the OS transistor can make current (saturation current) flow more stably than the Si transistor even when the source-drain voltage gradually increases. Thus, by using an OS transistor as the driving transistor, a stable current can be fed through a light-emitting element that contains an EL material even when the current-voltage characteristics of the light-emitting element vary, for example. In other words, when the OS transistor operates in the saturation region, the source-drain current hardly changes with an increase in the source-drain voltage; hence, the emission luminance of the light-emitting element can be stable.

As described above, with use of an OS transistor as the driving transistor included in the pixel circuit, it is possible to achieve "inhibition of black floating", "increase in emission luminance", "increase in gray level", "inhibition of variation in light-emitting devices", and the like.

The display apparatus 35 includes a plurality of wirings 236 which are arranged substantially parallel to each other and whose potentials are controlled by the circuits included in the first driver circuit unit 231, and a plurality of wirings 237 which are arranged substantially parallel to each other and whose potentials are controlled by the circuits included in the second driver circuit unit 232.

FIG. 12A illustrates an example in which the wiring 236 and the wiring 237 are connected to the pixel 230. Note that the wiring 236 and the wiring 237 are examples, and the wirings connected to the pixel 230 are not limited to the wiring 236 and the wiring 237.

FIG. 12B1 to FIG. 12B8 are top views illustrating structure examples of the pixel 240 including the pixel 230. For example, full-color display can be achieved by making the pixel 230 that controls red light, the pixel 230 that controls green light, and the pixel 230 that controls blue light collectively function as one pixel 240 and by controlling the amount of light (emission luminance) emitted from each pixel 230. Thus, the three pixels 230 each function as a subpixel. That is, three subpixels each control the amount or the like of emission light, such as red light, green light, or blue light (see FIG. 12B1). The light colors controlled by the three subpixels are not limited to a combination of red (R), green (G), and blue (B) and may be cyan (C), magenta (M), and yellow (Y) (see FIG. 12B2).

Three display pixels 230 constituting one pixel 240 may be arranged in a delta pattern (see FIG. 12B3). Specifically, three pixels 230 constituting one pixel 240 may be arranged such that the lines connecting the center points of the three display pixels 230 form a triangle.

The areas of three subpixels (the pixels 230) are not necessarily the same as one another. When the emission efficiency, the reliability, and the like are different depending on emission colors, the areas of subpixels may be different depending on emission colors (see FIG. 12B4).

Furthermore, four subpixels may collectively function as one pixel. For example, a subpixel that controls white light may be added to the three subpixels that control red light, green light, and blue light (see FIG. 12B5). The addition of the subpixel that controls white light can increase the luminance of a display region. Alternatively, a subpixel that controls yellow light may be added to the three subpixels that control red light, green light, and blue light (see FIG. 12B6). Alternatively, a subpixel that controls white light may be added to the three subpixels that control cyan light, magenta light, and yellow light (see FIG. 12B7).

When the number of subpixels functioning as one pixel is increased and subpixels that control light of red, green, blue, cyan, magenta, yellow, and the like are used in an appropriate combination, the reproducibility of halftones can be increased. Thus, display quality can be increased.

The pixel 240 can include, the pixel 230 controlling infrared light (IR) and the pixel 233 detecting light in addition to the pixel 230 controlling red light, the pixel 230 controlling green light, and the pixel 230 controlling blue light (see FIG. 12B8). The pixel 233 includes a light-receiving element.

The pixel 230 controlling infrared light can be used as a light source, and infrared light emitted from the pixel 230 can be sensed by the pixel 233.

FIG. 12B8 illustrates an example in which, among the pixel 230 controlling red light, the pixel 230 controlling green light, the pixel 230 controlling blue light, the pixel 230 controlling infrared light, and the pixel 233, the pixel 233 has the lowest aperture ratio. A smaller light-receiving area of the pixel 233 leads to a narrower image-capturing range, so that a blur in a capturing result is inhibited and the definition is improved. Accordingly, high-resolution or high-definition image capturing can be performed, which is preferable. Note that the aperture ratio of each of the pixel 230 controlling red light, the pixel 230 controlling green light, and the pixel 230 controlling blue light, the pixel 230 controlling infrared light, and the pixel 233 can be determined as appropriate.

Note that in the display apparatus including the pixel 240 illustrated in FIG. 12B8, the pixel 240 has a light-receiving function; thus, contact or proximity of an object can be detected while an image is displayed. Moreover, the display apparatus of one embodiment of the present invention includes a subpixel emitting infrared light; thus, with the use of the subpixel included in the display apparatus, an image can be displayed while infrared light is emitted as a light source. In other words, the display apparatus of one embodiment of the present invention has a structure with high affinity for a function other than a display function (here, a light-receiving function).

Note that the light-receiving element included in the pixel 240 illustrated in FIG. 12B8 may be used for a touch sensor, a contactless sensor, or the like.

Here, the touch sensor or the contactless sensor can sense proximity or contact of an object (e.g., a finger, a hand, or a pen). The touch sensor can sense the object when the electronic device and the object come in direct contact with each other. Furthermore, even when an object is not in contact with the electronic device, the contactless sensor can sense the object. For example, the display apparatus (or the electronic device) is preferably capable of sensing an object positioned in the range of 0.1 mm to 300 mm inclusive, further preferably 3 mm to 50 mm inclusive from the display apparatus. This structure enables the electronic device to be operated without direct contact of an object; in other words, the display apparatus can be operated in a contactless (touchless) manner. With the above structure, the electronic device can have a reduced risk of being dirty or damaged. Furthermore, the electronic device can be operated without directly touching dirt (e.g., dust or a virus) that is attached to the electronic device.

Note that the contactless sensor function can also be referred to as a hover sensor function, a hover touch sensor function, a near-touch sensor function, a touchless sensor function, or the like. The touch sensor function can also be referred to as a direct touch sensor function, for example.

The refresh rate of the display apparatus of one embodiment of the present invention can be variable. For example, the refresh rate is adjusted (adjusted in the range from 0.01 Hz to 240 Hz, for example) in accordance with contents displayed on the display apparatus, whereby power consumption can be reduced. Moreover, driving with a lowered refresh rate that reduces the power consumption of the display apparatus may be referred to as idling stop (IDS) driving.

The driving frequency of the touch sensor or the near touch sensor may be changed in accordance with the refresh rate. For example, when the refresh rate of the display apparatus is 120 Hz, the driving frequency of the touch sensor or the near touch sensor can be higher than 120 Hz (can typically be 240 Hz). With this structure, low power consumption can be achieved, and the response speed of the touch sensor or the near touch sensor can be increased.

The display apparatus of one embodiment of the present invention can reproduce the color gamut of various standards. For example, the display apparatus of one embodiment of the present invention can reproduce the color gamut of the following standards: the PAL (Phase Alternating Line) standard or NTSC (National Television System Committee) standard used for TV broadcasting; the sRGB (standard RGB) standard or Adobe RGB standard used widely for display apparatuses in electronic devices such as personal computers, digital cameras, and printers; the ITU-R BT.709 (International Telecommunication Union Radiocommunication Sector Broadcasting Service (Television) 709) standard used for HDTV (High Definition Televisions, also referred to Hi-Vision); the DCI-P3 (Digital Cinema Initiatives P3) standard used for digital cinema projection; and the ITU-R BT.2020 (REC.2020 (Recommendation 2020)) standard used for UHDTV (Ultra High Definition Television, also referred to as Super Hi-Vision); and the like.

Using the pixels 240 arranged in a matrix of 1920×1080, the display apparatus 35 that can perform full color display with a resolution of what is called full high definition (also referred to as "2K resolution", "2K1K", "2K", or the like) can be obtained. For example, using the pixels 240 arranged in a matrix of 3840×2160, the display apparatus 35 that can perform full color display with a resolution of what is called ultra high definition (also referred to as "4K resolution", "4K2K", "4K", or the like) can be obtained. For example, using the pixels 240 arranged in a matrix of 7680×4320, the display apparatus 35 that can perform full color display with a resolution of what is called super high definition (also referred to as "8K resolution", "8K4K", "8K", or the like) can be obtained. By increasing the number of pixels 240, the display apparatus 35 that can achieve full color display with 16K or 32K resolution can be obtained.

The pixel density of the display region 235 is preferably higher than or equal to 100 ppi and lower than or equal to 10000 ppi, and further preferably higher than or equal to 1000 ppi and lower than or equal to 10000 ppi. For example, the resolution may be higher than or equal to 2000 ppi and lower than or equal to 6000 ppi, or higher than or equal to 3000 ppi and lower than or equal to 5000 ppi.

Note that there is no particular limitation on the aspect ratio of the display region 235. For example, the display region 235 of the display apparatus 35 is compatible with a variety of aspect ratios such as 1:1 (a square), 4:3, 16:9, and 16:10.

The diagonal size of the display region 235 may be greater than or equal to 0.1 inches and less than or equal to 100 inches and may be greater than or equal to 100 inches.

The diagonal size of the display region 235 can be greater than or equal to 0.1 inches and less than or equal to 5.0 inches, preferably greater than or equal to 0.5 inches and less than or equal to 2.0 inches, further preferably greater than or equal to 1 inch and less than or equal to 1.7 inches. For example, the diagonal size of the display region 235 may be 1.5 inches or around 1.5 inches. When the diagonal size of the display region 235 is less than or equal to 2.0 inches, preferably around 1.5 inches, the number of times of light exposure treatment using a light exposure apparatus (typified by a scanner apparatus) can be one; thus, the productivity of a manufacturing process can be improved.

<Structure Example of Light-Emitting Element>

A light-emitting element included in the pixel 230 is described below.

As illustrated in FIG. 13A, a light-emitting element 161 which is a light-emitting element included in the pixel 230 includes an EL layer 172 between a pair of electrodes (a conductive layer 171 and a conductive layer 173). The EL layer 172 can be formed of a plurality of layers such as a layer 4420, a light-emitting layer 4411, and a layer 4430. The layer 4420 can include, for example, a layer containing a substance having a high electron-injection property (an electron-injection layer) and a layer containing a substance having a high electron-transport property (an electron-transport layer). The light-emitting layer 4411 contains a light-emitting compound, for example. The layer 4430 can include, for example, a layer containing a substance with a high hole-injection property (hole-injection layer) and a layer containing a substance with a high hole-transport property (hole-transport layer).

The structure including the layer 4420, the light-emitting layer 4411, and the layer 4430, which is provided between a pair of electrodes, can serve as a single light-emitting unit, and the structure in FIG. 13A is referred to as a single structure in this specification and the like.

FIG. 13B is a modification example of the EL layer 172 included in the light-emitting element 161 illustrated in FIG. 13A. Specifically, the light-emitting element 161 illustrated in FIG. 13B includes a layer 4430-1 over the conductive layer 171, a layer 4430-2 over the layer 4430-1, the light-emitting layer 4411 over the layer 4430-2, a layer 4420-1 over the light-emitting layer 4411, a layer 4420-2 over the layer 4420-1, and the conductive layer 173 over the layer 4420-2. In the case where the conductive layer 171 serves as an anode and the conductive layer 173 serves as a cathode, for example, the layer 4430-1 functions as a hole-injection layer, the layer 4430-2 functions as a hole-transport layer, the layer 4420-1 functions as an electron-transport layer, and the layer 4420-2 functions as an electron-injection layer. Alternatively, in the case where the conductive layer 171 serves as a cathode and the conductive layer 173 serves an anode, the layer 4430-1 functions as an electron-injection layer, the layer 4430-2 functions as an electron-transport layer, the layer 4420-1 functions as a hole-transport layer, and the layer 4420-2 functions as a hole-injection layer. With such a layer structure, carriers can be efficiently injected to the light-emitting layer 4411, and the efficiency of the recombination of carriers in the light-emitting layer 4411 can be enhanced.

Note that the structure in which a plurality of light-emitting layers (the light-emitting layer 4411, a light-emitting layer 4412, and a light-emitting layer 4413) are provided between the layer 4420 and the layer 4430 as illustrated in FIG. 13C is also an example of the single structure.

The structure in which a plurality of light-emitting units (an EL layer 172*a* and an EL layer 172*b*) are connected in series with an intermediate layer (charge-generation layer) 4440 therebetween as illustrated in FIG. 13D is referred to as a tandem structure or a stack structure in this specification and the like. The tandem structure enables a light-emitting element capable of high luminance light emission.

In the case where the light-emitting element 161 has the tandem structure illustrated in FIG. 13D, the EL layers 172*a* and 172*b* may emit light of the same color. For example, the EL layer 172*a* and the EL layer 172*b* may both emit green light. Note that in the case where the display region 235 includes three subpixels of R, G, and B and each of the subpixels includes a light-emitting element, the tandem structure may be employed for the light-emitting element of each subpixels. Specifically, the EL layer 172*a* and the EL layer 172*b* in the subpixel of R each contain a material capable of emitting red light, the EL layer 172*a* and the EL layer 172*b* in the subpixel of G each contain a material capable of emitting green light, and the EL layer 172*a* and the EL layer 172*b* in the subpixel of B each contain a material capable of emitting blue light. In other words, the light-emitting layer 4411 and the light-emitting layer 4412 may contain the same material. When the EL layer 172*a* and the EL layer 172*b* emit light of the same color, the current density per unit emission luminance can be reduced. Thus, the reliability of the light-emitting element 161 can be increased.

The emission color of the light-emitting element can be red, green, blue, cyan, magenta, yellow, white, or the like depending on the material contained in the EL layer 172. Furthermore, the color purity can be further increased when the light-emitting element has a microcavity structure.

The light-emitting layer preferably contains two or more kinds selected from light-emitting substances that emit light of R (red), G (green), B (blue), Y (yellow), O (orange), and the like. The light-emitting element that emits white light preferably contains two or more kinds of light-emitting substances in the light-emitting layer. To obtain white light emission, two or more kinds of light-emitting substances are selected such that their emission colors are complementary. For example, when the emission color of a first light-emitting layer and the emission color of a second light-emitting layer have a relationship of complementary colors, it is possible to obtain the light-emitting element which emits white light as a whole. This can be applied to a light-emitting element including three or more light-emitting layers.

The light-emitting layer preferably contains two or more kinds selected from light-emitting substances that emit light of R (red), G (green), B (blue), Y (yellow), O (orange), and the like.

As the light-emitting substance, a substance that emits fluorescent light (a fluorescent material), a substance that emits phosphorescent light (a phosphorescent material), an inorganic compound (e.g., a quantum-dot material), a substance that exhibits thermally activated delayed fluorescence (a Thermally Activated Delayed Fluorescence (TADF) material), or the like can be given. Note that as a TADF material, a material that is in a thermal equilibrium state between a singlet excited state and a triplet excited state may be used. Since such a TADF material enables a short emission lifetime (excitation lifetime), an efficiency decrease of a light-emitting element in a high-luminance region can be inhibited.

<Formation Method of Light-Emitting Element>

An example of a formation method of the light-emitting element 161 is described below.

Figure 14A:
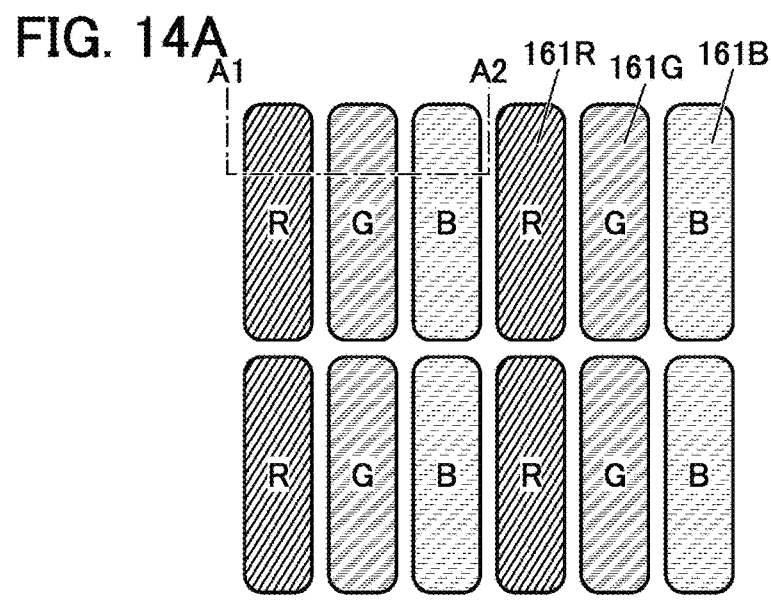
FIG. 14A is a top view illustrating a structure example of a display apparatus.

FIG. 14A is a schematic top view of the light-emitting element 161. The light-emitting element 161 includes a plurality of light-emitting elements 161R exhibiting red, a plurality of light-emitting elements 161G exhibiting green, and a plurality of light-emitting elements 161B exhibiting blue. In FIG. 14A, light-emitting regions of the light-emitting elements are denoted by R, G, and B to easily differentiate the light-emitting elements. Note that the structure of the light-emitting element 161 illustrated in FIG. 14A may be referred to as an SBS (Side By Side) structure. Although the structure illustrated in FIG. 14A has three colors of red (R), green (G), and blue (B), one embodiment of the present invention is not limited thereto. For example, the structure may have four or more colors.

The light-emitting elements 161R, the light-emitting elements 161G, and the light-emitting elements 161B are arranged in a matrix. FIG. 14A illustrates what is called a stripe arrangement, in which the light-emitting elements of the same color are arranged in one direction. Note that the arrangement method of the light-emitting elements is not limited thereto; another arrangement method such as a delta arrangement, a zigzag arrangement, a PenTile arrangement, or the like may also be used.

Figure 14B:
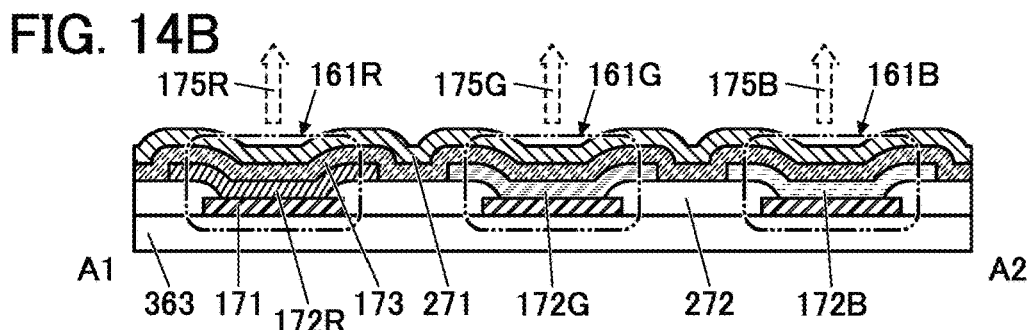
FIG. 14B to FIG. 14D are cross-sectional views illustrating structure examples of the display apparatus.

FIG. 14B is a cross-sectional schematic view taken along the dashed-dotted line A1-A2 in FIG. 14A. FIG. 14B illustrates cross sections of the light-emitting element 161R, the light-emitting element 161G, and the light-emitting element 161B. The light-emitting element 161R, the light-emitting element 161G, and the light-emitting element 161B are each provided over an insulating layer 363 and include the conductive layer 171 functioning as a pixel electrode and the conductive layer 173 functioning as a common electrode. For the insulating layer 363, one or both of an inorganic insulating film and an organic insulating film can be used. An inorganic insulating film is preferably used as the insulating layer 363. As the inorganic insulating film, for example, an oxide insulating film and a nitride insulating film such as a silicon oxide film, a silicon oxynitride film, a silicon nitride oxide film, a silicon nitride film, an aluminum oxide film, an aluminum oxynitride film, or a hafnium oxide film can be given.

Note that in this specification and the like, a nitride oxide refers to a compound that contains more nitrogen than oxygen. An oxynitride refers to a compound that contains more oxygen than nitrogen. The content of each element can be measured by Rutherford backscattering spectrometry (RBS), for example.

The light-emitting element 161R includes the conductive layer 171 functioning as a pixel electrode, the conductive layer 173 functioning as a common electrode, and an EL layer 172R therebetween. The EL layer 172R contains at least a light-emitting organic compound that emits light with intensity in a red wavelength range. The EL layer 172G included in the light-emitting element 161G contains at least a light-emitting organic compound that emits light with intensity in the green wavelength range. The EL layer 172B included in the light-emitting element 161B contains at least a light-emitting organic compound that emits light with intensity in the blue wavelength range.

The EL layer 172R, the EL layer 172G, and the EL layer 172B may each include one or more of an electron-injection layer, an electron-transport layer, a hole-injection layer, and a hole-transport layer in addition to the layer containing a light-emitting organic compound (the light-emitting layer).

The conductive layer 171 functioning as a pixel electrode is provided in each of the light-emitting elements. The conductive layer 173 functioning as a common electrode is provided as a continuous layer shared by the light-emitting elements. A conductive film that transmits visible light is used for either the conductive layer 171 functioning as a pixel electrode or the conductive layer 173 functioning as a common electrode, and a reflective conductive film is used for the other. When the conductive layer 171 functioning as a pixel electrode has a light-transmitting property and the conductive layer 173 functioning as a common electrode has a reflective property, a bottom-emission display apparatus can be obtained, whereas when the conductive layer 171 functioning as a pixel electrode has a reflective property and the conductive layer 173 functioning as a common electrode has a light-transmitting property, a top-emission display apparatus can be obtained. Note that when both the conductive layer 171 functioning as a pixel electrode and the conductive layer 173 functioning as a common electrode have a light-transmitting property, a dual-emission display apparatus can be obtained.

An insulating layer 272 is provided to cover end portions of the conductive layer 171 functioning as a pixel electrode. End portions of the insulating layer 272 are preferably tapered. For the insulating layer 272, a material similar to the material that can be used for the insulating layer 363 can be used.

The EL layer 172R, the EL layer 172G, and the EL layer 172B each include a region in contact with the top surface of the conductive layer 171 functioning as a pixel electrode and a region in contact with the surface of the insulating layer 272. The end portions of the EL layer 172R, the EL layer 172G, and the EL layer 172B are positioned over the insulating layer 272.

As illustrated in FIG. 14B, there is a gap between the two EL layers of the light-emitting elements with different colors. In this manner, the EL layer 172R, the EL layer 172G, and the EL layer 172B are preferably provided so as not to be in contact with each other. This can suitably prevent unintentional light emission (also referred to as crosstalk) from being caused by a current flowing through two adjacent EL layers. As a result, the contrast can be increased to achieve a display apparatus with high display quality.

The EL layer 172R, the EL layer 172G, and the EL layer 172B can be formed separately by a vacuum evaporation method or the like using a shadow mask such as a metal mask. Alternatively, these layers may be formed separately by a photolithography method. The use of the photolithography method achieves a display apparatus with high resolution, which is difficult to obtain in the case of using a metal mask.

In this specification and the like, a device formed using a metal mask or an FMM (a fine metal mask, a high-resolution metal mask) may be referred to as a device having an MM (a metal mask) structure. In this specification and the like, a device formed without using a metal mask or an FMM is sometimes referred to as a device having an MML (metal maskless) structure. A display apparatus having an MML structure is formed without using a metal mask and thus has higher flexibility in designing the pixel arrangement, the pixel shape, and the like than a display apparatus having an FMM structure or an MM structure.

Note that in the method for manufacturing a display apparatus having an MML structure, an island-shaped EL layer is formed not by patterning with the use of a metal mask but by processing after formation of an EL layer over an entire surface. Accordingly, a high-resolution display apparatus or a display apparatus with a high aperture ratio, which has been difficult to achieve, can be manufactured. Moreover, EL layers can be formed separately for the respective colors, enabling the display apparatus to perform extremely clear display with high contrast and high display quality. In addition, a sacrificial layer (also referred to as a mask layer) provided over an EL layer can reduce damage to the EL layer in the manufacturing process of the display apparatus, increasing the reliability of the light-emitting element.

The display apparatus of one embodiment of the present invention can have a structure in which an insulator covering the end portion of the pixel electrode is not provided, that is, a structure in which no insulator is provided between the pixel electrode and the EL layer. With such a structure, light can be efficiently extracted from the EL layer, leading to extremely low viewing angle dependence. For example, in the display apparatus of one embodiment of the present invention, the viewing angle (the maximum angle with a certain contrast ratio maintained when the screen is seen from an oblique direction) can be greater than or equal to 100° and less than 180°, preferably greater than or equal to 150° and less than or equal to 170°. Note that the viewing angle refers to that in both the vertical direction and the horizontal direction. The display apparatus of one embodiment of the present invention can have improved viewing angle dependence and high image visibility.

In the case where a display apparatus is formed using a fine metal mask (FMM) structure, the pixel arrangement structure or the like is limited in some cases. Here, the FMM structure will be described below.

In the fabrication of the FMM structure, a metal mask provided with an opening portion (also referred to as an FMM) is set to be opposed to a substrate so that an EL material can be deposited to a desired region at the time of EL evaporation. Then, the EL material is deposited to the desired region by EL evaporation through the FMM. When the size of the substrate at the time of EL evaporation is larger, the size of the FMM is increased and accordingly the weight thereof is also increased. In addition, heat or the like is applied to the FMM at the time of EL evaporation and may change the shape of the FMM. Furthermore, there is a method in which EL evaporation is performed while a certain level of tension is applied to the FMM, for example; therefore, the weight and strength of the FMM are important parameters.

The pixel arrangement structure of a device with an FMM structure needs to be designed under certain restrictions; for example, the above-described parameters and the like need to be considered. On the other hand, the display apparatus of one embodiment of the present invention, which can have the MML structure, has an advantageous effect of a higher degree of freedom in a pixel arrangement structure than that of the FMM structure, for example. This structure is highly compatible with a flexible device or the like, for example, and thus one or both of a pixel and a driver circuit can have a variety of circuit arrangements.

A protective layer 271 is provided over the conductive layer 173 functioning as a common electrode so as to cover the light-emitting element 161R, the light-emitting element 161G, and the light-emitting element 161B. The protective layer 271 has a function of preventing diffusion of impurities such as water into the light-emitting elements from above.

The protective layer 271 can have, for example, a single-layer structure or a stacked-layer structure at least including an inorganic insulating film. As the inorganic insulating film, for example, an oxide film or a nitride film such as a silicon oxide film, a silicon oxynitride film, a silicon nitride oxide film, a silicon nitride film, an aluminum oxide film, an aluminum oxynitride film, or a hafnium oxide film can be given. Alternatively, a semiconductor material such as indium gallium oxide or indium gallium zinc oxide (IGZO) may be used for the protective layer 271. Note that the protective layer 271 may be formed by an atomic layer deposition (ALD) method, a chemical vapor deposition (CVD) method, or a sputtering method. Although the protective layer 271 includes an inorganic insulating film in this example, one embodiment of the present invention is not limited thereto. For example, the protective layer 271 may have a stacked-layer structure of an inorganic insulating film and an organic insulating film.

In the case where an indium gallium zinc oxide is used for the protective layer 271, the indium gallium zinc oxide can be processed by a wet etching method or a dry etching method. For example, in the case where IGZO is used as the protective layer 271, a chemical solution of oxalic acid, phosphoric acid, a chemical solution such as a mixed chemical solution (e.g., a mixed chemical solution of phosphoric acid, acetic acid, nitric acid, and water, which is also referred to as a mixed acid aluminum etchant), or the like can be used. Note that the volume ratio of phosphoric acid, acetic acid, nitric acid, and water mixed in the mixed acid aluminum etchant can be 53.3:6.7:3.3:36.7 or in the neighborhood thereof.

Figure 14C:
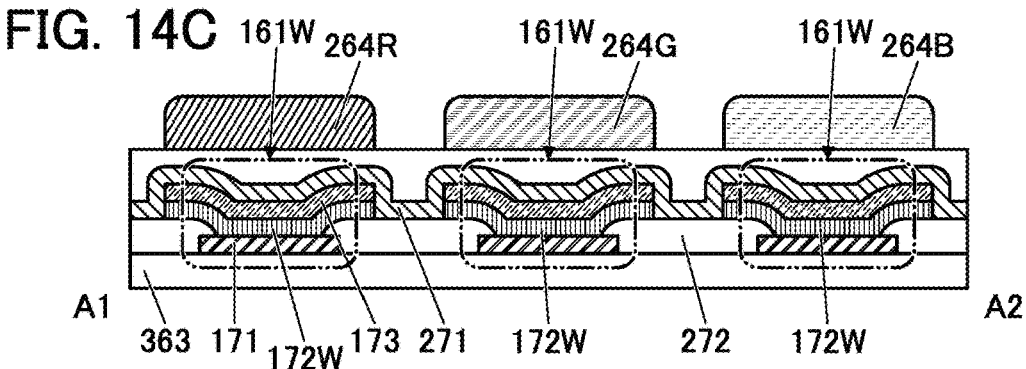

FIG. 14C illustrates an example different from the above example. Specifically, in FIG. 14C, light-emitting elements 161W that emit white light are provided. The light-emitting elements 161W each include an EL layer 172W that emits white light between the conductive layer 171 functioning as a pixel electrode and the conductive layer 173 functioning as a common electrode.

The EL layer 172W can have, for example, a structure in which two or more light-emitting layers that are selected so as to emit light of complementary colors are stacked. It is also possible to use a stacked EL layer in which a charge-generation layer is provided between light-emitting layers.

FIG. 14C illustrates three light-emitting elements 161W side by side. A coloring layer 264R is provided above the left light-emitting element 161W. The coloring layer 264R functions as a band path filter that transmits red light. Similarly, a coloring layer 264G that transmits green light is provided above the middle light-emitting element 161W, and a coloring layer 264B that transmits blue light is provided above the right light-emitting element 161W. Thus, the display apparatus can display an image with colors.

Here, the EL layer 172W and the conductive layer 173 functioning as a common electrode are each separated between adjacent two light-emitting elements 161W. This can prevent unintentional light emission from being caused by a current flowing through the EL layers 172W of adjacent two light-emitting elements 161W. Particularly when stacked EL layers in which a charge-generation layer is provided between two light-emitting layers are used as the EL layer 172W, crosstalk is more significant as the resolution increases, i.e., as the distance between adjacent pixels decreases, leading to lower contrast. Thus, the above structure can achieve a display apparatus having both high resolution and high contrast.

The EL layer 172W and the conductive layer 173 functioning as a common electrode are preferably isolated by a photolithography method. This can reduce the distance between light-emitting elements, achieving a display apparatus with a higher aperture ratio than that formed using, for example, a shadow mask such as a metal mask.

Note that in the case of a bottom-emission light-emitting element, a coloring layer may be provided between the conductive layer 171 functioning as a pixel electrode and the insulating layer 363.

Figure 14D:
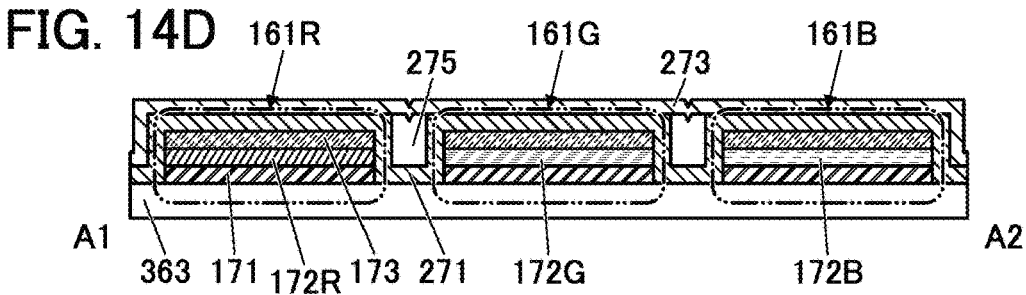

FIG. 14D illustrates an example different from the above. Specifically, in FIG. 14D, the insulating layers 272 are not provided between the light-emitting element 161R, the light-emitting element 161G, and the light-emitting element 161B. With such a structure, the display apparatus can have a high aperture ratio. When the insulating layer 272 is not provided, unevenness formed by the light-emitting elements 161 can be reduced, thereby improving the viewing angle of the display apparatus. Specifically, the viewing angle can be greater than or equal to 150° and less than 180°, preferably greater than or equal to 160° and less than 180°, further preferably greater than or equal to 160° and less than 180°.

The protective layer 271 covers the side surfaces of the EL layer 172R, the EL layer 172G, and the EL layer 172B. With this structure, impurities (typically, water or the like) can be inhibited from entering the EL layer 172R, the EL layer 172G, and the EL layer 172B through their side surfaces. In addition, a leak current between adjacent light-emitting elements 161 is reduced, so that color saturation and contrast ratio are improved and power consumption is reduced.

In the structure illustrated in FIG. 14D, the top shapes of the conductive layer 171, the EL layer 172R, and the conductive layer 173 are substantially aligned with each other. This structure can be formed in such a manner that the conductive layer 171, the EL layer 172R, and the conductive layer 173 are formed and collectively processed using a resist mask or the like. In this process, the EL layer 172R and the conductive layer 173 are processed using the conductive layer 173 as a mask, and thus this process can be called self-alignment patterning. Although the EL layer 172R is described here, the EL layer 172G and the EL layer 172B can each have a similar structure.

In FIG. 14D, a protective layer 273 is further provided over the protective layer 271. For example, the protective layer 271 can be formed with an apparatus that can deposit a film with excellent coverage (typically, an ALD apparatus), and the protective layer 273 can be formed with an apparatus that can deposit a film with coverage inferior to that of the protective layer 271 (typically, a sputtering apparatus), whereby a region 275 can be provided between the protective layer 271 and the protective layer 273. In other words, the region 275 are positioned between the EL layer 172R and the EL layer 172G and between the EL layer 172G and the EL layer 172B.

Note that the region 275 includes, for example, one or more selected from air, nitrogen, oxygen, carbon dioxide, and Group 18 elements (typically, helium, neon, argon, xenon, and krypton). Furthermore, for example, a gas used during the deposition of the protective layer 273 is sometimes included in the region 275. For example, in the case where the protective layer 273 is deposited using a sputtering method, any one or more of the above-described Group 18 elements is sometimes included in the region 275. In the case where a gas is included in the region 275, a gas can be identified with a gas chromatography method or the like. Alternatively, in the case where the protective layer 273 is deposited using a sputtering method, a gas used in the sputtering is sometimes contained in the protective layer 273. In this case, an element such as argon is sometimes detected when the protective layer 273 is analyzed by an energy dispersive X-ray analysis (EDX analysis) or the like, for example.

In the case where the refractive index of the region 275 is lower than that of the protective layer 271, light emitted from the EL layer 172R, the EL layer 172G, or the EL layer 172B is reflected at the interface between the protective layer 271 and the region 275. Thus, light emitted from the EL layer 172R, the EL layer 172G, or the EL layer 172B can be inhibited from entering an adjacent pixel in some cases. This can inhibit color mixture of light emitted from adjacent pixels and thus can improve the display quality of the display apparatus.

In the case of the structure illustrated in FIG. 14D, a region between the light-emitting element 161R and the light-emitting element 161G or a region between the light-emitting element 161G and the light-emitting element 161B (hereinafter simply referred to as a distance between the light-emitting elements) can be small. Specifically, the distance between the light-emitting elements can be less than or equal to 1 μm, preferably less than or equal to 500 nm, further preferably less than or equal to 200 nm, less than or equal to 100 nm, less than or equal to 90 nm, less than or equal to 70 nm, less than or equal to 50 nm, less than or equal to 30 nm, less than or equal to 20 nm, less than or equal to 15 nm, or less than or equal to 10 nm. In other words, the display apparatus includes a region in which a distance between the side surface of the EL layer 172R and the side surface of the EL layer 172G or a distance between the side surface of the EL layer 172G and the side surface of the EL layer 172B is less than or equal to 1 μm, preferably less than or equal to 0.5 μm (500 nm), further preferably less than or equal to 100 nm.

In the case where the region 275 includes gas, for example, the light-emitting elements can be isolated from each other and color mixture of light from the light-emitting elements, crosstalk, or the like can be inhibited.

The region 275 may be filled with, for example, an insulating layer including an organic material. As the insulating layer including an organic material, an acrylic resin, a polyimide resin, an epoxy resin, a polyamide resin, a polyimide-amide resin, a siloxane resin, a benzocyclobutene-based resin, a phenol resin, precursors of these resins, or the like can be used, for example. A photosensitive resin can be used as the material filling the region 275. As the photosensitive resin, a positive photosensitive material or a negative photosensitive material can be used.

With the photosensitive resin, the region 275 can be fabricated only by light exposure and development steps. The region 275 may be formed with a negative photosensitive resin. In the case where an insulating layer containing an organic material is used as the region 275, a material absorbing visible light is suitably used. When a material that absorbs visible light is used for the region 275, light emitted from the EL layer can be absorbed by the region 275, so that light that might leak to the adjacent EL layer (stray light) can be inhibited. Thus, a display apparatus having high display quality can be provided.

When the above-described white-light-emitting element (the single structure or the tandem structure) and a light-emitting element having the above-described SBS structure are compared, the light-emitting element having the SBS structure consumes lower power than the white-light-emitting element. To reduce power consumption, the light-emitting element having the SBS structure is suitably used. In contrast, the white light-emitting device is suitable in that the manufacturing cost is low or the manufacturing yield is high because a process for manufacturing the white light-emitting device is easier than that for the light-emitting device having an SBS structure.

FIG. 15A illustrates an example different from the above. Specifically, the structure illustrated in FIG. 15A is different from the structure illustrated in FIG. 14D in the structure of the insulating layer 363. The insulating layer 363 has a recessed portion in its top surface that is formed by being partially etched when the light-emitting element 161R, the light-emitting element 161G, and the light-emitting element 161B are processed. In addition, the protective layer 271 is formed in the recessed portion. In other words, in the cross-sectional view, a region is provided, in which the bottom surface of the protective layer 271 is positioned below the bottom surface of the conductive layer 171. With the region, impurities (typically, water or the like) can be suitably inhibited from entering the light-emitting element 161R, the light-emitting element 161G, and the light-emitting element 161B from the bottom. It is likely that the recessed portion can be formed when impurities (also referred to as residue) that could be attached to the side surfaces of the light-emitting element 161R, the light-emitting element 161G, and the light-emitting element 161B in processing of the light-emitting elements are removed by e.g., wet etching. After the residue is removed, the side surfaces of the light-emitting elements are covered with the protective layer 271, whereby a highly reliable display apparatus can be provided.

FIG. 15B illustrates an example different from the above. Specifically, the structure illustrated in FIG. 15B includes an insulating layer 276 and a microlens array 277 in addition to the structure illustrated in FIG. 15A. The insulating layer 276 functions as an adhesive layer. Note that when the refractive index of the insulating layer 276 is lower than that of the microlens array 277, the microlens array 277 can condense light emitted from the light-emitting element 161R, the light-emitting element 161G, and the light-emitting element 161B in some cases. Condensing light emitted from the light-emitting element 161R, the light-emitting element 161G, and the light-emitting element 161B is suitable because a user can see bright images particularly when the user sees the display surface from the front of the display apparatus. As the insulating layer 276, a variety of curable adhesives, e.g., a photocurable adhesive such as an ultraviolet curable adhesive, a reactive curable adhesive, a thermosetting adhesive, and an anaerobic adhesive can be used. Examples of these adhesives include an epoxy resin, an acrylic resin, a silicone resin, a phenol resin, a polyimide resin, an imide resin, a PVC (polyvinyl chloride) resin, a PVB (polyvinyl butyral) resin, and an EVA (ethylene vinyl acetate) resin. In particular, a material with low moisture permeability, such as an epoxy resin, is preferred. A two-component-mixture-type resin may be used. An adhesive sheet may be used, for example.

FIG. 15C illustrates an example different from the above. Specifically, the structure illustrated in FIG. 15C includes three light-emitting elements 161W instead of the light-emitting element 161R, the light-emitting element 161G, and the light-emitting element 161B in the structure illustrated in FIG. 15A. In addition, the insulating layer 276 is provided over the three light-emitting elements 161W, and the coloring layer 264R, the coloring layer 264G, and the coloring layer 264B are provided over the insulating layer 276. Note that the coloring layer may be called a color filter. Specifically, the coloring layer 264R that transmits red light is provided at a position overlapping with the left light-emitting element 161W, the coloring layer 264G that transmits green light is provided at a position overlapping with the middle light-emitting element 161W, and the coloring layer 264B that transmits blue light is provided at a position overlapping with the right light-emitting element 161W. Thus, the display apparatus can display an image with colors. The structure illustrated in FIG. 15C is also a modification example of the structure illustrated in FIG. 14C.

The light-emitting elements 161W illustrated in FIG. 15C can have the above-described structure capable of white light emission (the single structure or the tandem structure). The tandem structure is preferable to obtain high-luminance light emission.

When the above-described structure capable of white light emission (one or both of the single structure and the tandem structure), color filters, and the MML structure of one embodiment of the present invention are combined, a display apparatus with a high contrast ratio can be obtained.

FIG. 15D illustrates an example different from the above. Specifically, in the structure illustrated in FIG. 15D, the protective layer 271 is provided adjacent to the side surfaces of the conductive layer 171 and the EL layer 172. The conductive layer 173 is provided as a common layer shared by the light-emitting elements. In the structure illustrated in FIG. 15D, the region 275 is preferably filled with a filler.

Furthermore, the color purity of emitted light can be further increased when the light-emitting element 161 has a microcavity structure. In order that the light-emitting element 161 may have a microcavity structure, a product of a distance d between the conductive layer 171 and the conductive layer 173 and a refractive index n of the EL layer 172 (optical distance) is set to m times as large as ½ of a wavelength λ (m is an integer greater than or equal to 1). The distance d can be obtained by Formula 1.

$$d = m \times \lambda/(2 \times n) \qquad \text{Formula 1}$$

According to Formula 1, in the light-emitting element 161 having the microcavity structure, the distance d is determined in accordance with the wavelength (emission color)

of emitted light. The distance d corresponds to the thickness of the EL layer 172. Thus, the EL layer 172G is provided to have a larger thickness than the EL layer 172B, and the EL layer 172R is provided to have a larger thickness than the EL layer 172G, in some cases.

Note that to be exact, the distance d is a distance from a reflection region in the conductive layer 171 functioning as a reflective electrode to a reflection region in the conductive layer 173 functioning as a transflective electrode. For example, in the case where the conductive layer 171 is a stack of silver and ITO that is a transparent conductive film and the ITO is positioned on the EL layer 172 side, the distance d suitable for the emission color can be set by adjusting the thickness of the ITO. That is, even when the EL layer 172R, the EL layer 172G, and the EL layer 172B have the same thickness, the distance d suitable for the emission color can be obtained by adjusting the thickness of the ITO.

However, it is sometimes difficult to determine the exact position of the reflection region in each of the conductive layer 171 and the conductive layer 173. In that case, it is assumed that the effect of the microcavity can be obtained sufficiently with a certain position in each of the conductive layer 171 and the conductive layer 173 being supposed as the reflective region.

The light-emitting element 161 includes a hole-injection layer, a hole-transport layer, a light-emitting layer, an electron-transport layer, an electron-injection layer, and the like. In order to increase the outcoupling efficiency in the microcavity structure, the optical path length from the conductive layer 171 functioning as a reflective electrode to the light-emitting layer is preferably set to an odd multiple of 24. In order to achieve this optical distance, the thicknesses of the layers in the light-emitting element 161 are preferably adjusted as appropriate.

In the case where light is emitted from the conductive layer 173 side, the reflectance of conductive layer 173 is preferably higher than the transmittance thereof. The light transmittance of the conductive layer 173 is preferably higher than or equal to 2% and lower than or equal to 50%, further preferably higher than or equal to 2% and lower than or equal to 30%, still further preferably higher than or equal to 2% and lower than or equal to 10%. When the transmittance of the conductive layer 173 is set low (the reflectance is set high), the effect of the microcavity can be enhanced.

Figure 16A:
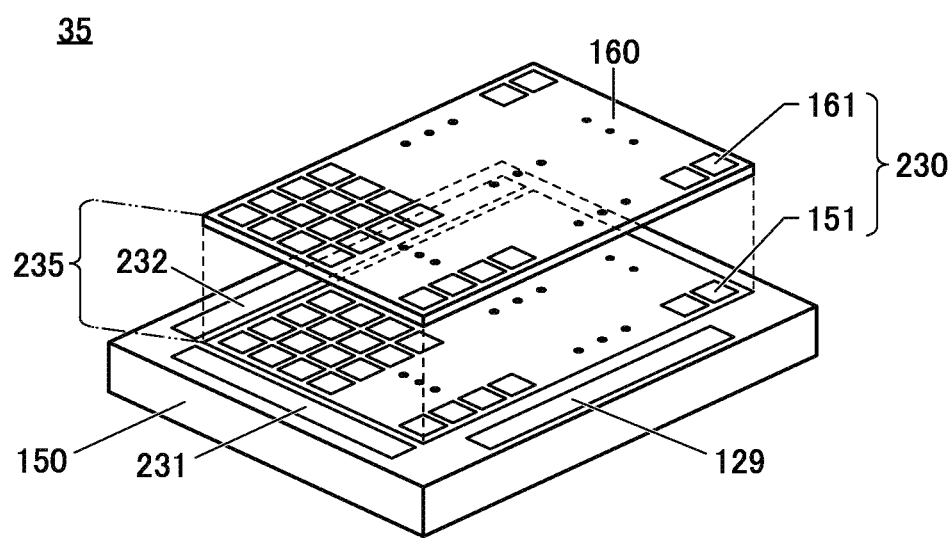
FIG. 16A and FIG. 16B are perspective views illustrating a structure example of the display apparatus.

FIG. 16A is a perspective view of the display apparatus 35. The display apparatus 35 illustrated in FIG. 16A includes a layer 160 overlapping with a layer 150. The layer 150 includes a plurality of pixel circuits 151 arranged in a matrix, the first driver circuit unit 231, the second driver circuit unit 232, and an input/output terminal unit 129. The layer 160 includes a plurality of light-emitting elements 161 arranged in a matrix.

One pixel circuit 151 and one light-emitting element 161 are electrically connected to each other and function as one pixel 230. Thus, a region where a plurality of pixel circuits 151 included in the layer 150 and a plurality of light-emitting elements 161 included in the layer 160 overlap with each other functions as the display region 235.

Power, a signal, and the like needed for operation of the display apparatus 35 are supplied to the display apparatus 35 through the input/output terminal unit 129. A transistor included in the peripheral driver circuit can be formed in the same steps as the transistors included in the pixels 230 in the display apparatus illustrated in FIG. 16A.

Figure 16B:
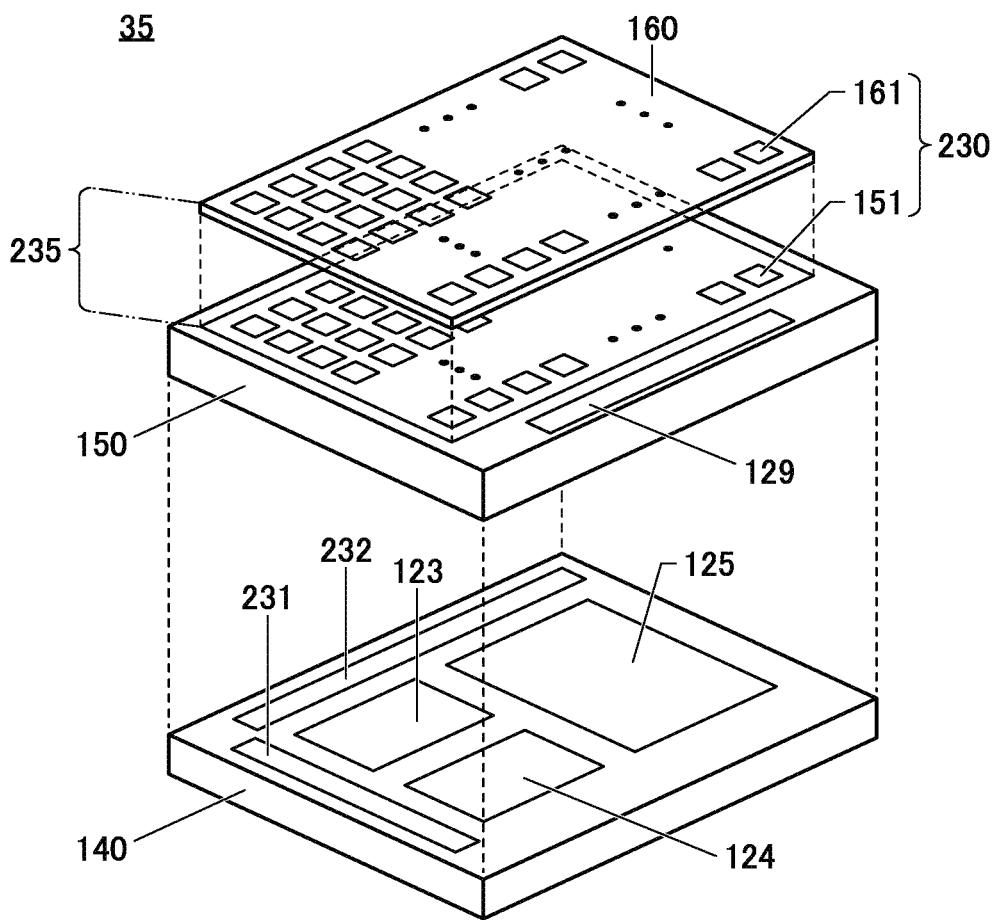

As illustrated in FIG. 16B, a layer 140, a layer 150, and a layer 160 may be provided to overlap with each other in the display apparatus 35. In FIG. 16B, a plurality of pixel circuits 151 arranged in a matrix are provided in the layer 150, and the first driver circuit unit 231 and the second driver circuit unit 232 are provided in the layer 140. By providing the first driver circuit unit 231 and the second driver circuit unit 232 in a layer different from that of the pixel circuit 151, the bezel width around the display region 235 can be small; thus, the area occupied by the display region 235 can be increased.

By increasing the area occupied by the display region 235, the definition of the display region 235 can be increased. Under a fixed definition of the display region 235, the area occupied by one pixel can be increased. Thus, the emission luminance of the display region 235 can be increased. In addition, the proportion of the light-emitting region to the area occupied by one pixel (also referred to as "aperture ratio") can be increased. For example, the pixel aperture ratio can be greater than or equal to 40% and less than 100%, preferably greater than or equal to 50% and less than or equal to 95%, further preferably greater than or equal to 60% and less than or equal to 95%. By the expansion of the area occupied by one pixel, the density of current supplied to the light-emitting element 161 can be lowered. Thus, a load on the light-emitting element 161 can be reduced, leading to an increase in the reliability of the display apparatus 35. Accordingly, the reliability of the moving object 10 including the display apparatus 35 can be increased.

For example, stacking the display region 235 and the peripheral driver circuit can shorten the wirings for electrical connection between them. Thus, wiring resistance and parasitic capacitance can be lowered, so that the operation speed of the display apparatus 35 can be increased. Furthermore, the power consumption of the display apparatus 35 is reduced.

The layer 140 may include a CPU 123, a GPU 124, and a storage circuit unit 125 in addition to the peripheral driver circuit. In this embodiment and the like, the peripheral driver circuit, the CPU 123, the GPU 124, and the storage circuit unit 125 are collectively referred to as a "functional circuit" in some cases.

The CPU 123 has a function of controlling operation of the circuit provided in the layer 140, following the program stored in the storage circuit unit 125. The GPU 124 has a function of performing arithmetic processing for generating image data. Furthermore, the GPU 124 can execute a large number of matrix operation (product-sum operation) in parallel and thus, can execute arithmetic operation using a neural network at high speed, for example. The GPU 124 is configured to correct image data using the correction data stored in the memory circuit portion 125, for example. The GPU 124 has a function of correcting a video signal using correction data stored in the storage circuit unit 125, for example. For example, the GPU 124 has a function of generating a video signal in which brightness, hue, and/or contrast, or the like is corrected.

Upconversion or downconversion of a video signal may be performed using the GPU 124. A super-resolution circuit may be provided in the layer 140. The super-resolution circuit has a function of determining a potential of any pixel included in the display region 235 by product-sum operation of weights and potentials of pixels in the periphery of the pixel. The super-resolution circuit has a function of upconverting a video signal with a lower resolution than that of the display region 235. The super-resolution circuit has a function of downconverting a video signal with a higher resolution than that of the display region 235.

Providing the super-resolution circuit can reduce the load on the GPU 124. For example, the GPU 124 executes processing up to 2K resolution (or 4K resolution) and the super-resolution circuit performs upconversion to 4K resolution (or 8K resolution), whereby the load on the GPU 124 can be reduced. Down-conversion may be performed in a similar manner.

Note that the functional circuit included in the layer 140 does not necessarily include all of the circuits, and may include another structure. For example, a potential generating circuit that generates a plurality of different potentials, and/or a power management circuit for controlling supply and stop of electrical power for each circuit included in the display apparatus 35 may be provided.

The supply and stop of electrical power may be performed per circuit included in the CPU 123. For example, power consumption can be reduced by stopping supply of electrical power to a circuit, which is determined to be not used for a while, of the circuits included in the CPU 123, and restarting the supply of electrical power to the circuit as needed. Data necessary for restarting supply of electrical power may be stored in a storage circuit in the CPU 123, the storage circuit unit 125, or the like before stopping the circuit. By storing data necessary for recovery of the circuit, high-speed recovery of the circuit stopped can be performed. Note that supply of a clock signal may be stopped to stop the circuit operation.

As the functional circuit, a DSP (Demand Side Platform) circuit, a sensor circuit, a communication circuit and/or FPGA (Field Programmable Gate Array) may be included, for example.

Some of the transistors included in the functional circuit included in the layer 140 may be provided in the layer 150. Some of the transistors included in the pixel circuit 151 included in the layer 150 may be provided in the layer 140. Thus, the functional circuit may include a Si transistor and an OS transistor. The pixel circuit 151 may include a Si transistor and an OS transistor.

Figure 17:
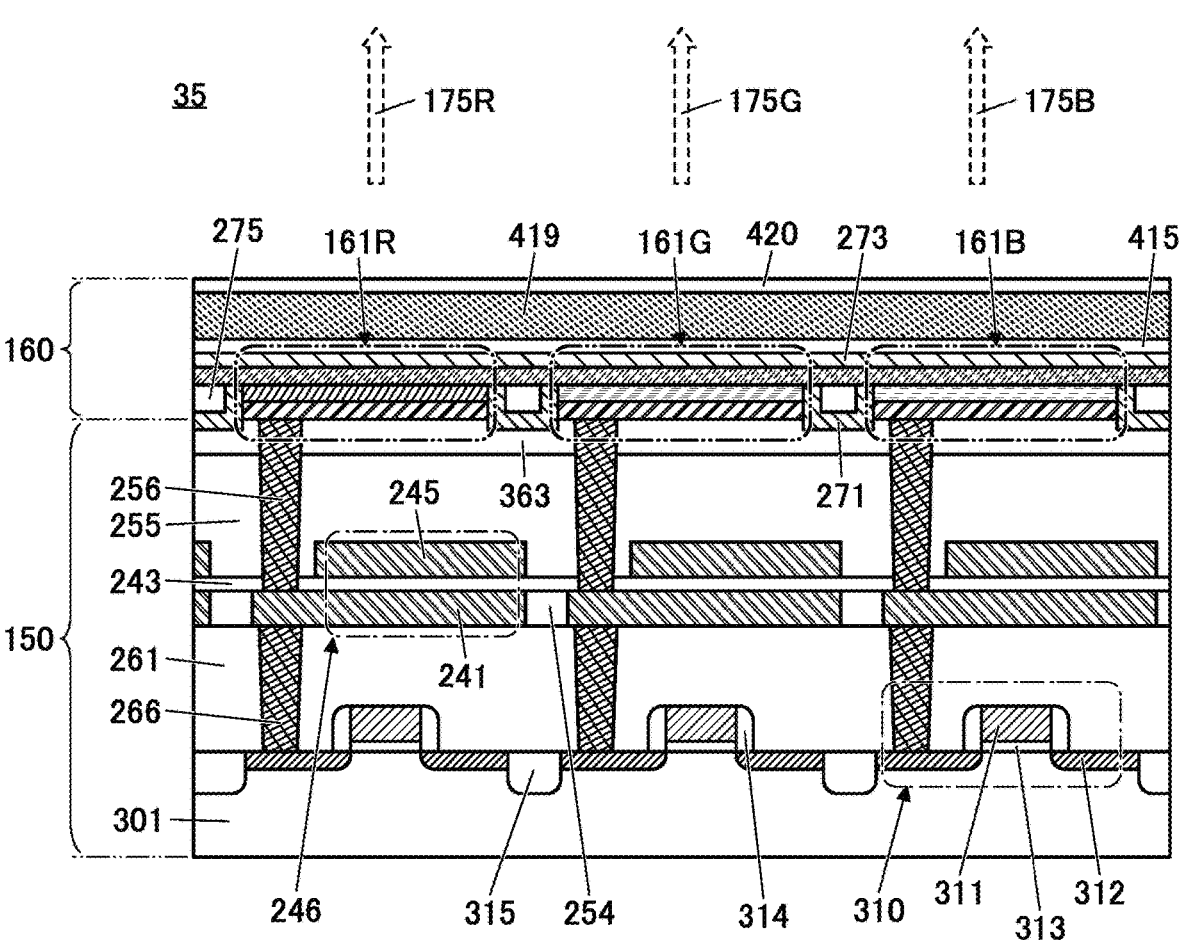
FIG. 17 is a cross-sectional view illustrating a structure example of the display apparatus.

FIG. 17 illustrates a cross-sectional structure example of part of the display apparatus 35 illustrated in FIG. 16A. The display apparatus 35 illustrated in FIG. 17 includes the layer 150 including a substrate 301, a capacitor 246, and the transistor 310 and the layer 160 including the light-emitting element 161R, the light-emitting element 161G, and the light-emitting element 161B. The layer 160 is provided over the insulating layer 363 included in the layer 150.

The light-emitting element 161R can emit at least light 175R with intensity in the red wavelength range. The light-emitting element 161G can emit at least light 175G with intensity in the green wavelength range. The light-emitting element 161B can emit at least light 175B with intensity in the blue wavelength range.

The transistor 310 is a transistor including a channel formation region in the substrate 301. As the substrate 301, a semiconductor substrate such as a single crystal silicon substrate can be used, for example. The transistor 310 includes part of the substrate 301, a conductive layer 311, a low-resistance region 312, an insulating layer 313, and an insulating layer 314. The conductive layer 311 functions as a gate electrode. The insulating layer 313 is positioned between the substrate 301 and the conductive layer 311 and functions as a gate insulating layer. The low-resistance region 312 is a region where the substrate 301 is doped with an impurity, and functions as one of a source and a drain. The insulating layer 314 is provided to cover a side surface of the conductive layer 311.

In addition, an element isolation layer 315 is provided between two adjacent transistors 310 to be embedded in the substrate 301.

Furthermore, an insulating layer 261 is provided to cover the transistor 310, and the capacitor 246 is provided over the insulating layer 261.

The capacitor 246 includes a conductive layer 241, a conductive layer 245, and an insulating layer 243 positioned therebetween. The conductive layer 241 functions as one electrode of the capacitor 246, the conductive layer 245 functions as the other electrode of the capacitor 246, and the insulating layer 243 functions as a dielectric of the capacitor 246.

The conductive layer 241 is provided over the insulating layer 261 and is embedded in an insulating layer 254. The conductive layer 241 is electrically connected to one of a source and a drain of the transistor 310 through a plug 266 embedded in the insulating layer 261. The insulating layer 243 is provided to cover the conductive layer 241. The conductive layer 245 is provided in a region overlapping with the conductive layer 241 with the insulating layer 243 therebetween.

The insulating layer 255 is provided to cover the capacitor 246, the insulating layer 363 is provided over the insulating layer 255, and the light-emitting element 161R, the light-emitting element 161G, and the light-emitting element 161B are provided over the insulating layer 363. A protective layer 415 is provided over the light-emitting element 161R, the light-emitting element 161G, and the light-emitting element 161B, and a substrate 420 is provided over the top surface of the protective layer 415 with a resin layer 419 therebetween.

The pixel electrode of the light-emitting element is electrically connected to one of the source and the drain of the transistor 310 through a plug 256 embedded in the insulating layer 243, the insulating layer 255, and the insulating layer 363, the conductive layer 241 embedded in the insulating layer 254, and the plug 266 embedded in the insulating layer 261.

Figure 18:
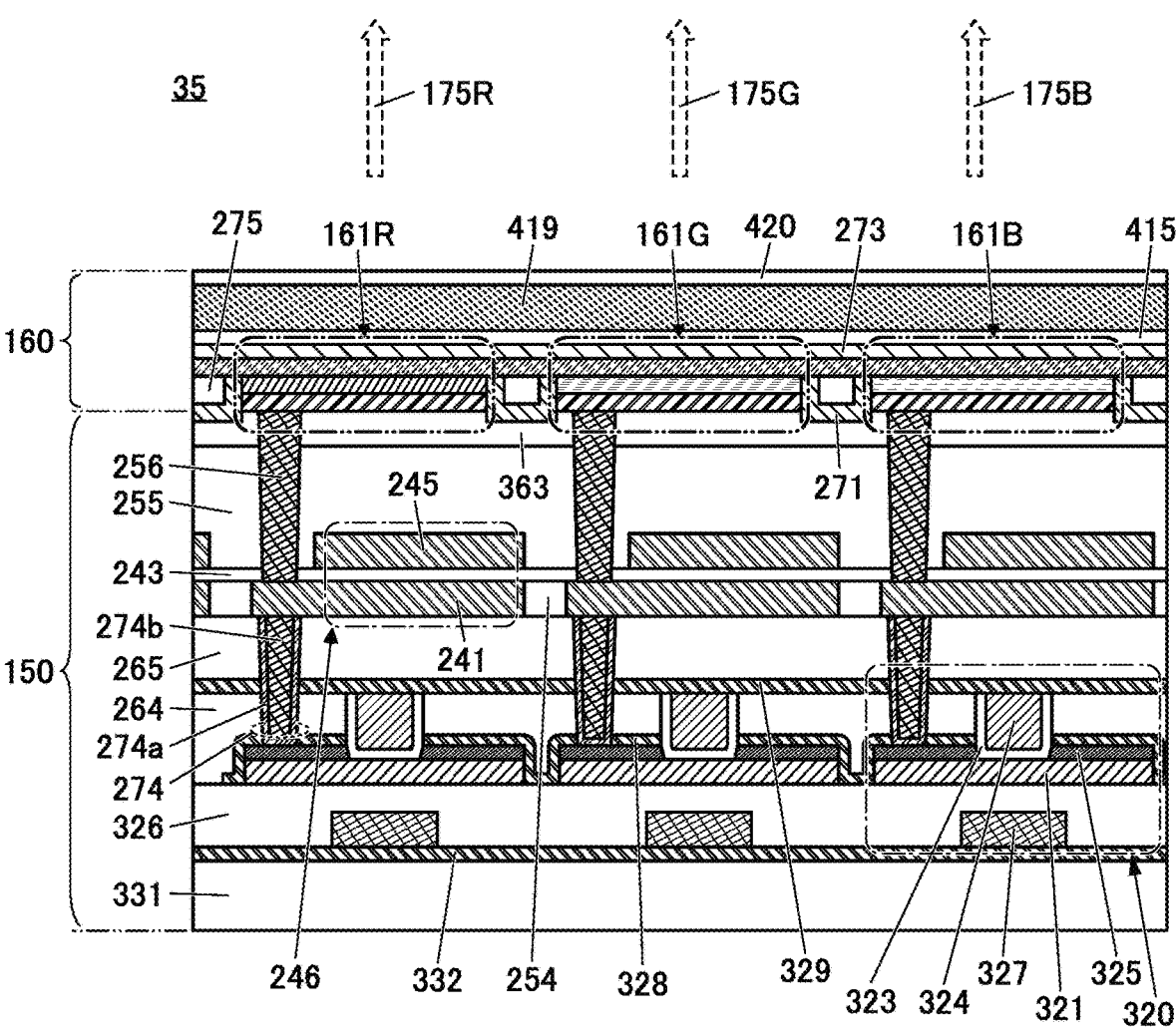
FIG. 18 is a cross-sectional view illustrating a structure example of the display apparatus.

FIG. 18 illustrates a modification example of the cross-sectional structure example illustrated in FIG. 17. The cross-sectional structure example of the display apparatus 35 illustrated in FIG. 18 differs from the cross-sectional structure example illustrated in FIG. 17 mainly in including a transistor 320 instead of the transistor 310. Note that description of portions similar to those in FIG. 17 is partly omitted.

The transistor 320 is a transistor in which a metal oxide (also referred to as an oxide semiconductor) is used in a semiconductor layer where a channel is formed.

The transistor 320 includes a semiconductor layer 321, an insulating layer 323, a conductive layer 324, a pair of conductive layers 325, an insulating layer 326, and a conductive layer 327.

As the substrate 331, an insulating substrate or a semiconductor substrate can be used.

An insulating layer 332 is provided over the substrate 331. The insulating layer 332 functions as a barrier layer that prevents diffusion of impurities such as water or hydrogen from the substrate 331 into the transistor 320 and release of oxygen from the semiconductor layer 321 to the insulating layer 332 side. As the insulating layer 332, it is possible to use, for example, a film in which hydrogen or oxygen is less likely to be diffused than in a silicon oxide film, such as an aluminum oxide film, a hafnium oxide film, or a silicon nitride film.

The conductive layer 327 is provided over the insulating layer 332, and the insulating layer 326 is provided to cover the conductive layer 327. The conductive layer 327 functions as a first gate electrode of the transistor 320, and part of the insulating layer 326 functions as a first gate insulating layer. For at least part of the insulating layer 326 that is in contact with the semiconductor layer 321, an oxide insulating film such as a silicon oxide film is preferably used. In addition, the top surface of the insulating layer 326 is preferably planarized.

The semiconductor layer 321 is provided over the insulating layer 326. A metal oxide film having semiconductor characteristics is preferably included in the semiconductor layer 321.

The pair of conductive layers 325 is provided over and in contact with the semiconductor layer 321, and functions as a source electrode and a drain electrode.

An insulating layer 328 is provided to cover the top surfaces and side surfaces of the pair of conductive layers 325, a side surface of the semiconductor layer 321, and the like, and an insulating layer 264 is provided over the insulating layer 328. The insulating layer 328 functions as a barrier layer that prevents diffusion of impurities such as water or hydrogen from the insulating layer 264 or the like into the semiconductor layer 321 and release of oxygen from the semiconductor layer 321. As the insulating layer 328, an insulating film similar to the insulating layer 332 can be used.

An opening reaching the semiconductor layer 321 is provided in the insulating layer 328 and the insulating layer 264. The insulating layer 323 that is in contact with side surfaces of the insulating layer 264, the insulating layer 328, and the conductive layer 325 and the top surface of the semiconductor layer 321, and the conductive layer 324 are embedded in the opening. The conductive layer 324 functions as a second gate electrode, and the insulating layer 323 functions as a second gate insulating layer.

The top surface of the conductive layer 324, the top surface of the insulating layer 323, and the top surface of the insulating layer 264 are planarized so that they are substantially level with each other, and an insulating layer 329 and an insulating layer 265 are provided to cover these layers.

The insulating layer 264 and the insulating layer 265 function as interlayer insulating layers. The insulating layer 329 functions as a barrier layer that prevents diffusion of impurities such as water or hydrogen from the insulating layer 265 or the like into the transistor 320. As the insulating layer 329, an insulating film similar to the insulating layer 328 and the insulating layer 332 can be used.

A plug 274 electrically connected to one of the pair of conductive layers 325 is provided to be embedded in the insulating layer 265, the insulating layer 329, the insulating layer 264, and the insulating layer 328. Here, the plug 274 preferably includes a conductive layer 274a that covers side surfaces of each opening formed in the insulating layer 265, the insulating layer 329, the insulating layer 264, and the insulating layer 328 and part of the top surface of the conductive layer 325, and a conductive layer 274b in contact with a top surface of the conductive layer 274a. In this case, a conductive material in which hydrogen and oxygen are unlikely to be diffused is preferably used for the conductive layer 274a.

Note that the display apparatus illustrated in FIG. 18 includes an OS transistor and a light-emitting element having an MML (metal maskless) structure. With this structure, the leakage current that might flow through the transistor and the leakage current that might flow between adjacent light-emitting elements (also referred to as a lateral leakage current, a side leakage current, or the like) can become extremely low. With the structure, a viewer can notice any one or more of the image crispness, the image sharpness, a high chroma, and a high contrast ratio in an image displayed on the display apparatus. With the structure where the leakage current that might flow through the transistor and the lateral leakage current that might flow between light-emitting elements are extremely low, display with little leakage of light at the time of black display (i.e., with few phenomena in which the black image looks whitish) (such display is also referred to as deep black display) can be achieved.

In particular, in the case where a light-emitting element having an MML structure employs the above-described SBS structure, a layer provided between light-emitting elements (for example, also referred to as an organic layer or a common layer which is commonly used between the light-emitting elements) is disconnected; accordingly, display with no or extremely low side leakage can be achieved.

Figure 19:
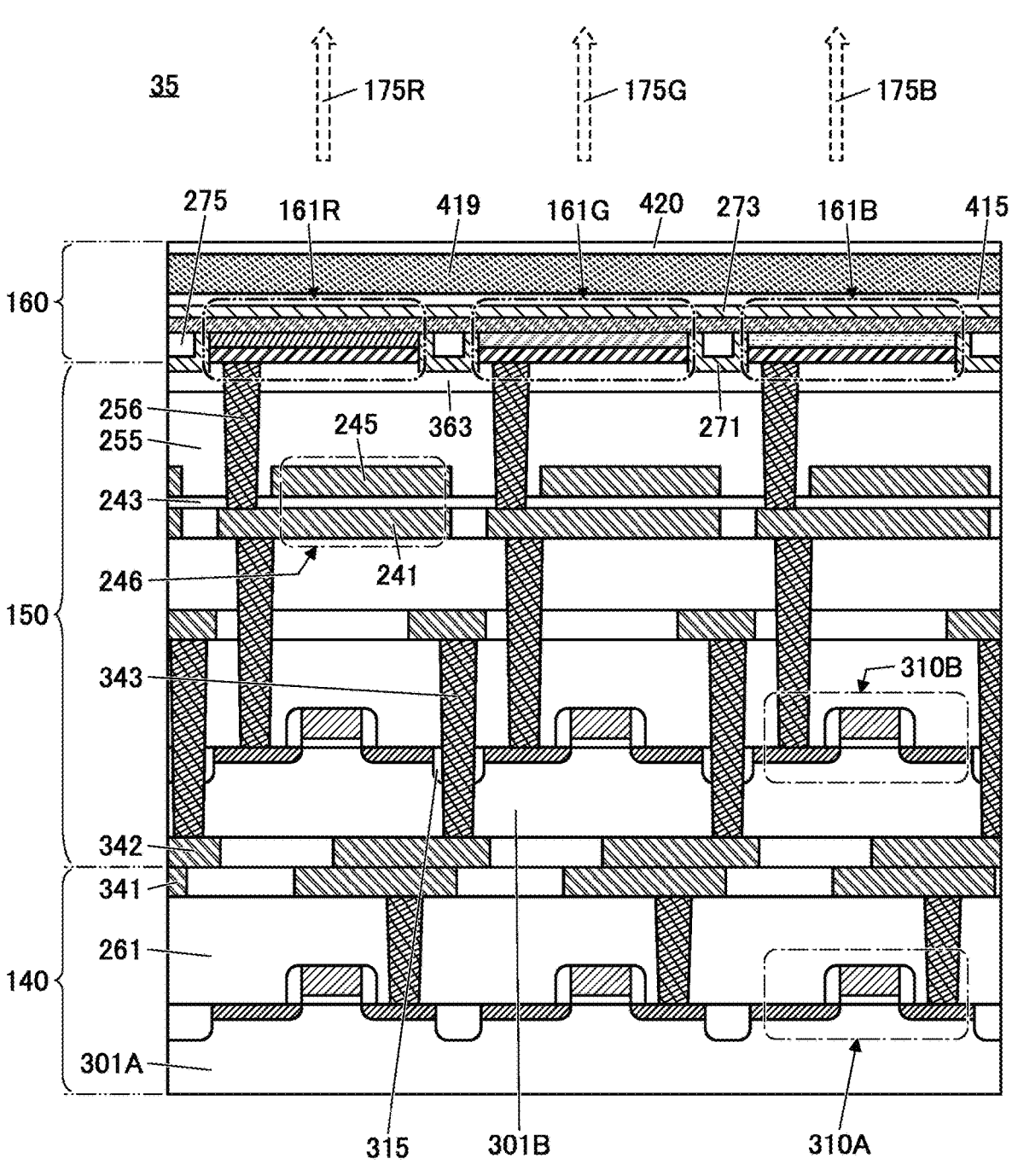
FIG. 19 is a cross-sectional view illustrating a structure example of the display apparatus.

FIG. 19 illustrates a cross-sectional structure example of part of the display apparatus 35 in FIG. 16B. The display apparatus 35 illustrated in FIG. 19 has a structure in which a transistor 310A in which a channel is formed in a substrate 301A included in the layer 140 and a transistor 310B in which a channel is formed in the substrate 301A included in the layer 140 are stacked. A material similar to that of the substrate 301 can be used for the substrate 301A.

The display apparatus 35 illustrated in FIG. 19 has a structure in which the layer 160 in which the light-emitting element 161 is provided, a layer 150 in which a substrate 301B, the transistor 310B, and the capacitor 246 are provided, and the layer 140 where the substrate 301A and the transistor 310A is provided are attached to each other.

The substrate 301B is provided with a plug 343 that penetrates the substrate 301B. The plug 343 functions as a Si through electrode (TSV: Through Silicon Via). The plug 343 is electrically connected to a conductive layer 342 provided on the rear surface (the surface on the substrate 301A side) of the substrate 301B. A conductive layer 341 is provided over the insulating layer 261 over the substrate 301A.

The conductive layer 341 and the conductive layer 342 are bonded to each other, whereby the layer 140 and the layer 150 are electrically connected to each other.

The conductive layer 341 and the conductive layer 342 are preferably formed using the same conductive material. For the conductive layer 341 and the conductive layer 342, a metal film containing an element selected from Al, Cr, Cu, Ta, Sn, Zn, Au, Ag, Pt, Ti, Mo, and W, a metal nitride film containing the above element as a component (a titanium nitride film, a molybdenum nitride film, or a tungsten nitride film), or the like can be used, for example. Copper is particularly preferably used for the conductive layer 341 and the conductive layer 342. In that case, it is possible to employ Cu-to-Cu (copper-to-copper) direct bonding (a technique for achieving electrical continuity by connecting Cu (copper) pads). Note that the conductive layer 341 and the conductive layer 342 may be bonded to each other through a bump.

Figure 20:
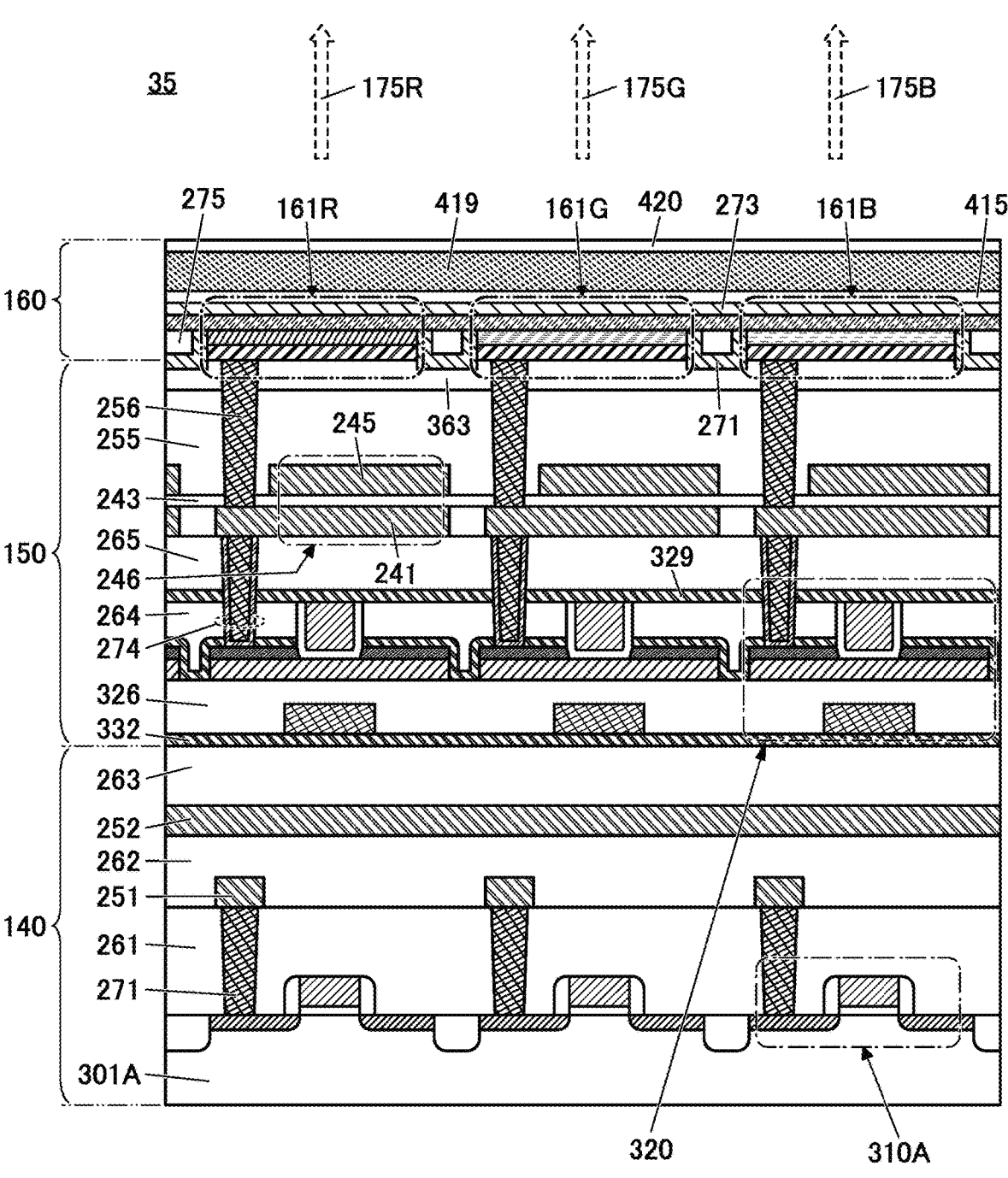
FIG. 20 is a cross-sectional view illustrating a structure example of the display apparatus.

FIG. 20 illustrates a modification example of the cross-sectional structure example illustrated in FIG. 19. The cross-sectional structure example of the display apparatus 35 illustrated in FIG. 20 has a structure in which the transistor 310A whose channel is formed in the substrate 301A and the transistor 320 including a metal oxide in the semiconductor layer where the channel is formed are stacked. Note that description of portions similar to those in FIG. 17 to FIG. 19 is partly omitted.

The layer 150 illustrated in FIG. 20 has a structure in which the substrate 331 is removed from the layer 150 illustrated in FIG. 18. In the layer 140 illustrated in FIG. 20, the insulating layer 261 is provided to cover the transistor 310A, and a conductive layer 251 is provided over the insulating layer 261. In addition, an insulating layer 262 is provided to cover the conductive layer 251, and a conductive layer 252 is provided over the insulating layer 262. The conductive layer 251 and the conductive layer 252 each function as a wiring. An insulating layer 263 and the insulating layer 332 are provided to cover the conductive layer 252, and the transistor 320 is provided over the insulating layer 332. The insulating layer 265 is provided to cover the transistor 320, and the capacitor 246 is provided over the insulating layer 265. The capacitor 246 and the transistor 320 are electrically connected to each other through the plug 274. The layer 150 is provided to overlap with the insulating layer 263 included in the layer 140.

The transistor 320 can be used as a transistor included in the pixel circuit 151. The transistor 310 can be used as a transistor included in the pixel circuit 151 or a transistor included in the peripheral driver circuit. The transistor 310 and the transistor 320 can also be used as transistors included in a variety of functional circuits such as an arithmetic circuit and a storage circuit.

With such a structure, for example, the peripheral driver circuit in addition to the pixel circuit 151 can be formed directly under the layer 160 including the light-emitting element 161. Thus, the display apparatus can be downsized as compared with the case where a driver circuit is provided around a display region.

At least part of the structure examples, the drawings corresponding thereto, and the like shown in this embodiment as examples can be combined with the other structure examples, the other drawings, and the like as appropriate.

At least part of this embodiment can be implemented in combination with the other embodiments described in this specification as appropriate.

Embodiment 3

In this embodiment, transistors that can be used in the moving object of one embodiment of the present invention will be described.

<Structure Example of Transistor>

FIG. 21A, FIG. 21B, and FIG. 21C are a top view and cross-sectional views of a transistor 500 that can be used in the moving object of one embodiment of the present invention. The transistor 500 can be used in the moving object of one embodiment of the present invention.

FIG. 21A is a top view of the transistor 500. FIG. 21B and FIG. 21C are cross-sectional views of the transistor 500. Here, FIG. 21B is a cross-sectional view of a portion indicated by the dashed-dotted line A1-A2 in FIG. 21A and is a cross-sectional view of the transistor 500 in the channel length direction. FIG. 21C is a cross-sectional view of a portion indicated by the dashed-dotted line A3-A4 in FIG. 21A and is a cross-sectional view of the transistor 500 in the channel width direction. Note that some components are omitted in the top view of FIG. 21A for clarity of the drawing.

As illustrated in FIG. 21A to FIG. 21C, the transistor 500 includes a metal oxide 531a placed over a substrate (not illustrated); a metal oxide 531b placed over the metal oxide 531a; a conductive layer 542a and a conductive layer 542b that are placed apart from each other over the metal oxide 531b; the insulating layer 580 that is placed over the conductive layer 542a and the conductive layer 542b and has an opening between the conductive layer 542a and the conductive layer 542b; a conductive layer 560 placed in the opening; an insulating layer 550 placed between the conductive layer 560 and each of the metal oxide 531b, the conductive layer 542a, the conductive layer 542b, and the insulating layer 580; and a metal oxide 531c placed between the insulating layer 550 and each of the metal oxide 531b, the conductive layer 542a, the conductive layer 542b, and the insulating layer 580. Here, as illustrated in FIG. 21B and FIG. 21C, preferably, the top surface of the conductive layer 560 is substantially aligned with the top surfaces of the insulating layer 550, the metal oxide 531c, and the insulating layer 580. Hereinafter, the metal oxide 531a, the metal oxide 531b, and the metal oxide 531c may be collectively referred to as a metal oxide 531. The conductive layer 542a and the conductive layer 542b may be collectively referred to as a conductive layer 542.

In the transistor 500 illustrated in FIG. 21B and FIG. 21C, side surfaces of the conductive layer 542a and the conductive layer 542b on the conductive layer 560 side are substantially perpendicular. Note that the transistor 500 illustrated in FIG. 21B and FIG. 21C is not limited thereto, and the angle formed between the side surfaces and the bottom surfaces of the conductive layer 542a and the conductive layer 542b may be greater than or equal to 10° and less than or equal to 80°, preferably greater than or equal to 30° and less than or equal to 60°. The side surfaces of the conductive layer 542a and the conductive layer 542b that face each other may have a plurality of surfaces.

As illustrated in FIG. 21B and FIG. 21C, the insulating layer 554 is preferably placed between the insulating layer 580 and each of an insulating layer 524, the metal oxide 531a, the metal oxide 531b, the conductive layer 542a, and the conductive layer 542b. Here, as illustrated in FIG. 21B and FIG. 21C, the insulating layer 554 is preferably in contact with the side surface of the metal oxide 531c, the top surface and the side surface of the conductive layer 542a, the top surface and the side surface of the conductive layer 542b, the side surfaces of the metal oxide 531a and the metal oxide 531b, and the top surface of the insulating layer 524.

In the transistor 500, three layers of the metal oxide 531a, the metal oxide 531b, and the metal oxide 531c are stacked in and the vicinity of the channel formation region; however, the present invention is not limited thereto. For example, a two-layer structure of the metal oxide 531b and the metal oxide 531c or a stacked-layer structure of four or more layers may be employed. Although the conductive layer 560 is illustrated to have a stacked-layer structure of two layers in the transistor 500, the present invention is not limited thereto. For example, the conductive layer 560 may have a single-layer structure or a stacked-layer structure of three or more layers. Furthermore, each of the metal oxide 531a, the metal oxide 531b, and the metal oxide 531c may have a stacked-layer structure of two or more layers.

For example, in the case where the metal oxide 531c has a stacked-layer structure including a first metal oxide and a second metal oxide over the first metal oxide, the first metal oxide preferably has a composition similar to that of the metal oxide 531b and the second metal oxide preferably has a composition similar to that of the metal oxide 531a.

Here, the conductive layer 560 functions as a gate electrode of the transistor, and the conductive layer 542a and the conductive layer 542b each function as a source electrode or a drain electrode. As described above, the conductive layer 560 is formed to be embedded in the opening of the insulating layer 580 and the region interposed between the conductive layer 542a and the conductive layer 542b. Here, the positions of the conductive layer 560, the conductive layer 542a, and the conductive layer 542b are selected in a self-aligned manner with respect to the opening of the insulating layer 580. In other words, in the transistor 500, the gate electrode can be placed between the source electrode and the drain electrode in a self-aligned manner. Thus, the conductive layer 560 can be formed without an alignment margin, resulting in a reduction in the area occupied by the transistor 500. Accordingly, the display apparatus can have higher resolution. In addition, the display apparatus can have a narrow bezel.

As illustrated in FIG. 21B and FIG. 21C, the conductive layer 560 preferably includes a conductive layer 560a provided on the inner side of the insulating layer 550 and a conductive layer 560b provided to be embedded on the inner side of the conductive layer 560a.

The transistor 500 preferably includes an insulating layer 514 placed over the substrate (not illustrated); an insulating layer 516 placed over the insulating layer 514; a conductive layer 505 placed to be embedded in the insulating layer 516; an insulating layer 522 placed over the insulating layer 516 and the conductive layer 505; and the insulating layer 524 placed over the insulating layer 522. The metal oxide 531a is preferably placed over the insulating layer 524.

An insulating layer 574 and the insulating layer 581 functioning as interlayer films are preferably placed over the transistor 500. Here, the insulating layer 574 is preferably placed in contact with the top surfaces of the conductive layer 560, the insulating layer 550, the metal oxide 531c, and the insulating layer 580.

The insulating layer 522, the insulating layer 554, and the insulating layer 574 preferably have a function of inhibiting diffusion of hydrogen (e.g., at least one of a hydrogen atom and a hydrogen molecule). For example, the insulating layer 522, the insulating layer 554, and the insulating layer 574 preferably have a lower hydrogen permeability than the insulating layer 524, the insulating layer 550, and the insulating layer 580. Moreover, the insulating layer 522 and the insulating layer 554 preferably have a function of inhibiting diffusion of oxygen (e.g., at least one of an oxygen atom and an oxygen molecule). For example, the insulating layer 522 and the insulating layer 554 preferably have a lower oxygen permeability than the insulating layer 524, the insulating layer 550, and the insulating layer 580.

Here, the insulating layer 524, the metal oxide 531, and the insulating layer 550 are separated from the insulating layer 580 and the insulating layer 581 by the insulating layer 554 and the insulating layer 574. This can inhibit entry of impurities such as hydrogen and excess oxygen contained in the insulating layer 580 and the insulating layer 581 into the insulating layer 524, the metal oxide 531, and the insulating layer 550.

A conductive layer 545 (a conductive layer 545a and a conductive layer 545b) that is electrically connected to the transistor 500 and functions as a plug is preferably provided. Note that an insulating layer 541 (an insulating layer 541a and an insulating layer 541b) is provided in contact with the side surface of the conductive layer 545 functioning as a plug. In other words, the insulating layer 541 is provided in contact with the inner wall of an opening in the insulating layer 554, the insulating layer 580, the insulating layer 574, and the insulating layer 581. In addition, a structure may be employed in which a first conductive layer of the conductive layer 545 is provided in contact with the side surface of the insulating layer 541 and a second conductive layer of the conductive layer 545 is provided on the inner side of the first conductive layer. Here, the top surface of the conductive layer 545 and the top surface of the insulating layer 581 can be substantially level with each other. Although the transistor 500 has a structure in which the first conductive layer of the conductive layer 545 and the second conductive layer of the conductive layer 545 are stacked, the present invention is not limited thereto. For example, the conductive layer 545 may have a single-layer structure or a stacked-layer structure of three or more layers. In the case where a component has a stacked-layer structure, layers may be distinguished by ordinal numbers corresponding to the formation order.

In the transistor 500, a metal oxide functioning as an oxide semiconductor is preferably used as the metal oxide 531 including the channel formation region (the metal oxide 531*a*, the metal oxide 531*b*, and the metal oxide 531*c*). For example, it is preferable to use a metal oxide having a band gap of 2 eV or more, preferably 2.5 eV or more as the metal oxide to be the channel formation region of the metal oxide 531.

The metal oxide preferably contains at least indium (In) or zinc (Zn). In particular, indium (In) and zinc (Zn) are preferably contained. In addition to them, an element M is preferably contained. As the element M, one or more of aluminum (Al), gallium (Ga), yttrium (Y), tin (Sn), boron (B), titanium (Ti), iron (Fe), nickel (Ni), germanium (Ge), zirconium (Zr), molybdenum (Mo), lanthanum (La), cerium (Ce), neodymium (Nd), hafnium (Hf), tantalum (Ta), tungsten (W), magnesium (Mg), and cobalt (Co) can be used. In particular, the element M is preferably one or more of aluminum (Al), gallium (Ga), yttrium (Y), and tin (Sn). Furthermore, the element M preferably contains one or both of Ga and Sn.

As illustrated in FIG. 21B, the metal oxide 531*b* in a region that is not overlapped by the conductive layer 542 sometimes has a smaller thickness than the metal oxide 531*b* in a region that is overlapped by the conductive layer 542. The thin region is formed when part of the top surface of the metal oxide 531*b* is removed at the time of forming the conductive layer 542*a* and the conductive layer 542*b*. When a conductive film to be the conductive layer 542 is formed, a low-resistance region is sometimes formed on the top surface of the metal oxide 531*b* in the vicinity of the interface with the conductive film. Removing the low-resistance region positioned between the conductive layer 542*a* and the conductive layer 542*b* on the top surface of the metal oxide 531*b* in the above manner can prevent formation of the channel in the region.

According to one embodiment of the present invention, a display apparatus that includes small-size transistors and has high resolution can be provided. A display apparatus that includes a transistor with a high on-state current and has high luminance can be provided. A display apparatus that includes a transistor operating at high speed and thus operates at high speed can be provided. A display apparatus that includes a transistor having stable electrical characteristics and is highly reliable can be provided. A display apparatus that includes a transistor with a low off-state current and has low power consumption can be provided.

The structure of the transistor 500 that can be used in the moving object of one embodiment of the present invention is described in detail.

The conductive layer 505 is placed to include a region overlapping with the metal oxide 531 and the conductive layer 560. Furthermore, the conductive layer 505 is preferably provided to be embedded in the insulating layer 516.

The conductive layer 505 includes a conductive layer 505*a*, a conductive layer 505*b*, and a conductive layer 505*c*. The conductive layer 505*a* is provided in contact with the bottom surface and a side wall of the opening provided in the insulating layer 516. The conductive layer 505*b* is provided to be embedded in a recessed portion formed by the conductive layer 505*a*. Here, the top surface of the conductive layer 505*b* is lower in level than the top surface of the conductive layer 505*a* and the top surface of the insulating layer 516. The conductive layer 505*c* is provided in contact with the top surface of the conductive layer 505*b* and the side surface of the conductive layer 505*a*. Here, the top surface of the conductive layer 505*c* is substantially level with the top surface of the conductive layer 505*a* and the top surface of the insulating layer 516. That is, the conductive layer 505*b* is surrounded by the conductive layer 505*a* and the conductive layer 505*c*.

Here, for the conductive layer 505*a* and the conductive layer 505*c*, it is preferable to use a conductive material having a function of inhibiting diffusion of impurities such as a hydrogen atom, a hydrogen molecule, a water molecule, a nitrogen atom, a nitrogen molecule, a nitrogen oxide molecule ($N_2O$, NO, $NO_2$, or the like), and a copper atom. Alternatively, it is preferable to use a conductive material having a function of inhibiting diffusion of oxygen (e.g., at least one of an oxygen atom and an oxygen molecule).

When the conductive layer 505*a* and the conductive layer 505*c* are formed using a conductive material having a function of inhibiting diffusion of hydrogen, impurities such as hydrogen contained in the conductive layer 505*b* can be inhibited from diffusing into the metal oxide 531 through the insulating layer 524 and the like. When the conductive layer 505*a* and the conductive layer 505*c* are formed using a conductive material having a function of inhibiting diffusion of oxygen, the conductivity of the conductive layer 505*b* can be inhibited from being lowered because of oxidation. As the conductive material having a function of inhibiting diffusion of oxygen, for example, titanium, titanium nitride, tantalum, tantalum nitride, ruthenium, ruthenium oxide, or the like is preferably used. Thus, the conductive layer 505*a* is a single layer or stacked layers of the above conductive materials. For example, titanium nitride is used for the conductive layer 505*a*.

For the conductive layer 505*b*, a conductive material containing tungsten, copper, or aluminum as its main component is preferably used. For example, tungsten is used for the conductive layer 505*b*.

The conductive layer 560 sometimes functions as a first gate (also referred to as top gate) electrode. The conductive layer 505 sometimes functions as a second gate (also referred to as bottom gate) electrode. In that case, by changing a potential applied to the conductive layer 505 not in synchronization with but independently of a potential applied to the conductive layer 560, $V_{th}$ of the transistor 500 can be controlled. In particular, by applying a negative potential to the conductive layer 505, $V_{th}$ of the transistor 500 can be higher than 0 V and the off-state current can be made low. Thus, a drain current at the time when a potential applied to the conductive layer 560 is 0 V can be lower in the case where a negative potential is applied to the conductive layer 505 than in the case where the negative potential is not applied to the conductive layer 505.

The conductive layer 505 is preferably provided to be larger than the channel formation region in the metal oxide 531. In particular, it is preferable that the conductive layer 505 extend beyond an end portion of the metal oxide 531 that intersects with the channel width direction, as illustrated in FIG. 21C. In other words, the conductive layer 505 and the conductive layer 560 preferably overlap with each other with the insulating layer placed therebetween, in a region outside the side surface of the metal oxide 531 in the channel width direction.

With the above structure, the channel formation region of the metal oxide 531 can be electrically surrounded by electric fields of the conductive layer 560 having a function of the first gate electrode and electric fields of the conductive layer 505 having a function of the second gate electrode.

Furthermore, as illustrated in FIG. 21C, the conductive layer 505 extends to function as a wiring as well. However, without limitation to this structure, a structure in which a conductive layer functioning as a wiring is provided below the conductive layer 505 may be employed.

The insulating layer 514 preferably functions as a barrier insulating film that inhibits the entry of impurities such as water or hydrogen to the transistor 500 from the substrate side. Accordingly, it is preferable to use, for the insulating layer 514, an insulating material having a function of inhibiting diffusion of impurities such as a hydrogen atom, a hydrogen molecule, a water molecule, a nitrogen atom, a nitrogen molecule, a nitrogen oxide molecule (e.g., $N_2O$, NO, and $NO_2$), and a copper atom (an insulating material through which the impurities are less likely to pass). Alternatively, it is preferable to use an insulating material having a function of inhibiting diffusion of oxygen (e.g., at least one of an oxygen atom and an oxygen molecule) (an insulating material through which the oxygen is less likely to pass).

For example, aluminum oxide or silicon nitride is preferably used for the insulating layer 514. Accordingly, it is possible to inhibit diffusion of impurities such as water or hydrogen to the transistor 500 side from the substrate side through the insulating layer 514. Alternatively, it is possible to inhibit diffusion of oxygen contained in the insulating layer 524 and the like to the substrate side through the insulating layer 514.

The permittivity of each of the insulating layer 516, the insulating layer 580, and the insulating layer 581 functioning as an interlayer film is preferably lower than that of the insulating layer 514. When a material with a low permittivity is used for an interlayer film, the parasitic capacitance generated between wirings can be reduced. For the insulating layer 516, the insulating layer 580, and the insulating layer 581, for example, silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, or the like can be used as appropriate.

The insulating layer 522 and the insulating layer 524 have a function of a gate insulating layer.

Here, the insulating layer 524 in contact with the metal oxide 531 preferably releases oxygen by heating. In this specification, oxygen that is released by heating is referred to as excess oxygen in some cases. For example, silicon oxide, silicon oxynitride, or the like can be used as appropriate for the insulating layer 524. When an insulating layer containing oxygen is provided in contact with the metal oxide 531, oxygen vacancies in the metal oxide 531 can be reduced, leading to improved reliability of the transistor 500.

Specifically, an oxide material that releases part of oxygen by heating is preferably used for the insulating layer 524. An oxide that releases oxygen by heating is an oxide film in which the amount of released oxygen converted into oxygen atoms is greater than or equal to $1.0 \times 10^{18}$ atoms/cm³, preferably greater than or equal to $1.0 \times 10^{19}$ atoms/cm³, further preferably greater than or equal to $2.0 \times 10^{19}$ atoms/cm³, or greater than or equal to $3.0 \times 10^{20}$ atoms/cm³ in TDS (Thermal Desorption Spectroscopy) analysis. Note that the temperature of the film surface in the TDS analysis is preferably in the range of 100° C. to 700° C., inclusive or 100° C. to 400° C., inclusive.

As illustrated in FIG. 21C, the insulating layer 524 is sometimes thinner in a region that is overlapped by neither the insulating layer 554 nor the metal oxide 531b than in the other regions. In the insulating layer 524, the region that is overlapped by neither the insulating layer 554 nor the metal oxide 531b preferably has a thickness with which the above oxygen can be adequately diffused.

Like the insulating layer 514 and the like, the insulating layer 522 preferably functions as a barrier insulating film that inhibits the entry of impurities such as water or hydrogen into the transistor 500 from the substrate side. For example, the insulating layer 522 preferably has a lower hydrogen permeability than the insulating layer 524. When the insulating layer 524, the metal oxide 531, the insulating layer 550, and the like are surrounded by the insulating layer 522, the insulating layer 554, and the insulating layer 574, the entry of impurities such as water or hydrogen into the transistor 500 from outside can be inhibited.

Furthermore, it is preferable that the insulating layer 522 have a function of inhibiting diffusion of oxygen (e.g., at least one of an oxygen atom and an oxygen molecule) (it is preferable that the oxygen be less likely to pass through the insulating layer 522). For example, the insulating layer 522 preferably has a lower oxygen permeability than the insulating layer 524. The insulating layer 522 preferably has a function of inhibiting diffusion of oxygen and impurities, in which case oxygen contained in the metal oxide 531 is less likely to diffuse to the substrate side. Moreover, the conductive layer 505 can be inhibited from reacting with oxygen contained in the insulating layer 524 or the metal oxide 531.

As the insulating layer 522, an insulating layer containing an oxide of one or both of aluminum and hafnium, which is an insulating material, is preferably used. As the insulating layer containing an oxide of one or both of aluminum and hafnium, aluminum oxide, hafnium oxide, an oxide containing aluminum and hafnium (hafnium aluminate), or the like is preferably used. In the case where the insulating layer 522 is formed using such a material, the insulating layer 522 functions as a layer inhibiting release of oxygen from the metal oxide 531 and entry of impurities such as hydrogen into the metal oxide 531 from the periphery of the transistor 500.

Alternatively, aluminum oxide, bismuth oxide, germanium oxide, niobium oxide, silicon oxide, titanium oxide, tungsten oxide, yttrium oxide, or zirconium oxide may be added to these insulating layers, for example. Alternatively, these insulating layers may be subjected to nitriding treatment. Silicon oxide, silicon oxynitride, or silicon nitride may be stacked over the above insulating layer.

The insulating layer 522 may be a single layer or a stacked layer using an insulating layer containing a so-called high-k material, such as aluminum oxide, hafnium oxide, tantalum oxide, zirconium oxide, lead zirconate titanate (PZT), strontium titanate ($SrTiO_3$), or (Ba,Sr) $TiO_3$ (BST). With further miniaturization and higher integration of a transistor, a problem such as generation of leakage current may arise because of a thinned gate insulating layer. When a high-k material is used for the insulating layer functioning as a gate insulating layer, a gate potential at the time of operation of the transistor can be reduced while the physical thickness is maintained.

Note that the insulating layer 522 and the insulating layer 524 may each have a stacked-layer structure of two or more layers. In that case, without limitation to a stacked-layer structure formed of the same material, a stacked-layer structure formed of different materials may be employed. For example, an insulating layer similar to the insulating layer 524 may be provided below the insulating layer 522.

The metal oxide 531 includes the metal oxide 531a, the metal oxide 531b over the metal oxide 531a, and the metal oxide 531c over the metal oxide 531b. When the metal oxide 531 includes the metal oxide 531a under the metal oxide 531b, it is possible to inhibit diffusion of impurities into the metal oxide 531b from the components formed below the metal oxide 531a. Moreover, when the metal oxide 531 includes the metal oxide 531c over the metal oxide 531b, it is possible to inhibit diffusion of impurities into the metal oxide 531b from the components formed above the metal oxide 531c.

Note that the metal oxide 531 preferably has a stacked-layer structure of a plurality of oxide layers that differ in the atomic ratio of metal atoms. For example, in the case where the metal oxide 531 contains at least indium (In) and the element M, the proportion of the number of atoms of the element M contained in the metal oxide 531a to the number of atoms of all elements that constitute the metal oxide 531a is preferably higher than the proportion of the number of atoms of the element M contained in the metal oxide 531b to the number of atoms of all elements that constitute the metal oxide 531b. In addition, the atomic ratio of the element M to In in the metal oxide 531a is preferably greater than the atomic ratio of the element M to In in the metal oxide 531b. Here, a metal oxide that can be used as the metal oxide 531a or the metal oxide 531b can be used as the metal oxide 531c.

The energy of the conduction band minimum of each of the metal oxide 531a and the metal oxide 531c is preferably higher than the energy of the conduction band minimum of the metal oxide 531b. In other words, the electron affinity of each of the metal oxide 531a and the metal oxide 531c is preferably smaller than the electron affinity of the metal oxide 531b. In this case, a metal oxide that can be used as the metal oxide 531a is preferably used as the metal oxide 531c. Specifically, the proportion of the number of atoms of the element M contained in the metal oxide 531c to the number of atoms of all elements that constitute the metal oxide 531c is preferably higher than the proportion of the number of atoms of the element M contained in the metal oxide 531b to the number of atoms of all elements that constitute the metal oxide 531b. In addition, the atomic ratio of the element M to In in the metal oxide 531c is preferably greater than the atomic ratio of the element M to In in the metal oxide 531b.

Here, the energy level of the conduction band minimum gently changes at junction portions between the metal oxide 531a, the metal oxide 531b, and the metal oxide 531c. In other words, at junction portions between the metal oxide 531a, the metal oxide 531b, and the metal oxide 531c, the energy level of the conduction band minimum continuously changes or the energy levels are continuously connected. This can be achieved by decreasing the density of defect states in a mixed layer formed at the interface between the metal oxide 531a and the metal oxide 531b and the interface between the metal oxide 531b and the metal oxide 531c.

Specifically, when the metal oxide 531a and the metal oxide 531b or the metal oxide 531b and the metal oxide 531c contain the same element (as a main component) in addition to oxygen, a mixed layer with a low density of defect states can be formed. For example, an In—Ga—Zn oxide, a Ga—Zn oxide, gallium oxide, or the like may be used as the metal oxide 531a and the metal oxide 531c, in the case where the metal oxide 531b is an In—Ga—Zn oxide. The metal oxide 531c may have a stacked-layer structure. For example, a stacked-layer structure of an In—Ga—Zn oxide and a Ga—Zn oxide over the In—Ga—Zn oxide or a stacked-layer structure of an In—Ga—Zn oxide and gallium oxide over the In—Ga—Zn oxide can be employed. In other words, the metal oxide 531c may have a stacked-layer structure of an In—Ga—Zn oxide and an oxide that does not contain In.

Specifically, as the metal oxide 531a, a metal oxide with In:Ga:Zn=1:3:4 [atomic ratio] or 1:1:0.5 [atomic ratio] can be used. As the metal oxide 531b, a metal oxide with In:Ga:Zn=4:2:3 [atomic ratio] or 3:1:2 [atomic ratio] can be used. As the metal oxide 531c, a metal oxide with In:Ga:Zn=1:3:4 [atomic ratio], In:Ga:Zn=4:2:3 [atomic ratio], Ga:Zn=2:1 [atomic ratio], or Ga:Zn=2:5 [atomic ratio] can be used. Specific examples of a stacked-layer structure of the metal oxide 531c include a stacked-layer structure of a layer with In:Ga:Zn=4:2:3 [atomic ratio] and a layer with Ga:Zn=2:1 [atomic ratio], a stacked-layer structure of a layer with In:Ga:Zn=4:2:3 [atomic ratio] and a layer with Ga:Zn=2:5 [atomic ratio], and a stacked-layer structure of a layer with In:Ga:Zn=4:2:3 [atomic ratio] and a layer of gallium oxide.

At this time, the metal oxide 531b serves as a main carrier path. When the metal oxide 531a and the metal oxide 531c have the above structure, the density of defect states at the interface between the metal oxide 531a and the metal oxide 531b and the interface between the metal oxide 531b and the metal oxide 531c can be made low. This reduces the influence of interface scattering on carrier conduction, and the transistor 500 can have a high on-state current and high frequency characteristics. Note that in the case where the metal oxide 531c has a stacked-layer structure, not only the effect of reducing the density of defect states at the interface between the metal oxide 531b and the metal oxide 531c, but also the effect of inhibiting diffusion of the constituent element contained in the metal oxide 531c to the insulating layer 550 side can be expected. Specifically, the metal oxide 531c has a stacked-layer structure in which an oxide not containing In is positioned in the upper layer of the stacked-layer structure, whereby the diffusion of In to the insulating layer 550 side can be inhibited. Since the insulating layer 550 functions as a gate insulating layer, the transistor has defects in characteristics when In diffuses. Thus, the metal oxide 531c having a stacked-layer structure allows a highly reliable moving object to be provided.

The conductive layer 542 (the conductive layer 542a and the conductive layer 542b) functioning as the source electrode and the drain electrode is provided over the metal oxide 531b. For the conductive layer 542, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, and lanthanum; an alloy containing any of the above metal elements; an alloy containing a combination of the above metal elements; or the like. For example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. Tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that maintain their conductivity even after absorbing oxygen.

When the conductive layer 542 is provided in contact with the metal oxide 531, the oxygen concentration of the metal oxide 531 in the vicinity of the conductive layer 542 sometimes decreases. In addition, a metal compound layer that contains the metal contained in the conductive layer 542 and the component of the metal oxide 531 is sometimes formed in the metal oxide 531 in the vicinity of the conductive layer 542. In such cases, the carrier density of the region in the metal oxide 531 in the vicinity of the conductive layer 542 increases, and the region becomes a low-resistance region.

Here, the region between the conductive layer 542a and the conductive layer 542b is formed to be overlapped by the opening of the insulating layer 580. Accordingly, the conductive layer 560 can be placed in a self-aligned manner between the conductive layer 542a and the conductive layer 542b.

The insulating layer 550 functions as a gate insulating layer. The insulating layer 550 is preferably placed in contact with the top surface of the metal oxide 531c. For the insulating layer 550, silicon oxide, silicon oxynitride, silicon nitride oxide, silicon nitride, silicon oxide to which fluorine is added, silicon oxide to which carbon is added, silicon oxide to which carbon and nitrogen are added, or porous silicon oxide can be used. In particular, silicon oxide and silicon oxynitride, which are thermally stable, are preferable.

As in the insulating layer 524, the concentration of impurities such as water or hydrogen in the insulating layer 550 is preferably reduced. The thickness of the insulating layer 550 is preferably greater than or equal to 1 nm and less than or equal to 20 nm.

A metal oxide may be provided between the insulating layer 550 and the conductive layer 560. The metal oxide preferably inhibits oxygen diffusion from the insulating layer 550 into the conductive layer 560. Accordingly, oxidation of the conductive layer 560 due to oxygen in the insulating layer 550 can be inhibited.

The metal oxide functions as part of the gate insulating layer in some cases. Therefore, when silicon oxide, silicon oxynitride, or the like is used for the insulating layer 550, a metal oxide that is a high-k material with a high dielectric constant is preferably used as the metal oxide. When the gate insulating layer has a stacked-layer structure of the insulating layer 550 and the metal oxide, the stacked-layer structure can be thermally stable and have a high dielectric constant. Accordingly, a gate potential applied during operation of the transistor can be reduced while the physical thickness of the gate insulating layer is maintained. In addition, the equivalent oxide thickness (EOT) of the insulating layer functioning as the gate insulating layer can be reduced.

Specifically, a metal oxide containing one kind or two or more kinds selected from hafnium, aluminum, gallium, yttrium, zirconium, tungsten, titanium, tantalum, nickel, germanium, magnesium, and the like can be used. It is particularly preferable to use an insulating layer containing an oxide of one or both of aluminum and hafnium, such as aluminum oxide, hafnium oxide, or an oxide containing aluminum and hafnium (hafnium aluminate).

Although the conductive layer 560 is illustrated to have a two-layer structure in FIG. 21B and FIG. 21C, the conductive layer 560 may have a single-layer structure or a stacked-layer structure of three or more layers.

The conductive layer 560a is preferably formed using the aforementioned conductive layer having a function of inhibiting diffusion of impurities such as a hydrogen atom, a hydrogen molecule, a water molecule, a nitrogen atom, a nitrogen molecule, a nitrogen oxide molecule (e.g., $N_2O$, NO, and $NO_2$), and a copper atom. Alternatively, it is preferable to use a conductive material having a function of inhibiting diffusion of oxygen (e.g., at least one of an oxygen atom and an oxygen molecule).

When the conductive layer 560a has a function of inhibiting diffusion of oxygen, the conductivity of the conductive layer 560b can be inhibited from being lowered by oxidation due to oxygen contained in the insulating layer 550. As a conductive material having a function of inhibiting oxygen diffusion, for example, tantalum, tantalum nitride, ruthenium, ruthenium oxide, or the like is preferably used.

Moreover, a conductive material containing tungsten, copper, or aluminum as its main component is preferably used for the conductive layer 560b. The conductive layer 560 also functions as a wiring and thus is preferably formed using a conductive layer having high conductivity. For example, a conductive material containing tungsten, copper, or aluminum as its main component can be used. The conductive layer 560b may have a stacked-layer structure, for example, a stacked-layer structure of titanium or titanium nitride and the above conductive material.

As illustrated in FIG. 21A and FIG. 21C, the side surface of the metal oxide 531 is covered with the conductive layer 560 in a region where the metal oxide 531b is not overlapped by the conductive layer 542, that is, the channel formation region of the metal oxide 531. Accordingly, electric fields of the conductive layer 560 having a function of the first gate electrode are likely to act on the side surface of the metal oxide 531. Thus, the on-state current of the transistor 500 can be increased and the frequency characteristics can be improved.

The insulating layer 554, like the insulating layer 514 and the like, preferably functions as a barrier insulating film that inhibits the entry of impurities such as water or hydrogen into the transistor 500 from the insulating layer 580 side. The insulating layer 554 preferably has a lower hydrogen permeability than the insulating layer 524, for example. Furthermore, as illustrated in FIG. 21B and FIG. 21C, the insulating layer 554 is preferably in contact with the side surface of the metal oxide 531c, the top and side surfaces of the conductive layer 542a, the top and side surfaces of the conductive layer 542b, side surfaces of the metal oxide 531a and the metal oxide 531b, and the top surface of the insulating layer 524. Such a structure can inhibit the entry of hydrogen contained in the insulating layer 580 into the metal oxide 531 through the top surfaces or side surfaces of the conductive layer 542a, the conductive layer 542b, the metal oxide 531a, the metal oxide 531b, and the insulating layer 524.

Furthermore, it is preferable that the insulating layer 554 have a function of inhibiting diffusion of oxygen (e.g., at least one of an oxygen atom and an oxygen molecule) (it is preferable that the oxygen be less likely to pass through the insulating layer 554). For example, the insulating layer 554 preferably has a lower oxygen permeability than the insulating layer 580 or the insulating layer 524.

The insulating layer 554 is preferably formed by a sputtering method. When the insulating layer 554 is formed by a sputtering method in an oxygen-containing atmosphere, oxygen can be added to the vicinity of a region of the insulating layer 524 that is in contact with the insulating layer 554. Thus, oxygen can be supplied from the region to the metal oxide 531 through the insulating layer 524. Here, with the insulating layer 554 having a function of inhibiting upward diffusion of oxygen, oxygen can be prevented from diffusing from the metal oxide 531 into the insulating layer 580. Moreover, with the insulating layer 522 having a function of inhibiting downward diffusion of oxygen, oxygen diffusion from the metal oxide 531 to the substrate side can be prevented. In the above manner, oxygen is supplied to the channel formation region of the metal oxide 531. Accordingly, oxygen vacancies in the metal oxide 531 can be reduced, so that the transistor can be prevented from having normally-on characteristics.

As the insulating layer 554, an insulating layer containing an oxide of one or both of aluminum and hafnium is preferably formed, for example. Note that as the insulating layer containing an oxide of one or both of aluminum and hafnium, aluminum oxide, hafnium oxide, an oxide containing aluminum and hafnium (hafnium aluminate), or the like is preferably used.

The insulating layer 524, the insulating layer 550, and the metal oxide 531 are covered with the insulating layer 554 having a barrier property against hydrogen, whereby the insulating layer 580 is isolated from the insulating layer 524, the metal oxide 531, and the insulating layer 550 by the insulating layer 554. This can inhibit the entry of impurities such as hydrogen from outside of the transistor 500, resulting in favorable electrical characteristics and high reliability of the transistor 500.

The insulating layer 580 is provided over the insulating layer 524, the metal oxide 531, and the conductive layer 542 with the insulating layer 554 therebetween. The insulating layer 580 preferably includes, for example, silicon oxide, silicon oxynitride, silicon nitride oxide, silicon oxide to which fluorine is added, silicon oxide to which carbon is added, silicon oxide to which carbon and nitrogen are added, or porous silicon oxide. In particular, silicon oxide and silicon oxynitride are preferable because they are thermally stable. In particular, materials such as silicon oxide, silicon oxynitride, and porous silicon oxide are preferably used, in which case a region containing oxygen to be released by heating can be easily formed.

The concentration of impurities such as water or hydrogen in the insulating layer 580 is preferably reduced. In addition, the top surface of the insulating layer 580 may be planarized.

Like the insulating layer 514 and the like, the insulating layer 574 preferably functions as a barrier insulating film that inhibits the entry of impurities such as water or hydrogen into the insulating layer 580 from the above. As the insulating layer 574, for example, the insulating layer that can be used as the insulating layer 514, the insulating layer 554, and the like can be used.

The insulating layer 581 functioning as an interlayer film is preferably provided over the insulating layer 574. As in the insulating layer 524 or the like, the concentration of impurities such as water or hydrogen in the insulating layer 581 is preferably reduced.

The conductive layer 545a and the conductive layer 545b are placed in openings formed in the insulating layer 581, the insulating layer 574, the insulating layer 580, and the insulating layer 554. The conductive layer 545a and the conductive layer 545b are placed to face each other with the conductive layer 560 interposed therebetween. Note that the top surfaces of the conductive layer 545a and the conductive layer 545b may be on the same plane as the top surface of the insulating layer 581.

The insulating layer 541a is provided in contact with the inner wall of the opening in the insulating layer 581, the insulating layer 574, the insulating layer 580, and the insulating layer 554, and the first conductive layer of the conductive layer 545a is formed in contact with the side surface of the insulating layer 541a. The conductive layer 542a is positioned on at least part of the bottom portion of the opening, and the conductive layer 545a is in contact with the conductive layer 542a. Similarly, the insulating layer 541b is provided in contact with the inner wall of the opening in the insulating layer 581, the insulating layer 574, the insulating layer 580, and the insulating layer 554, and the first conductive layer of the conductive layer 545b is formed in contact with the side surface of the insulating layer 541b. The conductive layer 542b is positioned on at least part of the bottom portion of the opening, and the conductive layer 545b is in contact with the conductive layer 542b.

The conductive layer 545a and the conductive layer 545b are preferably formed using a conductive material containing tungsten, copper, or aluminum as its main component. The conductive layer 545a and the conductive layer 545b may have a stacked-layer structure.

In the case where the conductive layer 545 has a stacked-layer structure, the aforementioned conductive layer having a function of inhibiting diffusion of impurities such as water or hydrogen is preferably used as the conductive layer in contact with the metal oxide 531a, the metal oxide 531b, the conductive layer 542, the insulating layer 554, the insulating layer 580, the insulating layer 574, and the insulating layer 581. For example, tantalum, tantalum nitride, titanium, titanium nitride, ruthenium, ruthenium oxide, or the like is preferably used. The conductive material having a function of inhibiting diffusion of impurities such as water or hydrogen can be used as a single layer or stacked layers. The use of the conductive material can inhibit oxygen added to the insulating layer 580 from being absorbed by the conductive layer 545a and the conductive layer 545b. Moreover, impurities such as water or hydrogen can be inhibited from entering the metal oxide 531 through the conductive layer 545a and the conductive layer 545b from a layer above the insulating layer 581.

As the insulating layer 541a and the insulating layer 541b, for example, the insulating layer that can be used as the insulating layer 554 or the like can be used. Since the insulating layer 541a and the insulating layer 541b are provided in contact with the insulating layer 554, impurities such as water or hydrogen in the insulating layer 580 or the like can be inhibited from entering the metal oxide 531 through the conductive layer 545a and the conductive layer 545b. Furthermore, oxygen contained in the insulating layer 580 can be inhibited from being absorbed by the conductive layer 545a and the conductive layer 545b.

Although not illustrated, a conductive layer functioning as a wiring may be placed in contact with the top surface of the conductive layer 545a and the top surface of the conductive layer 545b. For the conductive layer functioning as a wiring, a conductive material containing tungsten, copper, or aluminum as its main component is preferably used. Furthermore, the conductive layer may have a stacked-layer structure and may be a stack of titanium or a titanium nitride and the above conductive material, for example. Note that the conductive layer may be formed to be embedded in an opening provided in an insulating layer.

<Materials for Transistor>

Materials that can be used for the transistor will be described.

[Substrate]

As a substrate where the transistor 500 is formed, an insulating layer substrate, a semiconductor substrate, or a conductive layer substrate can be used, for example. Examples of the insulating layer substrate include a glass substrate, a quartz substrate, a sapphire substrate, a stabilized zirconia substrate (e.g., an yttria-stabilized zirconia substrate), and a resin substrate. Examples of the semiconductor substrate include a semiconductor substrate of silicon, germanium, or the like and a compound semiconductor substrate of silicon carbide, silicon germanium, gallium arsenide, indium phosphide, zinc oxide, or gallium oxide. Another example is a semiconductor substrate in which an insulating layer region is included in the semiconductor substrate, e.g., an SOI (Silicon On Insulator) substrate. Examples of the conductive layer substrate include a graphite substrate, a metal substrate, an alloy substrate, and a conductive resin substrate. Other examples include a substrate including a metal nitride and a substrate including a metal oxide. Other examples include an insulator substrate provided with a conductive layer or a semiconductor layer, a semiconductor substrate provided with a conductive layer or an insulating layer, and a conductor substrate provided with a semiconductor or an insulating layer. Alternatively, these substrates provided with elements may be used. Examples of the elements provided for the substrates include a capacitor, a resistor, a switching element, a light-emitting element, and a memory element.

[Insulating Layer]

Examples of an insulating layer include an oxide, a nitride, an oxynitride, a nitride oxide, a metal oxide, a metal oxynitride, and a metal nitride oxide, each of which has an insulating property.

With further miniaturization and higher integration of a transistor, for example, a problem such as generation of leakage current may arise because of a thinned gate insulating layer. When a high-k material is used for the insulating layer functioning as a gate insulating layer, the voltage at the time of operation of the transistor can be reduced while the physical thickness is maintained. By contrast, when a material with a low dielectric constant is used for the insulating layer functioning as an interlayer film, parasitic capacitance generated between wirings can be reduced. Thus, a material is preferably selected depending on the function of an insulating layer.

Examples of the insulating layer having a high dielectric constant include gallium oxide, hafnium oxide, zirconium oxide, an oxide containing aluminum and hafnium, an oxynitride containing aluminum and hafnium, an oxide containing silicon and hafnium, an oxynitride containing silicon and hafnium, and a nitride containing silicon and hafnium.

Examples of the insulating layer having a low dielectric constant include silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, and a resin.

When a transistor including an oxide semiconductor is surrounded by insulating layers having a function of inhibiting the passage of oxygen and impurities such as hydrogen (e.g., the insulating layer 514, the insulating layer 522, the insulating layer 554, and the insulating layer 574), the electrical characteristics of the transistor can be stable. An insulating layer having a function of inhibiting the passage of oxygen and impurities such as hydrogen can be formed to have a single layer or a stacked layer including an insulating layer containing, for example, boron, carbon, nitrogen, oxygen, fluorine, magnesium, aluminum, silicon, phosphorus, chlorine, argon, gallium, germanium, yttrium, zirconium, lanthanum, neodymium, hafnium, or tantalum. Specifically, as the insulating layer having a function of inhibiting the passage of oxygen and impurities such as hydrogen, a metal oxide such as aluminum oxide, magnesium oxide, gallium oxide, germanium oxide, yttrium oxide, zirconium oxide, lanthanum oxide, neodymium oxide, hafnium oxide, or tantalum oxide or a metal nitride such as aluminum nitride, aluminum titanium nitride, titanium nitride, silicon nitride oxide, or silicon nitride can be used.

An insulating layer functioning as a gate insulating layer is preferably an insulating layer including a region containing oxygen to be released by heating. For example, when a structure is employed in which silicon oxide or silicon oxynitride that includes a region containing oxygen to be released by heating is provided in contact with the metal oxide 531, oxygen vacancies included in the metal oxide 531 can be compensated.

[Conductive Layer]

For a conductive layer, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, lanthanum, and the like; an alloy containing any of the above metal elements; an alloy containing a combination of the above metal elements; or the like. For example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. Tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that maintain their conductivity even after absorbing oxygen. A semiconductor having high electrical conductivity, typified by polycrystalline silicon containing an impurity element such as phosphorus may be used. Silicide such as nickel silicide may be used.

A plurality of conductive layers formed using any of the above materials may be stacked. For example, a stacked-layer structure combining a material containing the above metal element and a conductive material containing oxygen may be employed. In addition, a stacked-layer structure combining a material containing the above metal element and a conductive material containing nitrogen may be employed. Furthermore, a stacked-layer structure combining a material containing the above metal element, a conductive material containing oxygen, and a conductive material containing nitrogen may be employed.

In the case where a metal oxide is used for the channel formation region of the transistor, the conductive layer functioning as the gate electrode preferably employs a stacked-layer structure combining a material containing the above metal element and a conductive material containing oxygen. In that case, the conductive material containing oxygen is preferably provided on the channel formation region side. When the conductive material containing oxygen is provided on the channel formation region side, oxygen released from the conductive material is easily supplied to the channel formation region.

It is particularly preferable to use, for the conductive layer functioning as the gate electrode, a conductive material containing oxygen and a metal element contained in the metal oxide where the channel is formed. A conductive material containing the above metal element and nitrogen may be used. For example, a conductive material containing nitrogen, such as titanium nitride or tantalum nitride, may be used. Indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon is added may be used. Indium gallium zinc oxide containing nitrogen may be used. With the use of such a material, hydrogen contained in the metal oxide where the channel is formed can be captured in some cases. Alternatively, hydrogen entering from an external insulating layer or the like can be captured in some cases.

At least part of any of the structure examples, the drawings corresponding thereto, and the like described in this embodiment can be implemented in combination with any of the other structure examples, the other drawings, and the like as appropriate.

At least part of this embodiment can be implemented in combination with any of the other embodiments described in this specification as appropriate.

Embodiment 4

Described in this embodiment is a metal oxide that can be used in an OS transistor described in the above embodiment. <Classification of Crystal Structures>

First, the classification of the crystal structures of an oxide semiconductor will be described with reference to FIG. 22A. FIG. 22A is a diagram showing the classification of crystal structures of an oxide semiconductor, typically IGZO (a metal oxide containing In, Ga, and Zn).

As shown in FIG. 22A, an oxide semiconductor is roughly classified into "Amorphous", "Crystalline", and "Crystal". The term "Amorphous" includes a completely amorphous structure. The term "Crystalline" includes CAAC (c-axis-aligned crystalline), nc (nanocrystalline), and CAC (cloud-aligned composite) structures. Note that the term "Crystalline" excludes single crystal, poly crystal, and completely amorphous structures. The term "Crystal" includes single crystal and poly crystal structures.

Note that the structures in the thick frame shown in FIG. 22A are in an intermediate state between "Amorphous" and "Crystal", and belong to a new crystalline phase. That is, these structures are completely different from "Amorphous", which is energetically unstable, and "Crystal".

A crystal structure of a film or a substrate can be evaluated with an X-ray diffraction (XRD) spectrum. FIG. 22B shows an XRD spectrum, which is obtained by GIXD (Grazing-Incidence XRD) measurement, of a CAAC-IGZO film classified into "Crystalline". In FIG. 22B, the horizontal axis represents 2θ [deg.], and the vertical axis represents Intensity [a.u.]. Note that a GIXD method is also referred to as a thin film method or a Seemann-Bohlin method. The XRD spectrum that is shown in FIG. 22B and obtained by GIXD measurement is hereinafter simply referred to as an XRD spectrum. The CAAC-IGZO film in FIG. 22B has a composition of In:Ga:Zn=4:2:3 [atomic ratio] or the neighborhood thereof. The CAAC-IGZO film in FIG. 22B has a thickness of 500 nm.

As shown in FIG. 22B, a clear peak indicating crystallinity is observed in the XRD spectrum of the CAAC-IGZO film. Specifically, a peak indicating c-axis alignment is detected at 2θ of around 31° in the XRD spectrum of the CAAC-IGZO film. As shown in FIG. 22B, the peak at 2θ of around 31° is asymmetric with the angle at which the peak intensity is detected as the axis.

A crystal structure of a film or a substrate can also be evaluated with a diffraction pattern obtained by a nanobeam electron diffraction method (NBED) (such a pattern is also referred to as a nanobeam electron diffraction pattern). FIG. 22C shows a diffraction pattern of the CAAC-IGZO film. FIG. 22C shows a diffraction pattern obtained by the NBED method in which an electron beam is incident in the direction parallel to the substrate. The CAAC-IGZO film in FIG. 22C has a composition of In:Ga:Zn=4:2:3 [atomic ratio] or the neighborhood thereof. In the nanobeam electron diffraction method, electron diffraction is performed with a probe diameter of 1 nm.

As shown in FIG. 22C, a plurality of spots indicating c-axis alignment are observed in the diffraction pattern of the CAAC-IGZO film.

[Structure of Oxide Semiconductor]

Oxide semiconductors might be classified in a manner different from that in FIG. 22A when classified in terms of the crystal structure. Oxide semiconductors are classified into a single crystal oxide semiconductor and a non-single-crystal oxide semiconductor, for example. Examples of the non-single-crystal oxide semiconductor include the above-described CAAC-OS and nc-OS. Other examples of the non-single-crystal oxide semiconductor include a polycrystalline oxide semiconductor, an amorphous-like oxide semiconductor (a-like OS), and an amorphous oxide semiconductor.

Next, the CAAC-OS, nc-OS, and a-like OS will be described in detail.

[CAAC-OS]

The CAAC-OS is an oxide semiconductor that has a plurality of crystal regions each of which has c-axis alignment in a particular direction. Note that the particular direction refers to the film thickness direction of a CAAC-OS film, the normal direction of the surface where the CAAC-OS film is formed, or the normal direction of the surface of the CAAC-OS film. The crystal region refers to a region having a periodic atomic arrangement. When an atomic arrangement is regarded as a lattice arrangement, the crystal region also refers to a region with a uniform lattice arrangement. The CAAC-OS has a region where a plurality of crystal regions are connected in the a-b plane direction, and the region has distortion in some cases. Note that the distortion refers to a portion where the direction of a lattice arrangement changes between a region with a uniform lattice arrangement and another region with a uniform lattice arrangement in a region where a plurality of crystal regions are connected. That is, the CAAC-OS is an oxide semiconductor having c-axis alignment and having no clear alignment in the a-b plane direction.

Note that each of the plurality of crystal regions is formed of one or more minute crystals (crystals each of which has a maximum diameter of less than 10 nm). In the case where the crystal region is formed of one minute crystal, the maximum diameter of the crystal region is less than 10 nm. In the case where the crystal region is formed of a large number of minute crystals, the size of the crystal region may be approximately several tens of nanometers.

In the case of an In-M-Zn oxide (the element M is one or more of aluminum, gallium, yttrium, tin, titanium, and the like), the CAAC-OS tends to have a layered crystal structure (also referred to as a stacked-layer structure) in which a layer containing indium (In) and oxygen (hereinafter, an In layer) and a layer containing the element M, zinc (Zn), and oxygen (hereinafter, an (M,Zn) layer) are stacked. Indium and the element M can be replaced with each other. Therefore, indium may be contained in the (M,Zn) layer. In addition, the element M may be contained in the In layer. Note that Zn may be contained in the In layer. Such a layered structure is observed as a lattice image in a high-resolution TEM image, for example.

When the CAAC-OS film is subjected to structural analysis by out-of-plane XRD measurement with an XRD apparatus using θ/2θ scanning, for example, a peak indicating c-axis alignment is detected at or around 2θ of 31°. Note that the position of the peak indicating c-axis alignment (the value of 2θ) may change depending on the kind, composition, or the like of the metal elements contained in the CAAC-OS.

For example, a plurality of bright spots are observed in the electron diffraction pattern of the CAAC-OS film. Note that one spot and another spot are observed point-symmetrically with a spot of the incident electron beam passing through a sample (also referred to as a direct spot) as the symmetric center.

When the crystal region is observed from the particular direction, a lattice arrangement in the crystal region is basically a hexagonal lattice arrangement; however, a unit lattice is not always a regular hexagon and is a non-regular hexagon in some cases. A pentagonal lattice arrangement, a heptagonal lattice arrangement, or the like is included in the distortion in some cases. Note that a clear grain boundary cannot be observed even in the vicinity of the distortion in the CAAC-OS. That is, formation of a grain boundary is inhibited by the distortion of a lattice arrangement. This is probably because the CAAC-OS can tolerate distortion owing to a low density of arrangement of oxygen atoms in the a-b plane direction, an interatomic bond distance changed by substitution of a metal atom, and the like.

A crystal structure in which a clear grain boundary is observed is what is called a polycrystal structure. It is highly probable that the grain boundary becomes a recombination center and traps carriers and thus decreases the on-state current and field-effect mobility of a transistor, for example. Thus, the CAAC-OS in which no clear grain boundary is observed is one of crystalline oxides having a crystal structure suitable for a semiconductor layer of a transistor. Note that Zn is preferably contained to form the CAAC-OS. For example, an In—Zn oxide and an In—Ga—Zn oxide are suitable because they can inhibit generation of a grain boundary as compared with an In oxide.

The CAAC-OS is an oxide semiconductor with high crystallinity in which no clear grain boundary is observed. Thus, in the CAAC-OS, a reduction in electron mobility due to the grain boundary is less likely to occur. Entry of impurities, formation of defects, and/or the like might decrease the crystallinity of an oxide semiconductor. This means that the CAAC-OS can be referred to as an oxide semiconductor having small amounts of impurities and defects (e.g., oxygen vacancies). Therefore, an oxide semiconductor including the CAAC-OS is physically stable. Accordingly, the oxide semiconductor including the CAAC-OS is resistant to heat and has high reliability. In addition, the CAAC-OS is stable with respect to high temperatures in the manufacturing process (what is called thermal budget).

Accordingly, the use of the CAAC-OS for the OS transistor can extend a degree of freedom of the manufacturing process.

[nc-OS]

In the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. In other words, the nc-OS includes a minute crystal. Note that the size of the minute crystal is, for example, greater than or equal to 1 nm and less than or equal to 10 nm, particularly greater than or equal to 1 nm and less than or equal to 3 nm; thus, the minute crystal is also referred to as a nanocrystal. There is no regularity of crystal orientation between different nanocrystals in the nc-OS. Hence, the orientation in the whole film is not observed. Accordingly, in some cases, the nc-OS cannot be distinguished from an a-like OS or an amorphous oxide semiconductor, depending on an analysis method. For example, when an nc-OS film is subjected to structural analysis by out-of-plane XRD measurement with an XRD apparatus using θ/2θ scanning, a peak indicating crystallinity is not observed. Furthermore, a diffraction pattern like a halo pattern is observed when the nc-OS film is subjected to electron diffraction (also referred to as selected-area electron diffraction) using an electron beam with a probe diameter larger than the diameter of a nanocrystal (e.g., larger than or equal to 50 nm). Meanwhile, in some cases, a plurality of spots in a ring-like region with a direct spot as the center are observed in the obtained electron diffraction pattern when the nc-OS film is subjected to electron diffraction (also referred to as nanobeam electron diffraction) using an electron beam with a probe diameter nearly equal to or smaller than the diameter of a nanocrystal (e.g., larger than or equal to 1 nm and smaller than or equal to 30 nm).

[A-Like OS]

The a-like OS is an oxide semiconductor having a structure between those of the nc-OS and the amorphous oxide semiconductor. The a-like OS has a void or a low-density region. That is, the a-like OS has lower crystallinity than the nc-OS and the CAAC-OS. Moreover, the a-like OS has higher hydrogen concentration in the film than the nc-OS and the CAAC-OS.

[Composition of Oxide Semiconductor]

Next, the CAC-OS will be described in detail. Note that the CAC-OS relates to the material composition.

[CAC-OS]

The CAC-OS refers to one composition of a material in which elements constituting a metal oxide are unevenly distributed with a size greater than or equal to 0.5 nm and less than or equal to 10 nm, preferably greater than or equal to 1 nm and less than or equal to 3 nm, or a similar size, for example. Note that a state in which one or more metal elements are unevenly distributed and regions including the metal element(s) are mixed with a size greater than or equal to 0.5 nm and less than or equal to 10 nm, preferably greater than or equal to 1 nm and less than or equal to 3 nm, or a similar size in a metal oxide is hereinafter referred to as a mosaic pattern or a patch-like pattern.

In addition, the CAC-OS has a composition in which materials are separated into a first region and a second region to form a mosaic pattern, and the first regions are distributed in the film (this composition is hereinafter also referred to as a cloud-like composition). That is, the CAC-OS is a composite metal oxide having a composition in which the first regions and the second regions are mixed.

Note that the atomic ratios of In, Ga, and Zn to the metal elements contained in the CAC-OS in an In—Ga—Zn oxide are denoted by [In], [Ga], and [Zn], respectively. For example, the first region in the CAC-OS in the In—Ga—Zn oxide has [In] higher than [In] in the composition of the CAC-OS film. Moreover, the second region has [Ga] higher than [Ga] in the composition of the CAC-OS film. Alternatively, for example, the first region has [In] higher than [In] in the second region and [Ga] lower than [Ga] in the second region. Moreover, the second region has [Ga] higher than [Ga] in the first region and [In] lower than [In] in the first region.

Specifically, the first region includes indium oxide, indium zinc oxide, or the like as its main component. The second region includes gallium oxide, gallium zinc oxide, or the like as its main component. That is, the first region can be referred to as a region containing In as its main component. The second region can be referred to as a region containing Ga as its main component.

Note that a clear boundary between the first region and the second region cannot be observed in some cases.

For example, in EDX mapping obtained by energy dispersive X-ray spectroscopy (EDX), it is confirmed that the CAC-OS in the In—Ga—Zn oxide has a structure in which the region containing In as its main component (the first region) and the region containing Ga as its main component (the second region) are unevenly distributed and mixed.

In the case where the CAC-OS is used for a transistor, a switching function (on/off switching function) can be given to the CAC-OS owing to the complementary action of the conductivity derived from the first region and the insulating property derived from the second region. That is, the CAC-OS has a conducting function in part of the material and has an insulating function in another part of the material; as a whole, the CAC-OS has a function of a semiconductor. Separation of the conducting function and the insulating function can maximize each function. Accordingly, when the CAC-OS is used for a transistor, high on-state current (Ion), high field-effect mobility (u), and excellent switching operation can be achieved.

An oxide semiconductor can have any of various structures that show different properties. Two or more of the amorphous oxide semiconductor, the polycrystalline oxide semiconductor, the a-like OS, the CAC-OS, the nc-OS, and the CAAC-OS may be included in an oxide semiconductor of one embodiment of the present invention.
<Transistor Including Oxide Semiconductor>

Next, a case where the oxide semiconductor is used for a transistor will be described.

When the oxide semiconductor is used for a transistor, the transistor can have high field-effect mobility. In addition, the transistor can have high reliability.

It is particularly preferable that an oxide containing indium (In), gallium (Ga), and zinc (Zn) (also referred to as "IGZO") be used as the semiconductor layer where a channel is formed. Alternatively, an oxide containing indium (In), aluminum (Al), and zinc (Zn) (also referred to as "IAZO") may be used for the semiconductor layer. Alternatively, an oxide containing indium (In), aluminum (Al), gallium (Ga), and zinc (Zn) (also referred to as "IAGZO") may be used for the semiconductor layer.

An oxide semiconductor having a low carrier concentration is preferably used for the transistor. For example, the carrier concentration of an oxide semiconductor is lower than or equal to $1 \times 10^{17}$ cm$^{-3}$, preferably lower than or equal to $1 \times 10^{15}$ cm$^{-3}$, further preferably lower than or equal to $1 \times 10^{13}$ cm$^{-3}$, still further preferably lower than or equal to $1 \times 10^{11}$ cm$^{-3}$, yet further preferably lower than $1 \times 10^{10}$ cm$^{-3}$ and higher than or equal to $1 \times 10^{-9}$ cm$^{-3}$. In order to reduce the carrier concentration of an oxide semiconductor film, the impurity concentration in the oxide semiconductor film is reduced so that the density of defect states can be reduced. In this specification and the like, a state with a low impurity concentration and a low density of defect states is referred to as a highly purified intrinsic or substantially highly purified intrinsic state. Note that an oxide semiconductor having a low carrier concentration may be referred to as a highly purified intrinsic or substantially highly purified intrinsic oxide semiconductor.

A highly purified intrinsic or substantially highly purified intrinsic oxide semiconductor film has a low density of defect states and accordingly has a low density of trap states in some cases.

Charges trapped by the trap states in an oxide semiconductor take a long time to be released and may behave like fixed charges. A transistor whose channel formation region is formed in an oxide semiconductor having a high density of trap states has unstable electrical characteristics in some cases.

In order to obtain stable electrical characteristics of the transistor, reducing the concentration of impurities in the oxide semiconductor is effective. In order to reduce the impurity concentration in the oxide semiconductor, the impurity concentration in a film that is adjacent to the oxide semiconductor is preferably reduced. Examples of impurities include hydrogen, nitrogen, an alkali metal, an alkaline earth metal, iron, nickel, and silicon.
<Impurity>

The influence of impurities in the oxide semiconductor is described.

When silicon and/or carbon, which are Group 14 elements, are contained in an oxide semiconductor, defect states are formed in the oxide semiconductor. Thus, the concentrations of silicon and carbon in the oxide semiconductor and the concentrations of silicon and carbon in the vicinity of an interface with the oxide semiconductor (the concentrations obtained by SIMS) are lower than or equal to $2 \times 10^{18}$ atoms/cm$^3$, preferably lower than or equal to $2 \times 10^{17}$ atoms/cm$^3$.

When the oxide semiconductor contains alkali metal or alkaline earth metal, defect states are formed and carriers are generated in some cases. Accordingly, a transistor including an oxide semiconductor that contains alkali metal or alkaline earth metal tends to have normally-on characteristics. Thus, the concentration of alkali metal or alkaline earth metal in the oxide semiconductor, which is obtained by SIMS, is lower than or equal to $1 \times 10^{18}$ atoms/cm$^3$, preferably lower than or equal to $2 \times 10^{16}$ atoms/cm$^3$.

An oxide semiconductor containing nitrogen easily becomes n-type by generation of electrons serving as carriers and an increase in carrier concentration. A transistor including, as a semiconductor layer, an oxide semiconductor containing nitrogen tends to have normally-on characteristics. When nitrogen is contained in the oxide semiconductor, a trap state is sometimes formed. This might make the electrical characteristics of the transistor unstable. Thus, the nitrogen concentration in the oxide semiconductor, which is obtained by SIMS, is lower than $5 \times 10^{19}$ atoms/cm$^3$, preferably lower than or equal to $5 \times 10^{18}$ atoms/cm$^3$, further preferably lower than or equal to $1 \times 10^{18}$ atoms/cm$^3$, still further preferably lower than or equal to $5 \times 10^{17}$ atoms/cm$^3$.

Hydrogen contained in an oxide semiconductor reacts with oxygen bonded to a metal atom to be water, and thus causes an oxygen vacancy in some cases. Entry of hydrogen into the oxygen vacancy generates an electron serving as a carrier in some cases. Furthermore, bonding of part of hydrogen to oxygen bonded to a metal atom causes generation of an electron serving as a carrier in some cases. Thus, a transistor including an oxide semiconductor containing hydrogen tends to have normally-on characteristics. For this reason, hydrogen in the oxide semiconductor is preferably reduced as much as possible. Specifically, the hydrogen concentration in the oxide semiconductor, which is obtained by SIMS, is lower than $1\times10^{20}$ atoms/cm$^3$, preferably lower than $1\times10^{19}$ atoms/cm$^3$, further preferably lower than $5\times10^{18}$ atoms/cm$^3$, still further preferably lower than $1\times10^{18}$ atoms/cm$^3$.

When an oxide semiconductor with sufficiently reduced impurities is used for a channel formation region in a transistor, stable electrical characteristics can be given.

At least part of the structure examples, the drawings corresponding thereto, and the like illustrated in this embodiment can be combined with the other structure examples, the other drawings, and the like as appropriate.

At least part of this embodiment can be implemented in combination with any of the other embodiments described in this specification as appropriate.

Embodiment 5

In this embodiment, a specific example of the moving object of one embodiment of the present invention will be described with reference to drawings, for example.

Figure 23A:
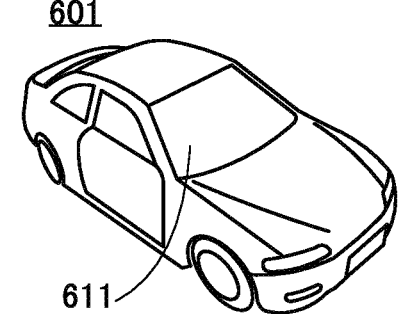
FIG. 23A to FIG. 23E are diagrams illustrating examples of moving objects.

FIG. 23A illustrates a motor vehicle 601. The motor vehicle 601 includes a window unit 611. The moving object of one embodiment of the present invention can be applied to the motor vehicle 601. Thus, a motor vehicle which can display a highly visible image for a driver of the motor vehicle 601 and prevent occurrence of an accident can be provided, for example.

Figure 23B:
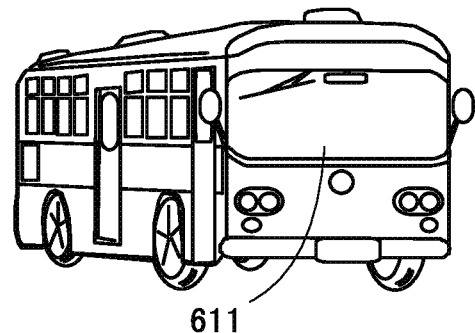

FIG. 23B illustrates a bus 602. The bus 602 includes the window unit 611. The moving object of one embodiment of the present invention can be applied to the bus 602. Thus, a bus which can display a highly visible image for a driver of the bus 602 and prevent occurrence of an accident can be provided, for example.

Figure 23C:
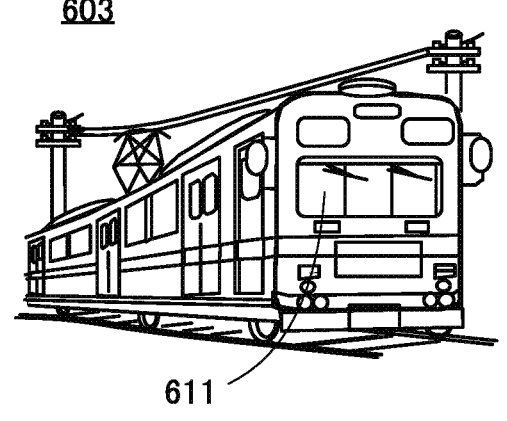

FIG. 23C illustrates a train 603. The train 603 includes the window unit 611. The moving object of one embodiment of the present invention can be applied to the train 603. Thus, a train which can display a highly visible image for a driver of the train 603 and prevent occurrence of an accident can be provided, for example.

Figure 23D:
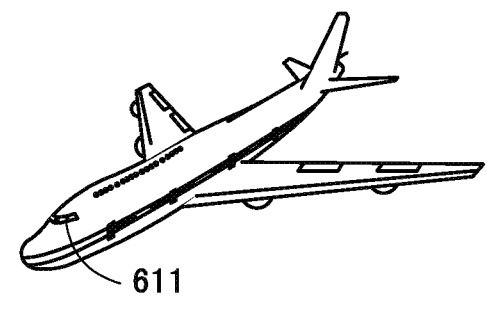

FIG. 23D illustrates an airplane 604. The airplane 604 includes the window unit 611. The moving object of one embodiment of the present invention can be applied to the airplane 604. Thus, an airplane which can display a highly visible image for a pilot of the airplane 604 and prevent occurrence of an accident can be provided, for example.

Figure 23E:
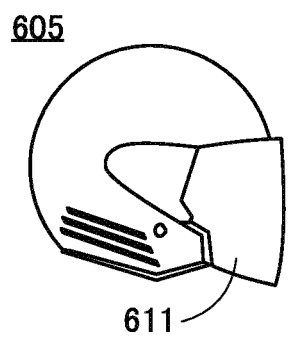

FIG. 23E illustrates a helmet 605. A person wears the helmet 605 for safety when he or she drives a motorcycle, which is a moving object. The helmet 605 includes the window unit 611. At least part of the system for a moving object of one embodiment of the present invention can be applied to the helmet 605. For example, a structure in which the driving data obtaining unit 14 and the control unit 24 are removed from the structure of the moving object 10 illustrated in FIG. 1A can be employed for the helmet 605. That is, the helmet 605 can be provided with the imaging unit 12, the arithmetic unit 16, the image generation unit 18, and the display unit 22, for example.

Note that the driving data obtaining unit 14 and the control unit 24 can be provided in a motorcycle driven by a person wearing the helmet 605, for example. Driving data output from the driving data obtaining unit 14 can be supplied from the motorcycle to the helmet 605, for example. Furthermore, a captured image obtained by the imaging unit 12, operation results obtained by the arithmetic unit 16, and the like can be supplied from the helmet 605 to the motorcycle and based on the data, the control unit 24 can control running of the motorcycle, for example.

By employing at least part of the system for a moving object of one embodiment of the present invention in the helmet 605, a helmet displaying a highly visible image for a driver of a motorcycle wearing the helmet 605 and being able to prevent occurrence of an accident can be provided, for example. Note that the structure is not limited to a helmet and other structures may be employed as long as they are glasses-type wearing tools.

The moving object of one embodiment of the present invention or the system for a moving object of one embodiment of the present invention can be used in a moving object other than the motor vehicle, the bus, the train, the airplane, and the helmet illustrated in FIG. 23A to FIG. 23E. For example, the moving object of one embodiment of the present invention can be provided in a high-speed train, a helicopter, or a tank.

At least part of this embodiment can be implemented in combination with the other embodiments described in this specification as appropriate.

Embodiment 6

In this embodiment, a display apparatus of one embodiment of the present invention and an electronic device of one embodiment of the present invention using the display apparatus will be described.

Figure 24A:
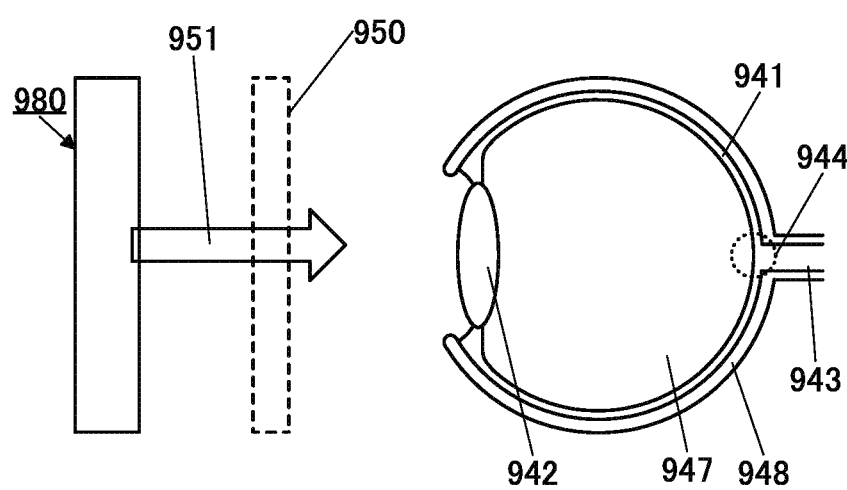
FIG. 24A is a schematic cross-sectional view of a display apparatus and an eye of a user.

FIG. 24A is a schematic cross-sectional view showing a positional relationship between a display apparatus 980 and a user's eye. The display apparatus 980 includes a plurality of light-emitting elements and a plurality of light-receiving elements.

Light 951 emitted from the light-emitting elements included in the display apparatus 980 is delivered to the eye through an optical system 950, and light reflected by the eye is received by the light-receiving elements. The display apparatus 980 can capture an image of the periphery of the eye, the surface of the eye, or the inside (fundus or the like) of the eye.

For example, the display apparatus 980 illustrated in FIG. 24A includes the light-emitting elements and the light-receiving elements, and thus can capture an image of the fundus of one's eye through the optical system 950 to obtain image data of a retinal pattern. Note that it is difficult to capture an image other than that of a focused target when the focus is adjusted with the optical system 950. For example, when the fundus of the eye is focused on, the periphery of the eye or the like is out of focus and thus an image thereof can hardly be captured.

The display apparatus of one embodiment of the present invention includes a light-emitting element and a light-receiving element in a pixel. In the display apparatus of one embodiment of the present invention, the pixel has a light-receiving function, so that the contact or proximity of an object can be detected while an image is displayed. The display apparatus of one embodiment of the present invention includes subpixels exhibiting infrared light; thus, an image can be displayed using the subpixels included in the display apparatus while infrared light is exhibited as a light source.

In addition, in the display apparatus of one embodiment of the present invention, the light-emitting elements are arranged in a matrix in a display unit, and an image can be displayed on the display unit. Furthermore, the light-receiving elements are arranged in a matrix in the display unit, and the display unit has one or both of an image capturing function and a sensing function in addition to an image displaying function. The display unit can be used for an image sensor. That is, an image can be taken by detecting light with the display unit, or an object (an eye, an eyelid, or an eyeball) can be detected by regularly monitoring an image. Furthermore, in the display apparatus of one embodiment of the present invention, the light-emitting elements can be used as a light source of the sensor. Accordingly, a light-receiving unit and a light source are not necessarily provided separately from the display apparatus, so that the number of components of an electronic device can be reduced.

First, a method for detecting a user's blink and eyelid movement is described below using FIG. 24A and FIG. 24B.

<Blink and Eyelid Movement>

The display apparatus 980 emits near-infrared light. The user's eye or the periphery of the user's eye is irradiated with the near-infrared light through the optical system 950. Reflected light goes through the optical system 950 again and enters the display apparatus 980. Accordingly, the state of an object can be detected.

Figures 24B, 24C:
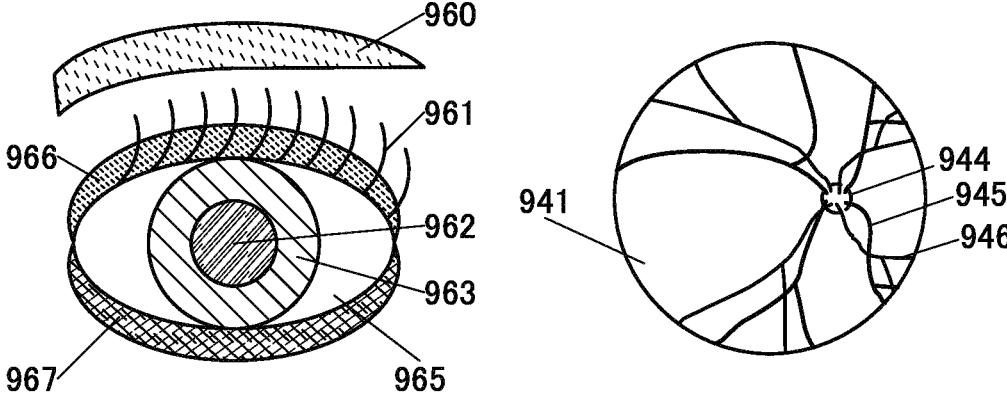
FIG. 24B is a schematic view illustrating the eye of the user and the vicinity thereof.
FIG. 24C is a schematic view illustrating a retina pattern of the eye of the user.

Note that FIG. 24B is a schematic view illustrating a user's eye and the periphery of the user's eye. FIG. 24B illustrates a user's eyebrow 960, user's eyelids (an upper eyelid 966 and a lower eyelid 967), user's eyelashes 961, a user's pupil 962, a user's cornea 963, and a user's sclera 965. The display apparatus 980 has a function of taking an image of one or more selected from the user's eyebrow 960, the user's eyelids (the upper eyelid 966 and the lower eyelid 967), the user's eyelashes 961, the user's pupil 962, the user's cornea 963, and the user's sclera 965 that are illustrated in FIG. 24B.

For example, the electronic device of one embodiment of the present invention can detect the state of the user's eye or the periphery of the user's eye illustrated in FIG. 24B with the use of the display apparatus 980. For example, when the user closes the eyelids (the upper eyelid 966 and the lower eyelid 967), the surface of the eyelids, i.e., the skin is irradiated with the near-infrared light. In addition, when the user open the eyelids, the surface of the user's eyeball is irradiated with the near-infrared light. Since the skin and the surface of an eyeball have different reflectances, the intensities of reflected near-infrared light are different. By continuously monitoring this state, one or both of the number of blinks and the time required for one blink can be detected using the display apparatus 980.

When the user looks at a display for a long time, the number of blinks might be decreased. Furthermore, when the user feels fatigue, blink intervals might become longer and the time required for one blink might become longer.

The electronic device of one embodiment of the present invention can estimate the fatigue level of the user from one or both of the number of user's blinks per unit time and the time required for one blink.

<Iris Movement>

When a boundary region between a cornea (e.g., the cornea 963 illustrated in FIG. 24B) and a sclera (e.g., the sclera 965 illustrated in FIG. 24B) is irradiated with an infrared circular spot, the ratio of a region covering the cornea to a region covering the sclera in an infrared spot irradiation range changes in accordance with the eyeball movement. Reflectance from the region covering the sclera is much higher than that from the region covering the cornea, and thus the amount of reflected light changes in accordance with the eyeball movement. By measuring this change, a direction in which the user sees can be detected.

<Scleral Reflection Method>

Next, a scleral reflection method is described. The display apparatus 980 emits near-infrared light. The user's eye is irradiated with the near-infrared light through the optical system 950. Light reflected by the eye goes through the optical system 950 again and enters the display apparatus 980. Accordingly, the state of an object can be detected. The user shifts his/her line of sight when watching a fast-moving object in a displayed video. When the line of sight is shifted, the eyeball moves. When the eyeball moves, the ratio of the region covering the cornea to the region covering the sclera that are irradiated with infrared light changes. Thus, by monitoring a reflected light component, the eyeball movement can be detected. That is, the electronic device of one embodiment of the present invention has an eye tracking function.

A region the user watches carefully can be estimated by detecting the user's line of sight by eye tracking. In addition, the resolution of a region other than the region the user watches carefully is reduced by variable rate shading, so that the amount of calculation by the electronic device can be reduced and power consumption can be reduced.

Since the electronic device of one embodiment of the present invention includes both the light-emitting elements and the sensor device in the display apparatus 980, the number of components can be reduced. In other words, since the electronic device of one embodiment of the present invention includes both the light-emitting elements and the sensor device, a fingerprint authentication device, a touch panel, or the like is not necessarily provided separately. Thus, one embodiment of the present invention can provide an electronic device with reduced manufacturing cost.

Next, funduscopy of the user's eye is described using FIG. 24A and FIG. 24C.

<Funduscopy>

As illustrated in FIG. 24A, the user's eye is made up of a crystalline lens 942, a retina 941, an optic nerve 943, a vitreous body 947, a choroid 948, a cornea, and the like. Note that for simplicity, the cornea and a pupil between the cornea and the crystalline lens are not illustrated. A ciliary body is a tissue continuous with an iris, and the choroid 948 is a tissue continuous with the ciliary body. Like the diaphragm of a camera, the iris and the pupil adjust light delivered to the retina 941. It is said that the pattern of the retina 941, what is called the retina pattern does not change from birth until death basically, and the use of the retina pattern enables personal authentication or the like. Eye diagnosis is possible even from a remote place with the use of the retina pattern obtained by the display apparatus 980.

Note that the display apparatus 980 has a function of detecting one or more selected from a user's blink, iris movement, and eyelid movement without focusing on the fundus of an eye by adjusting the optical system 950. That is, the electronic device of one embodiment of the present invention has a function of detecting eye fatigue.

Next, FIG. 24C illustrates an example of the retina pattern of a right eye. An optic disc 944, a vein 945, an artery 946, a macula, a fovea, and the like can be observed in the retina 941. The optic disc 944 is a boundary portion between the optic nerve 943 and the retina 941, and the vein 945 or the artery 946 extends from the optic disc 944. Note that the fundus of the eye is a portion behind the eyeball and collectively means the retina 941, the vitreous body 947, the choroid 948, and the optic disc 944. Note that the optic disc 944 of the left eye is positioned on the left side of the retina pattern, and the retina pattern of the left eye is a mirror-reversed retina pattern of the right eye in FIG. 24C.

To obtain the retina pattern of the fundus of the eye with the use of the light-receiving element included in the display apparatus 980, the pupil needs to be open. Display is changed in the following procedure to capture an image of the fundus of the eye with the pupil open. The display screen of the display apparatus 980 is gradually darkened so that the user's eye adapts to the dark. The display screen is brightened for a short time of less than or equal to 16.7 ms and an image is taken. After that, the brightness of the display screen is gradually returned to the original.

In addition, the electronic device of one embodiment of the present invention can detect the fatigue level of the user's eye by the display apparatus 980. When an image is taken while the display screen is brightened for a certain period of time, an image of the eye cannot be captured if the user blinks. Therefore, through detection of the number of blinks, blink timing, or the time when the user closes the eye, the eye fatigue level can also be estimated by a system utilizing AI (Artificial Intelligence) from the number of blinks, blink intervals, the time when the user closes the eye, or the like.

Furthermore, to detect the fatigue level of the user's eye, images may be taken more than once while the display screen of the display apparatus 980 is darkened. When images are captured more than once, the pulse of a retina blood vessel can be detected and whether the user is in a rest state, in a state of tension, or the like can be further determined by the system utilizing AI. Furthermore, diagnosis of high blood pressure, diagnosis of diabetes, or the like can be performed with the system utilizing AI by using a variety of pieces of data obtained by the display apparatus 980. In the case of employing the system utilizing AI, a control circuit is mounted on the display apparatus 980. A CPU (Central Processor Unit) or a GPU (Graphics Processing Unit) is used for the control circuit. Alternatively, an APU (Accelerated Processing Unit) that is an integrated chip of a CPU and a GPU can also be used for the control circuit. Alternatively, an IC incorporating an AI system (also referred to as an inference chip) may be used. The IC incorporating an AI system is sometimes referred to as a circuit performing neural network calculation (a microprocessor).

In addition, the direction of an eyeball may be controlled by displaying an eye-catching pattern on the display screen of the display apparatus 980 while the display screen of the display apparatus 980 is darkened.

A distance between the display apparatus 980 and the surface of an eye (e.g., a cornea) is preferably less than or equal to 2 cm. The optical system 950 having a short focal distance is provided between the display apparatus 980 and the eye to achieve this positional relationship.

In the case where an image is displayed on a screen at a magnification of 10 times by the optical system 950, for example, a sensor pixel pitch is approximately 10.4 μm in a display screen of the display apparatus 980 having a diagonal of approximately 1 inch and a resolution (definition) of approximately 2450 ppi. Since the vascular diameter of each of the vein 945 and the artery 946 of the retina is smaller than approximately 100 μm, an image of the vein 945 or the artery 946 can be taken with the display apparatus 980.

At least part of this embodiment can be implemented in combination with the other embodiments described in this specification as appropriate.

REFERENCE NUMERALS

10: moving object, 12: imaging unit, 14: driving data obtaining unit, 16: arithmetic unit, 18: image generation unit, 22: display unit, 24: control unit, 31: window unit, 33: lighting unit, 35: display apparatus, 37: imaging device, 39: semiconductor device, 42: display image, 44: arrow, 46: arrow, 48*a*: building, 48*b*: building, 49: person, 123: CPU, 124: GPU, 125: storage circuit unit, 129: input/output terminal unit, 140: layer, 150: layer, 151: pixel circuit, 160: layer, 161: light-emitting element, 161B: light-emitting element, 161G: light-emitting element, 161R: light-emitting element, 161W: light-emitting element, 171: conductive layer, 172: EL layer, 172*a*: EL layer, 172*b*: EL layer, 172B: EL layer, 172G: EL layer, 172R: EL layer, 172W: EL layer, 173: conductive layer, 175B: light, 175G: light, 175R: light, 230: pixel, 231: driver circuit unit, 232: driver circuit unit, 233: pixel, 235: display region, 236: wiring, 237: wiring, 240: pixel, 241: conductive layer, 243: insulating layer, 245: conductive layer, 246: capacitor, 251: conductive layer, 252: conductive layer, 254: insulating layer, 255: insulating layer, 256: plug, 261: insulating layer, 262: insulating layer, 263: insulating layer, 264: insulating layer, 264B: coloring layer, 264G: coloring layer, 264R: coloring layer, 265: insulating layer, 266: plug, 271: protective layer, 272: insulating layer, 273: protective layer, 274: plug, 274*a*: conductive layer, 274*b*: conductive layer, 275: region, 276: insulating layer, 277: microlens array, 301: substrate, 301A: substrate, 301B: substrate, 310: transistor, 310A: transistor, 310B: transistor, 311: conductive layer, 312: low-resistance region, 313: insulating layer, 314: insulating layer, 315: element isolation layer, 320: transistor, 321: semiconductor layer, 323: insulating layer, 324: conductive layer, 325: conductive layer, 326: insulating layer, 327: conductive layer, 328: insulating layer, 329: insulating layer, 331: substrate, 332: insulating layer, 341: conductive layer, 342: conductive layer, 343: plug, 363: insulating layer, 415: protective layer, 419: resin layer, 420: substrate, 500: transistor, 505: conductive layer, 505*a*: conductive layer, 505*b*: conductive layer, 505*c*: conductive layer, 514: insulating layer, 516: insulating layer, 522: insulating layer, 524: insulating layer, 531: metal oxide, 531*a*: metal oxide, 531*b*: metal oxide, 531*c*: metal oxide, 541: insulating layer, 541*a*: insulating layer, 541*b*: insulating layer, 542: conductive layer, 542*a*: conductive layer, 542*b*: conductive layer, 545: conductive layer, 545*a*: conductive layer, 545*b*: conductive layer, 550: insulating layer, 554: insulating layer, 560: conductive layer, 560*a*: conductive layer, 560*b*: conductive layer, 574: insulating layer, 580: insulating layer, 581: insulating layer, 601: motor vehicle, 602: bus, 603: train, 604: airplane, 605: helmet, 611: window unit, 941: retina, 942: crystalline lens, 943: optic nerve, 944: optic disc, 945: vein, 946: artery, 947: vitreous body, 948: choroid, 950: optical system, 951: light emission, 960: eyebrow, 961: hair, 962: pupil, 963: cornea, 965: sclera, 966: upper eyelid, 967: lower eyelid, 980: display apparatus, 4411: light-emitting layer, 4412: light-emitting layer, 4413: light-emitting layer, 4420: layer, 4420-1: layer, 4420-2: layer, 4430: layer, 4430-1: layer, 4430-2: layer

What is claimed is:

1. A moving object comprising:

a display unit;

an imaging unit; and an arithmetic unit, wherein the display unit is configured to display a display image, wherein the imaging unit is configured to obtain a first captured image comprising the display image and an external view overlapping with the display image, wherein the arithmetic unit is configured to compare the display image and the external view on the basis of the first captured image, and wherein the arithmetic unit is configured to correct the display image on the basis of a comparison result.

2. The moving object according to claim 1, wherein the imaging unit is configured to obtain a second captured image comprising a driver of the moving object, wherein the arithmetic unit is configured to estimate condition of the driver on the basis of the second captured image, and wherein the arithmetic unit is configured to correct the display image on the basis of an estimation result.

3. The moving object according to claim 2, wherein the second captured image comprises a face of the driver.

4. The moving object according to claim 2, wherein the condition of the driver is drowsiness of the driver.

5. A moving object comprising:

a display unit;

an imaging unit;

an arithmetic unit; and a control unit, wherein the display unit is configured to display a display image, wherein the imaging unit is configured to obtain a first captured image comprising the display image and an external view overlapping with the display image, wherein the arithmetic unit is configured to compare the display image and the external view on the basis of the first captured image, wherein the arithmetic unit is configured to estimate a state of the display unit, wherein the arithmetic unit is configured to correct the display image on the basis of the state of the display unit and a comparison result, and wherein the control unit is configured to control running of the moving object on the basis of the first captured image.

6. The moving object according to claim 5, wherein the state of the display unit is estimated on the basis of a temperature of the display unit.

7. The moving object according to claim 5, wherein the state of the display unit is estimated on the basis of a temperature of an inside of the moving object.

* * * * *